(12) United States Patent
Yang et al.

(10) Patent No.: US 12,540,118 B2
(45) Date of Patent: Feb. 3, 2026

(54) DENDRENE AMIDE COMPOUND, BACTERICIDE AND USE THEREOF

(71) Applicant: Jiangsu Flag Chemical Industry Co., Ltd., Jiangsu (CN)

(72) Inventors: Guangfu Yang, Hubei (CN); Ge Wei, Hubei (CN); Xiaolei Zhu, Hubei (CN); Wenjie Wang, Hubei (CN); Pu Zhang, Suzhou (CN); Yaojun Wu, Suzhou (CN); Kaicheng Yao, Suzhou (CN)

(73) Assignee: Jiangsu Flag Chemical Industry Co., Ltd., Jiangsu (CN)

( * ) Notice: Subject to any disclaimer, the term of this patent is extended or adjusted under 35 U.S.C. 154(b) by 397 days.

(21) Appl. No.: 18/247,393

(22) PCT Filed: Sep. 28, 2021

(86) PCT No.: PCT/CN2021/121315
§ 371 (c)(1),
(2) Date: Mar. 30, 2023

(87) PCT Pub. No.: WO2022/068816
PCT Pub. Date: Apr. 7, 2022

(65) Prior Publication Data
US 2023/0391728 A1    Dec. 7, 2023

(30) Foreign Application Priority Data
Sep. 30, 2020 (CN) .......................... 202011064084.7

(51) Int. Cl.
C07D 231/16     (2006.01)
A01N 43/56      (2006.01)

(52) U.S. Cl.
CPC .......... *C07D 231/16* (2013.01); *A01N 43/56* (2013.01)

(58) Field of Classification Search
None
See application file for complete search history.

(56) References Cited

U.S. PATENT DOCUMENTS

| | | | |
|---|---|---|---|
| 8,815,772 B2 * | 8/2014 | Bereznak | A01N 43/36 546/275.4 |
| 2017/0008847 A1 | 1/2017 | Mita et al. | |
| 2019/0133122 A1 | 5/2019 | Hasunuma et al. | |

FOREIGN PATENT DOCUMENTS

| | | | |
|---|---|---|---|
| CN | 109384722 A | 2/2019 | |
| CN | 109422691 A | 3/2019 | |
| WO | 2011/151358 A1 | 12/2011 | |
| WO | 2011/151369 A1 | 12/2011 | |
| WO | WO-2014004064 A1 * | 1/2014 | .......... C07D 249/08 |
| WO | 2014/056956 A1 | 4/2014 | |
| WO | 2014/060520 A1 | 4/2014 | |
| WO | 2022/171176 A1 | 8/2022 | |

OTHER PUBLICATIONS

International Search Report for PCT/CN2021/121315 dated Jan. 4, 2022.

* cited by examiner

*Primary Examiner* — Alton N Pryor
(74) *Attorney, Agent, or Firm* — Sughrue Mion, PLLC

(57) ABSTRACT

Provided are a dendrene amide compound, a bactericide and the use thereof, which relate to the field of pesticides. The compound has a structure as shown in formula (I). The dendrene amide compound provided has a relatively high inhibitory activity for succinate dehydrogenase, and has a relatively high controlling effect on fungal diseases.

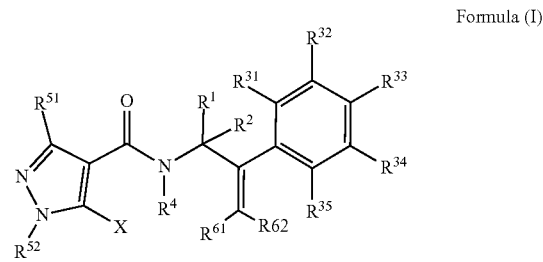

Formula (I)

7 Claims, No Drawings

DENDRENE AMIDE COMPOUND, BACTERICIDE AND USE THEREOF

CROSS REFERENCE TO RELATED APPLICATIONS

This application is a National Stage of International Application No. PCT/CN2021/121315 filed Sep. 28, 2021, claiming the benefit of Chinese patent application 202011064084.7 filed 30 Sep. 2020, the contents of which are incorporated herein by reference.

TECHNICAL FIELD

The invention relates to the field of pesticides, and particularly relates to a dendrene amide compound, a bactericide and the use thereof.

BACKGROUND

Succinate dehydrogenase inhibitors (SDHIs) are bactericides which are used for preventing and treating diseases by acting on a complex II (also called succinate dehydrogenase or ubiquinone succinate reductase) on a respiratory electron transfer chain of mitochondria of pathogenic fungi to interfere the succinate dehydrogenase on the respiratory electron transfer chain to inhibit the functions of the mitochondria, prevent the mitochondria from generating energy, inhibit the growth of the pathogenic fungi and finally cause the death of the pathogenic fungi.

The succinate dehydrogenase inhibitor bactericide has become the most promising bactericide in recent years due to high efficiency, broad-spectrum fungicidal activity and relatively low resistance risk, and is concerned by various pesticide companies in the world.

DISCLOSURE OF INVENTION

The invention aims to overcome the aforementioned defects of the prior art and provide a novel class of compounds having succinate dehydrogenase inhibitory effect.

In order to achieve the above object, the first aspect of the invention provides a dendrene amide compound having a structure shown in formula (I),

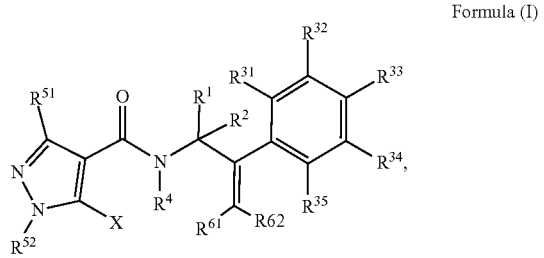

Formula (I)

wherein, in the formula (I),

X is selected from H, F, Cl;

$R^1$ and $R^2$ are each independently selected from H, halogen, $C_{1-6}$ alkyl; or $R^1$ and $R^2$ form cyclopropyl, cyclopentyl or cyclohexyl together with their common carbon atoms;

$R^{31}$, $R^{32}$, $R^{33}$, $R^{34}$ and $R^{35}$ are each independently selected from H, halogen, substituted or unsubstituted $C_{1-6}$ alkyl, $C_{1-6}$ alkoxy, cyano, $C_{1-6}$ alkyl-sulfonyl, substituted or unsubstituted phenyl, substituted or unsubstituted phenoxy, substituted or unsubstituted benzyloxy, substituted or unsubstituted $C_{2-4}$ alkynyl; the optional substituents on $R^{31}$, $R^{32}$, $R^{33}$, $R^{34}$ and $R^{35}$ are independently selected from at least one of halogen, $C_{1-6}$ alkyl, $C_{1-6}$ alkoxy, $C_{1-6}$ alkyl-sulfonyl, phenyl, phenoxy, benzyloxy, $C_{1-3}$ alkyl substituted by 1-3 halogens, phenyl substituted by 1-3 halogens and $C_{2-4}$ alkynyl substituted by cyclopropyl;

$R^4$ is selected from $C_{1-4}$ alkyl, $C_{1-4}$ alkoxy, cyano, trifluoromethyl and propargyl;

$R^{51}$ is selected from $C_{1-3}$ alkyl substituted with 1-3 halogens; $R^{52}$ is selected from $C_{1-4}$ alkyl.

$R^{61}$ and $R^{62}$ are each independently selected from H, F, Cl, Br.

The second aspect of the invention provides the use of the aforementioned compounds as succinate dehydrogenase inhibitors in pesticides.

The third aspect of the invention provides the use of the aforementioned compounds for controlling plant fungal diseases.

The fourth aspect of the invention provides a bactericide which comprises an auxiliary material and a fungicidal effective amount of an active ingredient selected from at least one of the aforementioned compounds.

The fifth aspect of the invention provides the use of the aforementioned bactericide for the control of fungal diseases in plants.

The dendrene amide compound provided by the invention has high activity of inhibiting succinate dehydrogenase, the dendrene amide compound has high control effect on fungal diseases, and the dendrene amide compound particularly has excellent control effect on *Erysiphe graminis, sphaerotheca fuliginea*, wheat scab, rice bakanae disease, *sclerotinia* rot of colza, corn leaf spot, wheat stripe rust, cucumber gray mold and the like.

DETAILED DESCRIPTION

The endpoints of the ranges and any values disclosed herein are not limited to the precise range or value, and these ranges or values should be understood to encompass values close to these ranges or values. For numerical ranges, each range between its endpoints and individual point values, and each individual point value can be combined with each other to give one or more new numerical ranges, and such numerical ranges should be construed as specifically disclosed herein.

In the following description, some terms related to the present invention will be explained first, and the following explanation is valid for the same term throughout the present invention without a contrary explanation, and in order to avoid repetition, the present invention will not be repeatedly explained for the same term in the following description, and those skilled in the art should not be construed as limiting the invention.

"halogen" includes fluorine, chlorine, bromine, iodine.

"$C_{1-6}$ alkyl" includes alkyl groups having a total number of carbon atoms of 1 to 6, including straight-chain, branched-chain and cyclic alkyl groups, for example straight-chain, branched-chain or cyclic alkyl groups having 1, 2, 3, 4, 5, 6 carbon atoms in total, such as methyl, ethyl, n-propyl, isopropyl, n-butyl, isobutyl, t-butyl, n-pentyl, isopentyl, n-hexyl, cyclopropyl, methylcyclopropyl, ethylcyclopropyl, cyclopentyl, methylcyclopentyl, cyclohexyl and the like. The expressions "$C_{1-4}$ alkyl" and "$C_{1-3}$ alkyl" are similar to each other, except that the total number of carbon atoms is different.

"$C_{1-6}$ alkoxy" includes alkoxy groups having a total number of carbon atoms of 1 to 6, including straight-chain alkoxy groups, branched-chain alkoxy groups and cycloalkoxy groups, for example, straight-chain alkoxy groups, branched-chain alkoxy groups or cycloalkoxy groups having 1, 2, 3, 4, 5, 6 carbon atoms in total, for example, methoxy, ethoxy, n-propoxy, isopropoxy, n-butoxy, isobutoxy, tert-butoxy, n-pentoxy, isopentoxy, n-hexoxy, cyclopropoxy, methylcyclopropoxy, ethylcyclopropoxy, cyclopentoxy, methylcyclopentoxy, cyclohexoxy groups and the like. The same applies to "$C_{1-4}$ alkoxy" and "$C_{1-3}$ alkoxy", except that the total number of carbon atoms is different.

"$C_{1-6}$ alkyl-sulfonyl" refers to the group represented by —$SO_2$—$R_1$, and wherein $R_1$ is $C_{1-6}$ alkyl. "$C_{1-3}$ alkyl-sulfonyl" and the like have explanations similar thereto.

"substituted or unsubstituted phenyl" means that the number of specific substituents on the phenyl group is not limited, and substitution may be made at a position on the phenyl group which can be substituted, and also, there may be a case where there is no substituent, that is, a phenyl group. Similar explanations are given for "substituted or unsubstituted phenoxy", "substituted or unsubstituted benzyloxy", "substituted or unsubstituted $C_{2-4}$ alkynyl".

"$C_{1-3}$ alkyl substituted by 1-3 halogens" includes alkyl groups having a total of 1 to 3 carbon atoms and 1 to 3 H atoms on the alkyl group are substituted with halogens, including straight-chain alkyl groups, branched-chain alkyl groups and cyclic alkyl groups, for example, straight-chain alkyl groups, branched-chain alkyl groups or cyclic alkyl groups having a total of 1, 2, 3 carbon atoms, for example, methyl groups substituted with 1 to 3 halogens, ethyl groups substituted with 1 to 3 halogens, n-propyl groups substituted with 1 to 3 halogens, isopropyl groups substituted with 1 to 3 halogens, cyclopropyl groups substituted with 1 to 3 halogens, and the like.

"phenyl substituted by 1-3 halogens" includes groups in which 1 to 3 H atoms on the phenyl are substituted with halogens.

As described above, the first aspect of the invention provides a dendrene amide compound having the structure represented by formula (I),
wherein, in the formula (I),
X is selected from H, F, Cl;
$R^1$ and $R^2$ are each independently selected from H, halogen, $C_{1-6}$ alkyl; or $R^1$ and $R^2$ form cyclopropyl, cyclopentyl or cyclohexyl together with their common carbon atoms;
$R^{31}$, $R^{32}$, $R^{33}$, $R^{34}$ and $R^{35}$ are each independently selected from H, halogen, substituted or unsubstituted $C_{1-6}$ alkyl, $C_{1-6}$ alkoxy, cyano, $C_{1-6}$ alkyl-sulfonyl, substituted or unsubstituted phenyl, substituted or unsubstituted phenoxy, substituted or unsubstituted benzyloxy, substituted or unsubstituted $C_{2-4}$ alkynyl; the optional substituents on $R^{31}$, $R^{32}$, $R^{33}$, $R^{34}$ and $R^{35}$ are independently selected from at least one of halogen, $C_{1-6}$ alkyl, $C_{1-6}$ alkoxy, $C_{1-6}$ alkyl-sulfonyl, phenyl, phenoxy, benzyloxy, $C_{1-3}$ alkyl substituted by 1-3 halogens, phenyl substituted by 1-3 halogens and $C_{2-4}$ alkynyl substituted by cyclopropyl;
$R^4$ is selected from $C_{1-4}$ alkyl, $C_{1-4}$ alkoxy, cyano, trifluoromethyl and propargyl;
$R^{51}$ is selected from $C_{1-3}$ alkyl substituted with 1-3 halogens; $R^{52}$ is selected from $C_{1-4}$ alkyl.

$R^{61}$ and $R^{62}$ are each independently selected from H, F, Cl, Br.

Preferably, in formula (I), X is selected from H, F.

Preferably, in formula (I), $R^1$ and $R^2$ are each independently selected from H, F, Cl, Br, $C_{1-3}$ alkyl; more preferably, $R^1$ and $R^2$ are each independently selected from H, F, Cl, Br, methyl, ethyl, n-propyl, isopropyl, cyclopropyl; further preferably, $R^1$ and $R^2$ are each independently selected from H, methyl, ethyl, n-propyl.

Preferably, in formula (I), $R^{31}$, $R^{32}$, $R^{33}$, $R^{34}$ and $R^{35}$ are each independently selected from H, halogen, substituted or unsubstituted $C_{1-4}$ alkyl, $C_{1-4}$ alkoxy, cyano, $C_{1-3}$ alkyl-sulfonyl, substituted or unsubstituted phenyl, substituted or unsubstituted phenoxy, substituted or unsubstituted benzyloxy, substituted or unsubstituted ethynyl; the optional substituents on $R^{31}$, $R^{32}$, $R^{33}$, $R^{34}$ and $R^{35}$ are independently selected from at least one of halogen, $C_{1-4}$ alkyl, $C_{1-4}$ alkoxy, $C_{1-3}$ alkyl-sulfonyl, phenyl, phenoxy, benzyloxy, $C_{1-3}$ alkyl substituted by 1-3 halogens, phenyl substituted by 1-3 halogens and ethynyl substituted by cyclopropyl; more preferably, $R^{31}$, $R^{32}$, $R^{33}$, $R^{34}$ and $R^{35}$ are each independently selected from H, F, Cl, Br, methyl, ethyl, n-propyl, isopropyl, cyclopropyl, n-butyl, isobutyl, tert-butyl, methoxy, ethoxy, trifluoromethyl, n-propoxy, isopropoxy, cyclopropyloxy, n-butoxy, isobutoxy, tert-butoxy, cyano, methylsulfonyl, ethylsulfonyl, n-propylsulfonyl, isopropylsulfonyl, cyclopropylsulfonyl, substituted or unsubstituted phenyl, substituted or unsubstituted phenoxy, substituted or unsubstituted benzyloxy, substituted or unsubstituted ethynyl; the optional substituents on $R^{31}$, $R^{32}$, $R^{33}$, $R^{34}$ and $R^{35}$ are each independently selected from at least one of F, Cl, Br, methyl, ethyl, n-propyl, isopropyl, cyclopropyl, n-butyl, t-butyl, methoxy, ethoxy, n-propoxy, isopropoxy, cyclopropyloxy, cyclopropyl-substituted ethynyl, methylsulfonyl, ethylsulfonyl, n-propylsulfonyl, isopropylsulfonyl, cyclopropylsulfonyl, phenyl, phenoxy, benzyloxy, $C_{1-3}$ alkyl substituted by 1-3 halogens selected from F and/or Cl, phenyl substituted by 1-3 halogens selected from F and/or Cl; further preferably, $R^{31}$, $R^{32}$, $R^{33}$, $R^{34}$ and $R^{35}$ are each independently selected from H, F, Cl, Br, methyl, ethyl, n-propyl, isopropyl, n-butyl, t-butyl, methoxy, trifluoromethyl, $C_{1-3}$ alkyl-sulfonyl, ethoxy, substituted or unsubstituted phenyl, substituted or unsubstituted phenoxy, substituted or unsubstituted benzyloxy, substituted or unsubstituted ethynyl; the optional substituents on $R^{31}$, $R^{32}$, $R^{33}$, $R^{34}$ and $R^{35}$ are selected from at least one of F, Cl, Br, methyl, ethyl, n-propyl, cyclopropyl, isopropyl, n-butyl, t-butyl, cyclopropyl-substituted ethynyl, $C_{1-3}$ alkyl-sulfonyl.

Preferably, in formula (I), $R^4$ is selected from $C_{1-3}$ alkyl, $C_{1-3}$ alkoxy; more preferably, $R^4$ is selected from methyl, ethyl, n-propyl, isopropyl, cyclopropyl, methoxy, ethoxy, n-propoxy, isopropoxy; further preferably, $R^4$ is selected from cyclopropyl, methoxy, ethoxy.

Preferably, in formula (I), $R^{51}$ is selected from difluoromethyl, trifluoromethyl; $R^{52}$ is selected from methyl, ethyl, n-propyl, isopropyl; more preferably, $R^{51}$ is selected from difluoromethyl, trifluoromethyl; $R^{52}$ is selected from methyl, ethyl; particularly preferably, $R^{51}$ is difluoromethyl; $R^{52}$ is methyl.

Preferably, in formula (I), $R^{61}$ and $R^{62}$ are each independently selected from H, F, Cl, Br.

Several particularly preferred embodiments are provided below for the dendrene amide compounds of the invention.

Embodiment Mode 1

In the formula (I), the compound has the following structure,

X is selected from H, F, Cl;

$R^1$ and $R^2$ are each independently selected from H, F, Cl, Br, $C_{1-3}$ alkyl;

$R^{31}$, $R^{32}$, $R^{33}$, $R^{34}$ and $R^{35}$ are each independently selected from H, halogen, substituted or unsubstituted $C_{1-4}$ alkyl, $C_{1-4}$ alkoxy, cyano, $C_{1-3}$ alkyl-sulfonyl, substituted or unsubstituted phenyl, substituted or unsubstituted phenoxy, substituted or unsubstituted benzyloxy, substituted or unsubstituted ethynyl; the optional substituents on $R^{31}$, $R^{32}$, $R^{33}$, $R^{34}$ and $R^{35}$ are independently selected from at least one of halogen, $C_{1-4}$ alkyl, $C_{1-4}$ alkoxy, $C_{1-3}$ alkyl-sulfonyl, phenyl, phenoxy, benzyloxy, $C_{1-3}$ alkyl substituted by 1-3 halogens, phenyl substituted by 1-3 halogens and ethynyl substituted by cyclopropyl;

$R^4$ is selected from $C_{1-3}$ alkyl, $C_{1-3}$ alkoxy and propynyl;

$R^{51}$ is selected from difluoromethyl, trifluoromethyl; $R^{52}$ is selected from methyl, ethyl, n-propyl, isopropyl;

$R^{61}$ and $R^{62}$ are each independently selected from H, F, Cl, Br.

Embodiment Mode 2

In the formula (I), the compound has the following structure,

X is selected from H, F, Cl;

$R^1$ and $R^2$ are each independently selected from H, F, Cl, Br, methyl, ethyl, n-propyl, isopropyl, cyclopropyl;

$R^{31}$, $R^{32}$, $R^{33}$, $R^{34}$ and $R^{35}$ are each independently selected from H, F, Cl, Br, methyl, ethyl, n-propyl, isopropyl, cyclopropyl, n-butyl, isobutyl, tert-butyl, methoxy, ethoxy, trifluoromethyl, n-propoxy, isopropoxy, cyclopropyloxy, n-butoxy, isobutoxy, tert-butoxy, cyano, methylsulfonyl, ethylsulfonyl, n-propylsulfonyl, isopropylsulfonyl, cyclopropylsulfonyl, substituted or unsubstituted phenyl, substituted or unsubstituted phenoxy, substituted or unsubstituted benzyloxy, substituted or unsubstituted ethynyl; the optional substituents on $R^{31}$, $R^{32}$, $R^{33}$, $R^{34}$ and $R^{35}$ are each independently selected from at least one of F, Cl, Br, methyl, ethyl, n-propyl, isopropyl, cyclopropyl, n-butyl, t-butyl, methoxy, ethoxy, n-propoxy, isopropoxy, cyclopropyloxy, cyclopropyl-substituted ethynyl, methylsulfonyl, ethylsulfonyl, n-propylsulfonyl, isopropylsulfonyl, cyclopropylsulfonyl, phenyl, phenoxy, benzyloxy, $C_{1-3}$ alkyl substituted by 1-3 halogens selected from F and/or Cl, phenyl substituted by 1-3 halogens selected from F and/or Cl;

$R^4$ is selected from methyl, ethyl, n-propyl, isopropyl, cyclopropyl, methoxy, ethoxy, n-propoxy, isopropoxy, propynyl;

$R^{51}$ is selected from difluoromethyl, trifluoromethyl; $R^{52}$ is selected from methyl, ethyl;

$R^{61}$ and $R^{62}$ are each independently selected from H, F, Cl, Br.

Embodiment Mode 3

In the formula (I), the compound has the following structure,

X is selected from H, F;

$R^1$ and $R^2$ are each independently selected from H, methyl, ethyl, n-propyl;

$R^{31}$, $R^{32}$, $R^{33}$, $R^{34}$ and $R^{35}$ are each independently selected from H, F, Cl, Br, methyl, ethyl, n-propyl, isopropyl, n-butyl, tert-butyl, methoxy, trifluoromethyl, $C_{1-3}$ alkyl-sulfonyl, ethoxy, substituted or unsubstituted phenyl, substituted or unsubstituted phenoxy, substituted or unsubstituted benzyloxy, substituted or unsubstituted ethynyl; the optional substituents on $R^{31}$, $R^{32}$, $R^{33}$, $R^{34}$ and $R^{35}$ are selected from at least one of F, Cl, Br, methyl, ethyl, n-propyl, cyclopropyl, isopropyl, n-butyl, t-butyl, cyclopropyl-substituted ethynyl, $C_{1-3}$ alkyl-sulfonyl;

$R^4$ is selected from cyclopropyl, methoxy, ethoxy, propynyl;

$R^{51}$ is difluoromethyl; $R^{52}$ is methyl;

$R^{61}$ and $R^{62}$ are each independently selected from H, F, Cl, Br.

Embodiment Mode 4

The compound shown in formula (I) is selected from at least one of compounds 1 to 219.

The above compounds provided by the invention have significantly higher inhibitory activity against succinate dehydrogenase. It is a good succinate dehydrogenase inhibitor.

The invention has no special requirements for the specific preparation method of the above-mentioned compounds, and those skilled in the art can select an appropriate synthetic route to prepare the compounds according to the structural formula provided by the present invention in combination with the known synthetic methods in the field of organic chemistry. Several specific synthetic methods are provided below and in the examples of the invention by way of example, and the person skilled in the art should not be understood as limiting the invention.

Illustratively, the compound of the formula (I) of the invention is prepared by a method comprising the following steps:

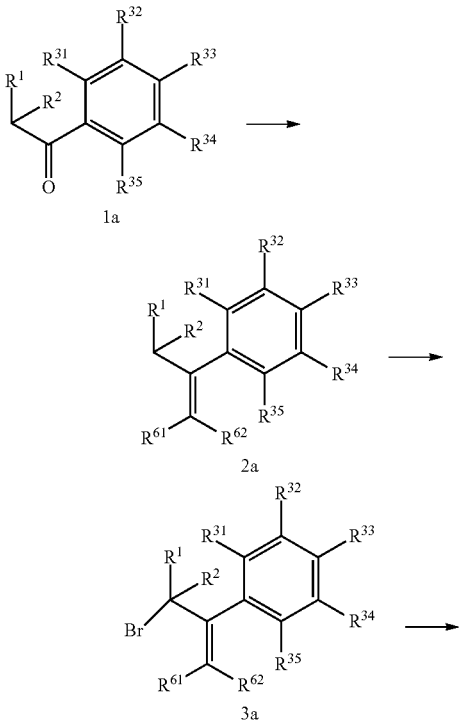

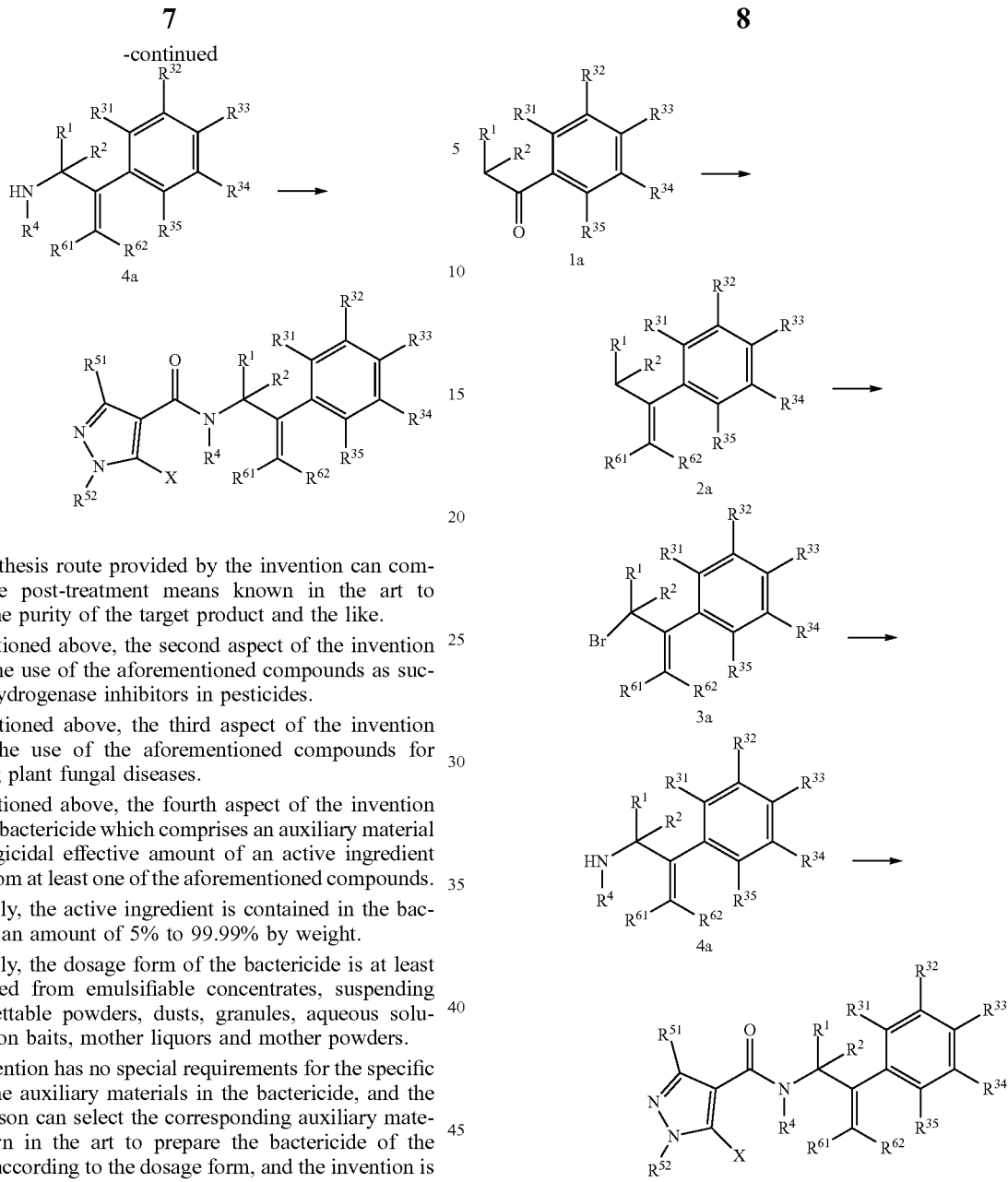

The synthesis route provided by the invention can comprise some post-treatment means known in the art to improve the purity of the target product and the like.

As mentioned above, the second aspect of the invention provides the use of the aforementioned compounds as succinate dehydrogenase inhibitors in pesticides.

As mentioned above, the third aspect of the invention provides the use of the aforementioned compounds for controlling plant fungal diseases.

As mentioned above, the fourth aspect of the invention provides a bactericide which comprises an auxiliary material and a fungicidal effective amount of an active ingredient selected from at least one of the aforementioned compounds.

Preferably, the active ingredient is contained in the bactericide in an amount of 5% to 99.99% by weight.

Preferably, the dosage form of the bactericide is at least one selected from emulsifiable concentrates, suspending agents, wettable powders, dusts, granules, aqueous solutions, poison baits, mother liquors and mother powders.

The invention has no special requirements for the specific types of the auxiliary materials in the bactericide, and the skilled person can select the corresponding auxiliary materials known in the art to prepare the bactericide of the invention according to the dosage form, and the invention is not described in detail herein, and the skilled person should not be construed as limiting the invention.

As mentioned above, the fifth aspect of the invention provides the use of the aforementioned bactericide for the control of fungal diseases in plants.

Preferably, the plant fungal diseases is selected from at least one of *Erysiphe graminis*, *sphaerotheca fuliginea*, wheat scab, rice bakanae disease, *sclerotinia* rot of colza, corn leaf spot, wheat stripe rust and cucumber gray mold.

The invention will be described in detail below by way of examples. In the following examples, the raw materials used are all ordinary commercial products unless otherwise specified.

The room temperature in the following examples means 25±2° C. unless otherwise specified.

The objective compounds in the following examples are prepared by the following synthetic routes, unless otherwise specified. Specifically, the method comprises the following steps:

when $R^{61}=R^{62}=H$, the synthesis method is as follows:

1. Synthesis of Intermediate 2a

Taking the compound 1a (80 mmol) in a 250 ml beaker, adding 120 ml THF, slowly adding potassium tert-butanol (80 mmol) in ice bath, reacting at room temperature for 1 h, slowly adding various substituted ketones (40 mmol) in ice bath, heating to room temperature after adding, monitoring the reaction by TLC after 1 h, adding water to quench the reaction after the reaction of the raw materials is completed, extracting by ethyl acetate, washing with water and saturated salt water for 3 times respectively, stirring by silica gel, and separating by column chromatography to obtain an oily compound, namely the intermediate 2 a.

2. Synthesis of Intermediate 3a

Dissolving the intermediate 2a (1 eq.) in chloroform, adding NBS (2 eq.) and p-toluenesulfonic acid (0.5 eq.) into the chloroform, heating the solution to reflux for about 2 hours, monitoring the reaction by TLC, stopping heating after the reaction is completed, cooling the solution to room temperature, adding water into the solution, extracting the solution by dichloromethane, washing with water and saturated salt water for 3 times respectively, drying and removing the solvent to obtain a brominated intermediate 3a without purification.

3. Synthesis of Intermediate 4a

The brominated intermediate 3a (1 eq.) is added to acetonitrile, followed by potassium carbonate (3 eq.), adding various substituted amines (2.2 eq.) under ice bath, reacting at room temperature for 24 h after the addition is finished, monitoring the reaction by TLC, adding water to quench the reaction after the reaction is finished, extracting by ethyl acetate, washing with water and saturated salt water for 3 times respectively, drying and desolventizing to obtain an aminated intermediate 4a without purification.

4. Synthesis of Target Product

The aminated intermediate 4a (1 eq.) is added to dichloromethane, followed by triethylamine (2 eq.), finally slowly adding pyrazole acyl chloride (1.5 eq.), monitoring the reaction by TLC, adding water to quench the reaction after the reaction is finished, extracting by dichloromethane, washing with water and saturated salt water for 3 times respectively, stirring a sample with silica gel, and performing column chromatography separation to obtain the product.

When $R^{61}$=$R^{62}$=F, Cl and Br, the synthesis method is as follows:

1. Synthesis of Intermediate 2a

Adding triphenylphosphine (4 eq.) and various substituted ketones (1 eq.) into a eggplant-shaped bottle with a proper size, adding a proper amount of DCM, slowly dropwise adding trichlorobromomethane (2 eq.) under ice bath, monitoring whether the reaction is finished or not after 30 min, adding water to quench the reaction if the reaction is finished, extracting by DCM, washing with water and saturated salt water for 2-3 times respectively, stirring with silica gel, and separating by column chromatography to obtain an oily compound, namely the intermediate 2 a.

2. Synthesis of Intermediate 3a

Dissolving the intermediate 2a (1 eq.) in chloroform, adding NBS (2 eq.) and p-toluenesulfonic acid (0.5 eq.) into the chloroform, heating the mixture to reflux for about 2 hours, monitoring whether the reaction is finished by TLC, stopping heating after the reaction is finished, cooling the mixture to room temperature, adding water into the mixture, extracting the mixture by dichloromethane, washing with water and saturated salt water for 2-3 times respectively, drying and removing the solvent to obtain a brominated intermediate 3a without purification.

3. Synthesis of Intermediate 4a

The brominated intermediate 3a (1 eq.) is added to acetonitrile, followed by potassium carbonate (3 eq.), adding various substituted amines (2.2 eq.) under ice bath, reacting at room temperature for 24 h after the addition is finished, monitoring the reaction by TLC, adding water to quench the reaction after the reaction is finished, extracting by ethyl acetate, washing with water and saturated salt water for 2-3 times respectively, drying and desolventizing to obtain an aminated intermediate 4a without purification.

4. Synthesis of Target Product

The aminated intermediate 4a (1 eq.) is added to dichloromethane, followed by triethylamine (2 eq.), finally slowly adding pyrazole acyl chloride (1.5 eq.), slowly adding the intermediate in ice bath if a large amount of the intermediate is reacted, adding a small amount of the intermediate at room temperature directly, monitoring whether the reaction is finished by TLC, adding water to quench the reaction after the reaction is finished, extracting by dichloromethane, washing the obtained product with water and saturated salt water for 2-3 times respectively, directly stirring the sample with silica gel if the reaction is finished in a small amount, carrying out column chromatography separation, and recrystallizing with ethanol and ethyl acetate if the reaction is finished in a large amount, wherein the product is a white solid.

The following illustratively provides a specific synthetic method for compound 1:

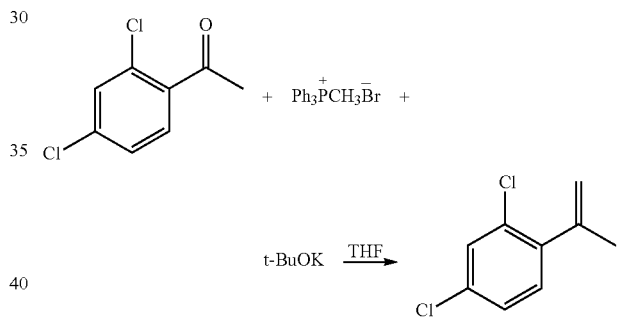

Adding triphenyl methyl phosphorus bromide (80 mmol, 2 eq.) into a 250 ml eggplant-shaped bottle, adding 120 ml THF, slowly adding potassium tert-butanol (80 mmol, 2 eq.) in ice bath, reacting at room temperature for 1 h, then slowly adding 2, 4-dichloroacetophenone (40 mmol, 1 eq.) in ice bath, heating to room temperature after the addition is finished, monitoring the reaction by TLC after 1 h, adding water to quench the reaction after the reaction of the raw materials is finished, extracting by ethyl acetate, washing with water and saturated salt water for 3 times respectively, drying and desolventizing to obtain a yellow oily compound, wherein the yellow oily compound contains a product and triphenylphosphine oxide, separating, directly stirring by silica gel, separating by column chromatography, and eluting by petroleum ether.

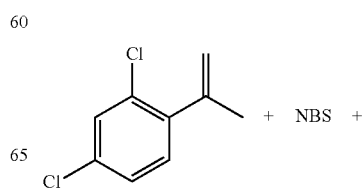

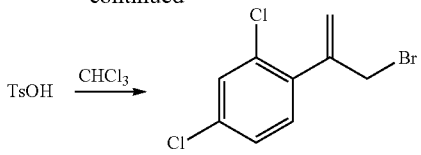

Dissolving 2, 4-dichlorostyrene (1 eq.) in chloroform, adding NBS (1.05 eq.), p-toluenesulfonic acid (0.3 eq.) into the chloroform, heating the solution to reflux for 2 h at 70° C., monitoring by TLC for reaction completion, stopping heating after the reaction is completed, cooling to room temperature, adding water, extracting by dichloromethane, washing with water and saturated salt for 2 times respectively, drying, and desolventizing to obtain a brominated intermediate without purification.

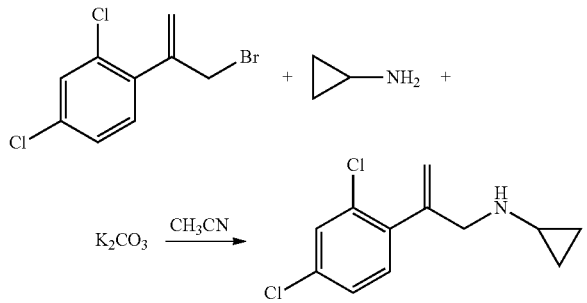

The brominated intermediate 3a (1 eq.) is added to acetonitrile, followed by potassium carbonate (3 eq.), then adding cyclopropylamine (2.2 eq.) under ice bath, reacting at room temperature for 24 hours after the addition is finished, monitoring by TLC, adding water for quenching reaction after the reaction is finished, extracting by ethyl acetate, washing by water and saturated salt for 3 times respectively, drying and desolventizing to obtain an aminated product without purification.

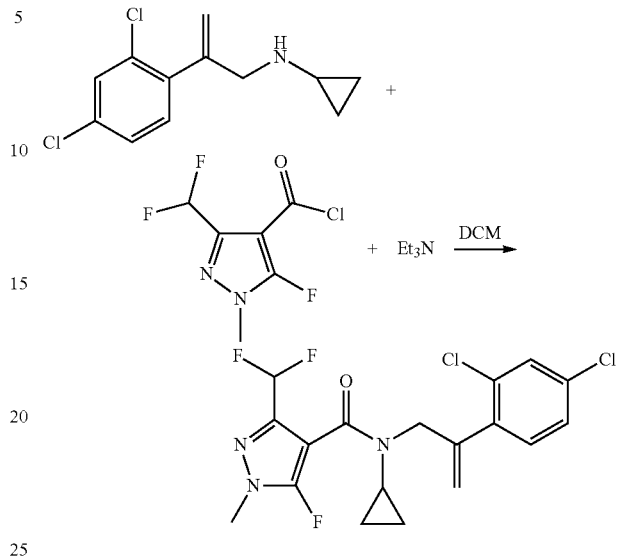

The aminated intermediate 4a (1 eq.) is added to dichloromethane, followed by triethylamine (2 eq.), finally slowly adding fluorine-containing pyrazole acyl chloride (1.5 eq.), monitoring by TLC, adding water to quench the reaction after the reaction is finished, extracting by dichloromethane, washing the dichloromethane with water and saturated salt water for 3 times respectively, directly stirring the sample with silica gel, and performing column chromatography separation (an eluent uses petroleum ether:ethyl acetate=8:1) to obtain a white solid product. Thus obtaining the compound 1.

The nuclear magnetic data of the target compounds of the present invention are listed in table 1.

TABLE 1

| Compound number | Nuclear magnetic data |
|---|---|
| 1 | $^1$H NMR (600 MHZ, DMSO-$d_6$) δ 7.61 (s, 1H), 7.40 (d, J = 8.3 Hz, 1H), 7.29 (s, 1H), 6.83 (t, J = 53.5 Hz, 1H), 5.43 (s, 1H), 5.18 (s, 1H), 4.37 (s, 2H), 3.73 (s, 3H), 2.73-2.55 (m, 1H), 0.83-0.61 (m, 2H), 0.59-0.42 (m, 2H). |
| 2 | $^1$H NMR (500 MHz, CDCl3) δ 7.36-7.31 (m, 1H), 7.31-7.25 (m, 2H), 7.17 (t, J = 57.3 Hz, 1H), 5.30 (s, 1H), 5.25 (s, 1H), 4.40 (s, 2H), 3.96 (s, 3H), 3.71-3.64 (m, 1H), 0.74-0.65 (m, 2H), 0.65-0.54 (m, 2H). |
| 3 | $^1$H NMR (500 MHz, CDCl3) δ 7.66-7.61 (m, 1H), 7.46 (dd, J = 4.8, 3.0 Hz, 1H), 7.37-7.30 (m, 2H), 7.17 (t, J = 57.3 Hz, 1H), 5.23 (s, 1H), 5.16 (s, 1H), 4.39 (s, 2H), 3.96 (s, 3H), 3.74-3.63 (m, 1H), 0.76-0.65 (m, 2H), 0.65-0.56 (m, 2H). |
| 4 | $^1$H NMR (500 MHz, CDCl3) δ 7.26 (t, J = 57.3 Hz, 1H), 7.23-7.20 (m, 2H), 7.15-7.04 (m, 2H), 5.26 (s, 1H), 5.18 (s, 1H), 4.36 (s, 2H), 3.96 (s, 3H), 3.74-3.62 (m, 1H), 2.38 (s, 3H), 0.75-0.65 (m, 2H), 0.65-0.55 (m, 2H). |
| 5 | $^1$H NMR (500 MHz, CDCl3) δ 7.57-7.51 (m, 2H), 7.36-7.28 (m, 2H), 7.23 (t, J = 57.3 Hz, 1H), 5.30 (s, 1H), 5.20 (s, 1H), 4.37 (s, 2H), 3.96 (s, 3H), 3.72-3.63 (m, 1H), 0.73-0.65 (m, 2H), 0.65-0.57 (m, 2H). |
| 6 | $^1$H NMR (500 MHz, CDCl3) δ 7.36-7.27 (m, 1H), 7.27-7.23 (m, 2H), 7.22 (t, J = 57.3 Hz, 1H), 7.18-7.11 (m, 1H), 5.24 (s, 1H), 5.17 (s, 1H), 4.31 (s, 2H), 3.96 (s, 3H), 3.74-3.59 (m, 1H), 2.35 (s, 3H), 0.74-0.65 (m, 2H), 0.65-0.56 (m, 2H). |
| 7 | $^1$H NMR (500 MHz, CDCl3) δ 7.46 (dd, J = 6.3, 1.6 Hz, 1H), 7.42-7.32 (m, 2H), 7.28 (ddd, J = 7.5, 6.4, 1.8 Hz, 1H), 7.17 (t, J = 57.3 Hz, 1H), 5.26 (s, 1H), 5.18 (s, 1H), 4.18 (s, 2H), 3.96 (s, 3H), 3.72-3.64 (m, 1H), 0.73-0.65 (m, 2H), 0.65-0.57 (m, 2H). |
| 8 | $^1$H NMR (500 MHz, CDCl3) δ 7.40 (dd, J = 6.9, 2.7 Hz, 1H), 7.36-7.29 (m, 1H), 7.28 (s, 1H), 7.17 (t, J = 57.3 Hz, 1H), 5.28 (s, 1H), 5.24 (s, 1H), 4.18 (s, 2H), 3.96 (s, 3H), 3.73-3.63 (m, 1H), 0.74-0.65 (m, 2H), 0.65-0.54 (m, 2H). |
| 9 | $^1$H NMR (500 MHz, CDCl3) δ 7.44-7.27 (m, 5H), 7.23 (t, J = 57.3 Hz, 1H), 5.26 (s, 1H), 5.18 (s, 1H), 4.36 (s, 2H), 3.96 (s, 3H), 3.72-3.64 (m, 1H), 0.73-0.65 (m, 2H), 0.65-0.57 (m, 2H). |

TABLE 1-continued

| Compound number | Nuclear magnetic data |
|---|---|
| 10 | $^1$H NMR (500 MHz, CDCl3) δ 7.53-7.40 (m, 2H), 7.24 (t, J = 57.3 Hz, 1H), 7.15-7.11 (m, 1H), 5.30 (s, 1H), 5.20 (s, 1H), 4.37 (s, 2H), 3.96 (s, 3H), 3.74-3.61 (m, 1H), 0.75-0.65 (m, 2H), 0.65-0.56 (m, 2H). |
| 11 | $^1$H NMR (500 MHz, CDCl3) δ 7.60-7.22 (m, 3H), 7.18 (t, J = 57.3 Hz, 1H), 5.30 (s, 1H), 5.20 (s, 1H), 4.37 (s, 2H), 3.96 (s, 3H), 3.73-3.62 (m, 1H), 0.74-0.65 (m, 2H), 0.65-0.57 (m, 2H). |
| 12 | $^1$H NMR (500 MHz, CDCl3) δ 7.24 (t, J = 57.3 Hz, 1H), 7.20-7.05 (m, 3H), 5.28 (s, 1H), 5.21 (s, 1H), 4.46 (s, 2H), 3.96 (s, 3H), 3.73-3.64 (m, 1H), 0.74-0.65 (m, 2H), 0.65-0.57 (m, 2H). |
| 13 | $^1$H NMR (500 MHz, CDCl3) δ 7.56 (d, J = 4.9 Hz, 1H), 7.23 (t, J = 57.3 Hz, 1H), 7.02 (d, J = 8.1 Hz, 1H), 5.28 (s, 1H), 5.22 (s, 1H), 4.18 (s, 2H), 3.96 (s, 3H), 3.71-3.64 (m, 1H), 0.74-0.65 (m, 2H), 0.65-0.56 (m, 2H). |
| 14 | $^1$H NMR (500 MHz, CDCl3) δ 7.41-7.35 (m, 3H), 7.23 (t, J = 57.3 Hz, 1H), 5.28 (s, 1H), 5.24 (s, 1H), 4.18 (s, 2H), 3.96 (s, 3H), 3.71-3.65 (m, 1H), 0.73-0.65 (m, 2H), 0.65-0.57 (m, 2H). |
| 15 | $^1$H NMR (500 MHz, CDCl3) δ 7.87-7.78 (m, 2H), 7.55 (d, J = 7.8 Hz, 2H), 7.23 (t, J = 57.3 Hz, 1H), 5.26 (s, 1H), 5.18 (s, 1H), 4.36 (s, 2H), 3.96 (s, 3H), 3.73-3.62 (m, 1H), 3.18 (s, 3H), 0.73-0.65 (m, 2H), 0.65-0.57 (m, 2H). |
| 16 | $^1$H NMR (500 MHz, CDCl3) δ 7.41-7.35 (m, 3H), 7.35-7.30 (m, 1H), 7.21 (t, J = 57.3 Hz, 1H), 5.30 (s, 1H), 5.20 (s, 1H), 4.37 (s, 2H), 3.96 (s, 3H), 3.71-3.64 (m, 1H), 0.73-0.65 (m, 2H), 0.65-0.57 (m, 2H). |
| 17 | $^1$H NMR (500 MHz, CDCl3) δ 7.36-7.27 (m, 4H), 7.21 (t, J = 57.3 Hz, 1H), 5.26 (s, 1H), 5.18 (s, 1H), 4.36 (s, 2H), 3.96 (s, 3H), 3.71-3.64 (m, 1H), 0.73-0.65 (m, 2H), 0.65-0.57 (m, 2H). |
| 18 | $^1$H NMR (500 MHz, CDCl3) δ 7.41-7.33 (m, 3H), 7.22 (t, J = 57.3 Hz, 1H), 5.23 (s, 1H), 5.16 (s, 1H), 4.42 (s, 2H), 3.96 (s, 3H), 3.72-3.63 (m, 1H), 0.74-0.65 (m, 2H), 0.65-0.56 (m, 2H). |
| 19 | $^1$H NMR (500 MHz, CDCl3) δ 7.25 (s, 2H), 7.17 (t, J = 57.3 Hz, 1H), 5.23 (s, 1H), 5.16 (s, 1H), 4.42 (s, 2H), 3.96 (s, 3H), 3.72-3.63 (m, 1H), 0.74-0.65 (m, 2H), 0.65-0.55 (m, 2H). |
| 20 | $^1$H NMR (500 MHz, CDCl3) δ 7.55 (ddd, J = 7.5, 5.0, 1.6 Hz, 1H), 7.45-7.38 (m, 1H), 7.24 (t, J = 57.3 Hz, 1H), 7.18-7.09 (m, 2H), 5.23 (s, 1H), 5.19 (s, 1H), 4.38 (s, 2H), 3.96 (s, 3H), 3.72-3.63 (m, 1H), 0.74-0.65 (m, 2H), 0.65-0.56 (m, 2H). |
| 21 | $^1$H NMR (500 MHz, CDCl3) δ 7.38-7.34 (m, 1H), 7.24 (t, J = 57.3 Hz, 1H), 7.20-7.07 (m, 3H), 5.30 (s, 1H), 5.20 (s, 1H), 4.37 (s, 2H), 3.96 (s, 3H), 3.72-3.62 (m, 1H), 0.74-0.65 (m, 2H), 0.65-0.56 (m, 2H). |
| 22 | $^1$H NMR (500 MHz, CDCl3) δ 7.44 (dd, J = 8.9, 5.0 Hz, 2H), 7.23 (t, J = 57.3 Hz, 1H), 7.05 (dd, J = 9.0, 8.0 Hz, 2H), 5.26 (s, 1H), 5.18 (s, 1H), 4.36 (s, 2H), 3.96 (s, 3H), 3.72-3.64 (m, 1H), 0.74-0.65 (m, 2H), 0.65-0.57 (m, 2H). |
| 23 | $^1$H NMR (500 MHz, CDCl3) δ 7.26 (t, J = 57.3 Hz, 1H), 7.23-7.10 (m, 1H), 6.88-6.79 (m, 2H), 5.25 (s, 1H), 5.18 (s, 1H), 4.38 (s, 2H), 3.96 (s, 3H), 3.71-3.64 (m, 1H), 0.74-0.65 (m, 2H), 0.65-0.56 (m, 2H). |
| 24 | $^1$H NMR (500 MHz, CDCl3) δ 7.20 (t, J = 57.3 Hz, 1H), 7.19-7.10 (m, 3H), 5.28 (s, 1H), 5.22 (s, 1H), 4.40 (s, 2H), 3.96 (s, 3H), 3.71-3.64 (m, 1H), 0.74-0.65 (m, 2H), 0.65-0.56 (m, 2H). |
| 25 | $^1$H NMR (500 MHz, CDCl3) δ 7.42 (tt, J = 7.9, 5.1 Hz, 1H), 7.23 (t, J = 57.3 Hz, 1H), 7.00 (td, J = 7.5, 0.9 Hz, 2H), 5.27 (s, 1H), 5.20 (s, 1H), 4.39 (s, 2H), 3.96 (s, 3H), 3.71-3.64 (m, 1H), 0.74-0.65 (m, 2H), 0.65-0.56 (m, 2H). |
| 26 | $^1$H NMR (500 MHz, CDCl3) δ 7.23 (t, J = 57.3 Hz, 1H), 6.67 (ddd, J = 8.3, 7.4, 0.9 Hz, 2H), 5.27 (s, 1H), 5.20 (s, 1H), 4.39 (s, 2H), 3.96 (s, 3H), 3.72-3.64 (m, 1H), 0.74-0.65 (m, 2H), 0.65-0.56 (m, 2H). |
| 27 | $^1$H NMR (500 MHz, CDCl3) δ 7.51-7.42 (m, 4H), 7.23 (t, J = 57.3 Hz, 1H), 5.26 (s, 1H), 5.18 (s, 1H), 4.36 (s, 2H), 3.96 (s, 3H), 3.71-3.64 (m, 1H), 0.74-0.65 (m, 2H), 0.65-0.56 (m, 2H). |
| 28 | $^1$H NMR (500 MHz, CDCl3) δ 7.66 (d, J = 1.9 Hz, 1H), 7.44 (dd, J = 9.2, 1.9 Hz, 1H), 7.32 (d, J = 28.5 Hz, 1H), 7.21 (t, J = 57.3 Hz, 1H), 5.23 (s, 1H), 5.16 (s, 1H), 4.39 (s, 2H), 3.96 (s, 3H), 3.71-3.64 (m, 1H), 0.74-0.65 (m, 2H), 0.65-0.56 (m, 2H). |
| 29 | $^1$H NMR (500 MHz, CDCl3) δ 7.59-7.48 (m, 3H), 7.23 (t, J = 57.3 Hz, 1H), 5.25 (s, 1H), 5.20 (s, 1H), 4.39 (s, 2H), 3.96 (s, 3H), 3.72-3.63 (m, 1H), 0.74-0.65 (m, 2H), 0.65-0.56 (m, 2H). |
| 30 | $^1$H NMR (500 MHz, CDCl3) δ 7.49 (d, J = 8.1 Hz, 2H), 7.23 (t, J = 57.3 Hz, 1H), 7.08 (t, J = 8.2 Hz, 1H), 5.28 (s, 1H), 5.20 (s, 1H), 4.17 (s, 2H), 3.96 (s, 3H), 3.71-3.64 (m, 1H), 0.74-0.65 (m, 2H), 0.65-0.56 (m, 2H). |
| 31 | $^1$H NMR (500 MHz, CDCl3) δ 7.62 (s, 2H), 7.23 (t, J = 57.3 Hz, 1H), 5.29 (s, 1H), 5.20 (s, 1H), 4.17 (s, 2H), 3.96 (s, 3H), 3.72-3.63 (m, 1H), 0.74-0.65 (m, 2H), 0.65-0.55 (m, 2H). |
| 32 | $^1$H NMR (500 MHz, CDCl3) δ 7.36-7.26 (m, 1H), 7.25 (t, J = 57.3 Hz, 1H), 7.18-7.11 (m, 3H), 5.30 (s, 1H), 5.20 (s, 1H), 4.37 (s,2H), 3.96 (s, 3H), 3.72-3.63 (m, 1H), 2.38 (s, 3H), 0.74-0.65 (m, 2H), 0.65-0.56 (m, 2H). |
| 33 | $^1$H NMR (500 MHz, CDCl3) δ 7.23 (t, J = 57.3 Hz, 1H), 7.09-6.91 (m, 3H), 5.24 (s, 1H), 5.17 (s, 1H), 4.31 (s, 2H), 3.96 (s, 3H), 3.71-3.64 (m, 1H), 2.28 (d, J = 1.0 Hz, 6H), 0.74-0.65 (m, 2H), 0.65-0.56 (m, 2H). |
| 34 | $^1$H NMR (500 MHz, CDCl3) δ 7.23 (t, J = 57.3 Hz, 1H), 7.11-7.07 (m, 1H), 7.07-7.00 (m, 2H), 5.27 (s, 1H), 5.23 (s, 1H), 4.33 (s, 2H), 3.96 (s, 3H), 3.71-3.64 (m, 1H), 2.37 (s, 3H), 2.34 (s, 3H), 0.74-0.65 (m, 2H), 0.65-0.56 (m, 2H). |
| 35 | $^1$H NMR (500 MHz, CDCl3) δ 7.24 (t, J = 57.3 Hz, 1H), 7.12-7.00 (m, 3H), 5.21 (s, 1H), 5.19 (s, 1H), 4.29 (s, 2H), 3.96 (s, 3H), 3.72-3.63 (m, 1H), 2.27 (s, 6H), 0.74-0.65 (m, 2H), 0.65-0.57 (m, 2H). |
| 36 | $^1$H NMR (500 MHz, CDCl3) δ 7.23 (t, J = 57.3 Hz, 1H), 6.80 (s, 2H), 5.21 (s, 1H), 5.19 (s, 1H), 4.29 (s, 2H), 3.96 (s, 3H), 3.72-3.63 (m, 1H), 2.26 (d, J = 0.9 Hz, 9H), 0.74-0.65 (m, 2H), 0.65-0.57 (m, 2H). |
| 37 | $^1$H NMR (500 MHz, CDCl3) δ 7.22 (t, J = 57.3 Hz, 1H), 7.15-7.05 (m, 3H), 5.27 (s, 1H), 5.23 (s, 1H), 4.33 (s, 2H), 3.96 (s, 3H), 3.71-3.64 (m, 1H), 3.08-2.99 (m, 1H), 2.34 (s, 3H), 1.27 (d, J = 6.6 Hz, 6H), 0.75-0.65 (m, 2H), 0.65-0.55 (m, 2H). |

TABLE 1-continued

| Compound number | Nuclear magnetic data |
|---|---|
| 38 | ¹H NMR (500 MHz, CDCl3) δ 7.26 (t, J = 57.3 Hz, 1H), 7.20-7.10 (m, 2H), 6.97-6.93 (m, 1H), 5.26 (s, 1H), 5.19 (s, 1H), 4.35 (s, 2H), 3.96 (s, 3H), 3.71-3.64 (m, 1H), 3.32-3.22 (m, 1H), 2.37 (s, 3H), 1.26 (d, J = 6.8 Hz, 6H), 0.75-0.65 (m, 2H), 0.65-0.55 (m, 2H). |
| 39 | ¹H NMR (500 MHz, CDCl3) δ 7.23 (t, J = 57.3 Hz, 1H), 7.11-6.92 (m, 3H), 5.27 (s, 1H), 5.21 (s, 1H), 4.35 (s, 2H), 3.96 (s, 3H), 3.71-3.64 (m, 1H), 2.37 (s, 3H), 1.34 (s, 9H), 0.75-0.64 (m, 2H), 0.64-0.55 (m, 2H). |
| 40 | ¹H NMR (500 MHz, CDCl3) δ 7.26 (t, J = 57.3 Hz, 1H), 7.23-7.04 (m, 3H), 5.27 (s, 1H), 5.23 (s, 1H), 4.34 (s, 2H), 3.96 (s, 3H), 3.72-3.63 (m, 1H), 2.34 (s, 3H), 1.33 (s, 9H), 0.74-0.65 (m, 2H), 0.65-0.56 (m, 2H). |
| 41 | ¹H NMR (500 MHz, CDCl3) δ 7.25 (t, J = 57.3 Hz, 1H), 7.18-7.06 (m, 3H), 5.24 (s, 1H), 5.17 (s, 1H), 4.31 (s, 2H), 3.96 (s, 3H), 3.71-3.64 (m, 1H), 2.94-2.86 (m, 1H), 2.34 (s, 3H), 1.27 (d, J = 6.6 Hz, 6H), 0.78-0.65 (m, 2H), 0.65-0.54 (m, 2H). |
| 42 | ¹H NMR (500 MHz, CDCl3) δ 7.37-7.31 (m, 1H), 7.24 (dd, J = 8.0, 1.9 Hz, 1H), 7.21 (t, J = 57.3 Hz, 1H), 7.18-7.11 (m, 1H), 5.23 (s, 1H), 5.19 (s, 1H), 4.38 (s, 2H), 3.96 (s, 3H), 3.71-3.64 (m, 1H), 0.74-0.65 (m, 2H), 0.65-0.56 (m, 2H). |
| 43 | ¹H NMR (500 MHz, CDCl3) δ 7.36-7.23 (m, 2H), 7.17 (t, J = 57.3 Hz, 1H), 7.01 (ddd, J = 9.1, 8.1, 1.8 Hz, 1H), 5.26 (s, 1H), 5.18 (s, 1H), 4.15 (s, 2H), 3.96 (s, 3H), 3.71-3.64 (m, 1H), 0.74-0.65 (m, 2H), 0.65-0.55 (m, 2H). |
| 44 | ¹H NMR (500 MHz, CDCl3) δ 7.39-7.32 (m, 2H), 7.23 (t, J = 57.3 Hz, 1H), 7.14-7.09 (m, 1H), 5.27 (s, 1H), 5.22 (s, 1H), 4.40 (s, 2H), 3.96 (s, 3H), 3.72-3.63 (m, 1H), 0.74-0.65 (m, 2H), 0.65-0.53 (m, 2H). |
| 45 | ¹H NMR (500 MHz, CDCl3) δ 7.55-7.48 (m, 3H), 7.23 (t, J = 57.3 Hz, 1H), 5.28 (s, 1H), 5.24 (s, 1H), 4.18 (s, 2H), 3.96 (s, 3H), 3.71-3.64 (m, 1H), 0.75-0.65 (m, 2H), 0.65-0.56 (m, 2H). |
| 46 | ¹H NMR (500 MHz, CDCl3) δ 7.52 (dd, J = 10.6, 1.1 Hz, 1H), 7.36-7.33 (m, 1H), 7.24 (t, J = 57.3 Hz, 1H), 7.17-7.10 (m, 1H), 5.28 (s, 1H), 5.24 (s, 1H), 4.18 (s, 2H), 3.96 (s, 3H), 3.72-3.63 (m, 1H), 0.74-0.65 (m, 2H), 0.65-0.55 (m, 2H). |
| 47 | ¹H NMR (500 MHz, CDCl3) δ 7.70-7.42 (m, 3H), 7.23 (t, J = 57.3 Hz, 1H), 5.26 (s, 1H), 5.18 (s, 1H), 4.18 (s, 2H), 3.96 (s, 3H), 3.73-3.63 (m, 1H), 0.74-0.65 (m, 2H), 0.65-0.55 (m, 2H). |
| 48 | ¹H NMR (500 MHz, CDCl3) δ 7.81 (d, J = 2.0 Hz, 1H), 7.71 (dd, J = 7.8, 1.9 Hz, 1H), 7.51 (d, J = 7.8 Hz, 1H), 7.23 (t, J = 57.3 Hz, 1H), 5.26 (s, 1H), 5.18 (s, 1H), 4.18 (s, 2H), 3.96 (s, 3H), 3.73-3.63 (m, 1H), 3.21 (s, 3H), 0.75-0.65 (m, 2H), 0.65-0.55 (m, 2H). |
| 49 | ¹H NMR (500 MHz, CDCl3) δ 7.80-7.71 (m, 2H), 7.54-7.44 (m, 2H), 7.23 (t, J = 57.3 Hz, 1H), 5.30 (s, 1H), 5.20 (s, 1H), 4.37 (s, 2H), 3.96 (s, 3H), 3.71-3.63 (m, 1H), 3.18 (s, 3H), 0.74-0.65 (m, 2H), 0.65-0.56 (m, 2H). |
| 50 | ¹H NMR (500 MHz, CDCl3) δ 7.93 (dd, J = 8.2, 1.8 Hz, 1H), 7.60 (dd, J = 6.3, 1.8 Hz, 1H), 7.50-7.38 (m, 2H), 7.23 (t, J = 57.3 Hz, 1H), 5.31 (s, 1H), 5.25 (s, 1H), 4.37 (s, 2H), 3.96 (s, 3H), 3.73-3.63 (m, 1H), 3.20 (s, 3H), 0.75-0.65 (m, 2H), 0.65-0.55 (m, 2H). |
| 51 | ¹H NMR (500 MHz, CDCl3) δ 7.95-7.50 (m, 3H), 7.23 (t, J = 57.3 Hz, 1H), 5.29 (s, 1H), 5.22 (s, 1H), 4.18 (s, 2H), 3.96 (s, 3H), 3.71-3.64 (m, 1H), 3.18 (s, 3H), 0.74-0.65 (m, 2H), 0.65-0.56 (m, 2H). |
| 52 | ¹H NMR (500 MHz, CDCl3) δ 7.82-7.76 (m, 2H), 7.58-7.52 (m, 2H), 7.23 (t, J = 57.3 Hz, 1H), 5.26 (s, 1H), 5.18 (s, 1H), 4.36 (s, 2H), 3.96 (s, 3H), 3.72-3.63 (m, 1H), 3.27 (q, J = 9.2 Hz, 2H), 1.27 (t, J = 9.2 Hz, 3H), 0.76-0.65 (m, 2H), 0.65-0.54 (m, 2H). |
| 53 | ¹H NMR (500 MHz, CDCl3) δ 7.97 (t, J = 1.4 Hz, 1H), 7.80-7.73 (m, 1H), 7.55-7.46 (m, 2H), 7.23 (t, J = 57.3 Hz, 1H), 5.30 (s, 1H), 5.20 (s, 1H), 4.37 (s, 2H), 3.96 (s, 3H), 3.73-3.63 (m, 1H), 3.28 (q, J = 9.1 Hz, 2H), 1.26 (t, J = 9.1 Hz, 3H), 0.75-0.65 (m, 2H), 0.65-0.53 (m, 2H). |
| 54 | ¹H NMR (500 MHz, CDCl3) δ 7.53 (d, J = 1.9 Hz, 1H), 7.38-7.31 (m, 2H), 7.24 (t, J = 57.3 Hz, 1H), 5.26 (s, 1H), 5.18 (s, 1H), 4.18 (s, 2H), 3.96 (s, 3H), 3.71-3.64 (m, 1H), 2.99-2.90 (m, 1H), 1.23 (s, 2H), 1.18 (s, 2H), 0.74-0.65 (m, 2H), 0.65-0.56 (m, 2H). |
| 55 | ¹H NMR (500 MHz, CDCl3) δ 7.43 (dd, J = 7.6, 4.9 Hz, 1H), 7.36-7.30 (m, 1H), 7.25 (t, J = 57.3 Hz, 1H), 7.23-7.09 (m, 1H), 5.23 (s, 1H), 5.19 (s, 1H), 4.38 (s, 2H), 3.96 (s, 3H), 3.72-3.63 (m, 1H), 2.99-2.90 (m, 1H), 1.31-1.21 (m, 2H), 1.21-1.12 (m, 2H), 0.78-0.65 (m, 2H), 0.65-0.51 (m, 2H). |
| 56 | ¹H NMR (500 MHz, CDCl3) δ 7.36 (ddd, J = 7.9, 6.5, 4.9 Hz, 1H), 7.20 (t, J = 57.3 Hz, 1H), 7.16-7.09 (m, 1H), 7.06-6.98 (m, 2H), 5.24 (s, 1H), 5.19 (s, 1H), 4.86 (q, J = 7.5, 0.9 Hz, 1H), 3.96 (s, 3H), 3.76 (p, J = 5.7 Hz, 1H), 1.24 (d, J = 7.7 Hz, 3H), 0.77-0.72 (m, 2H), 0.72-0.66 (m, 2H). |
| 57 | ¹H NMR (500 MHz, CDCl3) δ 7.40-7.31 (m, 3H), 7.23 (t, J = 57.3 Hz, 1H), 7.17-7.09 (m, 1H), 5.23 (s, 1H), 5.19 (s, 1H), 4.86 (q, J = 7.5, 1.0 Hz, 1H), 3.96 (s, 3H), 3.80-3.73 (m, 1H), 1.24 (d, J = 7.7 Hz, 3H), 0.78-0.72 (m, 2H), 0.72-0.65 (m, 2H). |
| 58 | ¹H NMR (500 MHz, CDCl3) δ 7.41 (ddd, J = 8.7, 7.4, 5.0 Hz, 2H), 7.23 (t, J = 57.3 Hz, 1H), 7.18-7.08 (m, 2H), 5.23 (s, 1H), 5.15 (s, 1H), 4.82 (q, J = 7.5, 1.1 Hz, 1H), 3.96 (s, 3H), 3.79-3.72 (m, 1H), 1.25 (d, J = 7.5 Hz, 3H), 0.78-0.72 (m, 2H), 0.72-0.66 (m, 2H). |
| 59 | ¹H NMR (500 MHz, CDCl3) δ 7.33-7.28 (m, 2H), 7.19 (t, J = 57.3 Hz, 1H), 6.90 (d, J = 1.3 Hz, 1H), 6.89 (d, J = 1.3 Hz, 1H), 5.26 (s, 1H), 5.17 (s, 1H), 4.81 (q, J = 7.7, 1.1 Hz, 1H), 3.96 (s, 3H), 3.81-3.72 (m, 1H), 1.23 (d, J = 7.5 Hz, 3H), 0.80-0.72 (m, 2H), 0.72-0.64 (m, 2H). |
| 60 | ¹H NMR (500 MHz, CDCl3) δ 7.22 (t, J = 57.3 Hz, 1H), 7.11-7.02 (m, 4H), 5.26 (s, 1H), 5.17 (s, 1H), 4.81 (q, J = 7.7, 1.1 Hz, 1H), 3.96 (s, 3H), 3.80-3.72 (m, 1H), 2.38 (s, 3H), 1.23 (d, J = 7.5 Hz, 3H), 0.78-0.72 (m, 2H), 0.72-0.66 (m, 2H). |
| 61 | ¹H NMR (500 MHZ, CDCl3) δ 7.34-7.29 (m, 2H), 7.20 (t, J = 59.5 Hz, 1H), 6.87 (d, J = 1.4 Hz, 1H), 6.85 (d, J = 1.3 Hz, 1H), 5.26 (s, 1H), 5.17 (s, 1H), 4.81 (q, J = 7.7, 1.1 Hz, 1H), 3.96 (s, 3H), 3.82 (s, 3H), 3.80-3.71 (m, 1H), 1.23 (d, J = 7.5 Hz, 3H), 0.78-0.72 (m, 2H), 0.72-0.67 (m, 2H). |
| 62 | ¹H NMR (500 MHz, CDCl3) δ 7.23 (t, J = 57.3 Hz, 1H), 7.18-7.08 (m, 2H), 7.01 (ddd, J = 9.8, 5.0, 2.2 Hz, 1H), 5.24 (s, 1H), 5.19 (s, 1H), 4.86 (q, J = 7.6, 0.9 Hz, 1H), 3.96 (s, 3H), 3.81-3.72 (m, 1H), 1.24 (d, J = 7.7 Hz, 3H), 0.78-0.72 (m, 2H), 0.72-0.66 (m, 2H). |

TABLE 1-continued

| Compound number | Nuclear magnetic data |
|---|---|
| 63 | $^1$H NMR (500 MHz, CDCl3) δ 7.21 (t, J = 57.3 Hz, 1H), 6.94-6.86 (m, 3H), 5.29 (s, 1H), 5.22 (s, 1H), 4.23 (q, J = 7.7, 1.1 Hz, 1H), 3.96 (s, 3H), 3.79-3.73 (m, 1H), 1.24 (d, J = 7.7 Hz, 3H), 0.77-0.72 (m, 2H), 0.72-0.67 (m, 2H). |
| 64 | $^1$H NMR (500 MHz, CDCl3) δ 7.19 (t, J = 57.3 Hz, 1H), 7.10-7.07 (m, 1H), 6.91 (td, J = 8.3, 2.7 Hz, 1H), 6.83 (td, J = 8.0, 2.7 Hz, 1H), 5.23 (s, 1H), 5.16 (s, 1H), 4.82 (q, J = 7.5, 1.1 Hz, 1H), 3.96 (s, 3H), 3.80-3.70 (m, 1H), 1.25 (d, J = 7.5 Hz, 3H), 0.77-0.72 (m, 2H), 0.72-0.67 (m, 2H). |
| 65 | $^1$H NMR (500 MHz, CDCl3) δ 7.47-7.41 (m, 2H), 7.21 (t, J = 57.3 Hz, 1H), 7.07 (dd, J = 8.9, 2.3 Hz, 1H), 5.24 (s, 1H), 5.19 (s, 1H), 4.86 (q, J = 7.5, 1.0 Hz, 1H), 3.96 (s, 3H), 3.80-3.73 (m, 1H), 1.24 (d, J = 7.7 Hz, 3H), 0.79-0.72 (m, 2H), 0.72-0.65 (m, 2H). |
| 66 | $^1$H NMR (500 MHz, CDCl3) δ 7.52-7.46 (m, 2H), 7.36-7.33 (m, 2H), 7.21 (t, J = 57.3 Hz, 1H), 5.26 (s, 1H), 5.17 (s, 1H), 4.81 (q, J = 7.7, 1.1 Hz, 1H), 3.96 (s, 3H), 3.79-3.72 (m, 1H), 1.23 (d, J = 7.5 Hz, 3H), 0.79-0.72 (m, 2H), 0.72-0.65 (m, 2H). |
| 67 | $^1$H NMR (500 MHz, CDCl3) δ 7.41 (d, J = 2.1 Hz, 1H), 7.34-7.24 (m, 1H), 7.21 (t, J = 57.3 Hz, 1H), 7.14 (d, J = 47.5 Hz, 1H), 5.21 (s, 1H), 5.15 (s, 1H), 4.87 (q, J = 7.7, 1.0 Hz, 1H), 3.96 (s, 3H), 3.78-3.72 (m, 1H), 1.24 (d, J = 7.5 Hz, 3H), 0.78-0.72 (m, 2H), 0.72-0.66 (m, 2H). |
| 68 | $^1$H NMR (500 MHz, CDCl3) δ 7.36-7.28 (m, 2H), 7.20 (t, J = 57.3 Hz, 1H), 7.06-7.00 (m, 2H), 5.26 (s, 1H), 5.18 (s, 1H), 4.81 (q, J = 7.7, 1.1 Hz, 1H), 3.96 (s, 3H), 3.80-3.72 (m, 1H), 1.23 (d, J = 7.5 Hz, 3H), 0.79-0.72 (m, 2H), 0.72-0.66 (m, 2H). |
| 69 | $^1$H NMR (500 MHz, CDCl3) δ 7.34-7.22 (m, 1H), 7.17 (t, J = 57.3 Hz, 1H), 6.98-6.91 (m, 2H), 6.79 (dd, J = 2.6, 1.9 Hz, 1H), 5.24 (s, 1H), 5.19 (s, 1H), 4.86 (q, J = 7.5, 1.0 Hz, 1H), 3.96 (s, 3H), 3.82 (s, 3H), 3.80-3.73 (m, 1H), 1.24 (d, J = 7.7 Hz, 3H), 0.77-0.72 (m, 2H), 0.72-0.67 (m, 2H). |
| 70 | $^1$H NMR (500 MHz, CDCl3) δ 7.27 (t, J = 57.3 Hz, 1H), 7.18-7.00 (m, 4H), 5.23 (s, 1H), 5.19 (s, 1H), 4.86 (q, J = 7.5, 0.9 Hz, 1H), 3.96 (s, 3H), 3.79-3.73 (m, 1H), 2.38 (s, 3H), 1.23 (d, J = 7.5 Hz, 3H), 0.77-0.72 (m, 2H), 0.72-0.67 (m, 2H). |
| 71 | $^1$H NMR (500 MHz, CDCl3) δ 7.69-7.58 (m, 2H), 7.36-7.32 (m, 2H), 7.23 (t, J = 57.3 Hz, 1H), 5.26 (s, 1H), 5.17 (s, 1H), 4.79 (q, J = 7.5, 0.9 Hz, 1H), 3.96 (s, 3H), 3.80-3.73 (m, 1H), 1.24 (d, J = 7.5 Hz, 3H), 0.77-0.72 (m, 2H), 0.72-0.65 (m, 2H). |
| 72 | $^1$H NMR (500 MHz, CDCl3) δ 7.44-7.27 (m, 4H), 7.21 (t, J = 57.3 Hz, 1H), 5.21 (s, 1H), 5.15 (s, 1H), 4.87 (q, J = 7.7, 1.0 Hz, 1H), 3.96 (s, 3H), 3.78-3.72 (m, 1H), 1.24 (d, J = 7.5 Hz, 3H), 0.78-0.72 (m, 2H), 0.72-0.66 (m, 2H). |
| 73 | $^1$H NMR (500 MHz, CDCl3) δ 7.41-7.33 (m, 3H), 7.15 (t, J = 57.3 Hz, 1H), 5.23 (s, 1H), 5.20 (s, 1H), 4.28 (q, J = 7.5, 0.9 Hz, 1H), 3.96 (s, 3H), 3.79-3.72 (m, 1H), 1.25 (d, J = 7.5 Hz, 3H), 0.77-0.72 (m, 2H), 0.72-0.66 (m, 2H). |
| 74 | $^1$H NMR (500 MHz, CDCl3) δ 7.29 (s, 2H), 7.15 (t, J = 57.3 Hz, 1H), 5.22 (s, 1H), 5.19 (s, 1H), 4.28 (q, J = 7.5, 0.9 Hz, 1H), 3.96 (s, 3H), 3.79-3.72 (m, 1H), 1.25 (d, J = 7.5 Hz, 3H), 0.79-0.72 (m, 2H), 0.72-0.66 (m, 2H). |
| 75 | $^1$H NMR (500 MHz, CDCl3) δ 7.42-7.32 (m, 2H), 7.24 (t, J = 57.3 Hz, 1H), 7.18-7.08 (m, 1H), 5.30 (s, 1H), 5.23 (s, 1H), 4.34 (q, J = 7.5, 0.9 Hz, 1H), 3.96 (s, 3H), 3.79-3.72 (m, 1H), 1.24 (d, J = 7.5 Hz, 3H), 0.78-0.72 (m, 2H), 0.72-0.66 (m, 2H). |
| 76 | $^1$H NMR (500 MHz, CDCl3) δ 7.50 (d, J = 2.3 Hz, 1H), 7.41-7.34 (m, 2H), 7.21 (t, J = 57.3 Hz, 1H), 5.31 (s, 1H), 5.24 (s, 1H), 4.34 (q, J = 7.5, 0.9 Hz, 1H), 3.96 (s, 3H), 3.79-3.71 (m, 1H), 1.24 (d, J = 7.5 Hz, 3H), 0.78-0.72 (m, 2H), 0.72-0.66 (m, 2H). |
| 77 | $^1$H NMR (500 MHz, CDCl3) δ 7.34-7.29 (m, 1H), 7.23 (t, J = 57.3 Hz, 1H), 7.19-7.09 (m, 2H), 5.23 (s, 1H), 5.19 (s, 1H), 4.88 (q, J = 7.7, 1.0 Hz, 1H), 3.96 (s, 3H), 3.79-3.72 (m, 1H), 1.25 (d, J = 7.5 Hz, 3H), 0.78-0.72 (m, 2H), 0.72-0.67 (m, 2H). |
| 78 | $^1$H NMR (500 MHz, CDCl3) δ 7.42 (tt, J = 7.9, 5.1 Hz, 1H), 7.21 (t, J = 57.3 Hz, 1H), 7.04-6.98 (m, 2H), 5.28 (s, 1H), 5.23 (s, 1H), 4.83 (q, J = 7.5, 1.1 Hz, 1H), 3.96 (s, 3H), 3.79-3.72 (m, 1H), 1.25 (d, J = 7.5 Hz, 3H), 0.77-0.72 (m, 2H), 0.72-0.67 (m, 2H). |
| 79 | $^1$H NMR (500 MHz, CDCl3) δ 7.21 (t, J = 57.3 Hz, 1H), 6.67 (ddd, J = 8.3, 7.4, 1.0 Hz, 2H), 5.28 (s, 1H), 5.23 (s, 1H), 4.83 (q, J = 7.5, 0.9 Hz, 1H), 3.96 (s, 3H), 3.78-3.72 (m, 1H), 1.25 (d, J = 7.5 Hz, 3H), 0.78-0.72 (m, 2H), 0.72-0.67 (m, 2H). |
| 80 | $^1$H NMR (500 MHz, CDCl3) δ 7.67-7.61 (m, 1H), 7.44-7.30 (m, 3H), 7.15 (t, J = 57.3 Hz, 1H), 5.19 (s, 1H), 5.11 (s, 1H), 4.83 (q, J = 7.5, 0.9 Hz, 1H), 3.96 (s, 3H), 3.79-3.72 (m, 1H), 1.24 (d, J = 7.5 Hz, 3H), 0.78-0.72 (m, 2H), 0.72-0.65 (m, 2H). |
| 81 | $^1$H NMR (500 MHz, CDCl3) δ 7.54 (dt, J = 7.9, 1.6 Hz, 1H), 7.42 (t, J = 1.9 Hz, 1H), 7.29 (dd, J = 8.0, 6.8 Hz, 1H), 7.27-7.21 (m, 1H), 7.21 (t, J = 57.3 Hz, 1H), 5.23 (s, 1H), 5.19 (s, 1H), 4.90-4.82 (m, 1H), 3.96 (s, 2H), 3.80-3.72 (m, 1H), 1.24 (d, J = 7.7 Hz, 3H), 0.79-0.66 (m, 4H). |
| 82 | $^1$H NMR (500 MHz, CDCl3) δ 7.71 (d, J = 1.9 Hz, 1H), 7.47 (dd, J = 9.0, 2.0 Hz, 1H), 7.34-7.23 (m, 1H), 7.15 (t, J = 57.3 Hz, 1H), 5.18 (s, 1H), 5.09 (s, 1H), 4.83 (q, J = 7.5 Hz, 1H), 3.96 (s, 3H), 3.79-3.71 (m, 1H), 1.24 (d, J = 7.5 Hz, 3H), 0.77-0.72 (m, 2H), 0.72-0.67 (m, 2H). |
| 83 | $^1$H NMR (500 MHz, CDCl3) δ 7.65-7.58 (m, 2H), 7.51 (dd, J = 7.9, 2.6 Hz, 1H), 7.21 (t, J = 57.3 Hz, 1H), 5.24 (s, 1H), 5.18 (s, 1H), 4.88 (d, J = 7.5 Hz, 1H), 3.96 (s, 3H), 3.79-3.72 (m, 1H), 1.24 (d, J = 7.5 Hz, 3H), 0.77-0.72 (m, 2H), 0.72-0.67 (m, 2H). |
| 84 | $^1$H NMR (500 MHz, CDCl3) δ 7.52 (d, J = 8.3 Hz, 2H), 7.21 (t, J = 57.3 Hz, 1H), 7.07 (d, J = 8.1 Hz, 1H), 5.23 (s, 1H), 5.22 (s, 1H), 4.82 (q, J = 7.6, 1.1 Hz, 1H), 3.96 (s, 3H), 3.78-3.72 (m, 1H), 1.25 (d, J = 7.5 Hz, 3H), 0.78-0.72 (m, 2H), 0.72-0.66 (m, 2H). |
| 85 | $^1$H NMR (500 MHz, CDCl3) δ 7.68 (s, 2H), 7.21 (t, J = 57.3 Hz, 1H), 5.23 (s, 1H), 5.22 (s, 1H), 4.82 (d, J = 7.5 Hz, 1H), 3.96 (s, 3H), 3.78-3.72 (m, 1H), 1.25 (d, J = 7.5 Hz, 3H), 0.78-0.72 (m, 2H), 0.72-0.66 (m, 2H). |
| 86 | $^1$H NMR (500 MHz, CDCl3) δ 7.60 (dd, J = 7.9, 1.5 Hz, 1H), 7.36-7.30 (m, 1H), 7.24 (t, J = 57.3 Hz, 1H), 7.19-7.10 (m, 1H), 5.25 (s, 1H), 5.20 (s, 1H), 4.39 (s, 1H), 4.14 (s, 1H), 3.96 (s, 3H), 3.71-3.64 (m, 1H), 0.74-0.65 (m, 2H), 0.65-0.56 (m, 2H). |
| 87 | $^1$H NMR (500 MHz, CDCl3) δ 7.33-7.26 (m, 1H), 7.26-7.21 (m, 1H), 7.19 (t, J = 57.3 Hz, 1H), 7.17-7.09 (m, 2H), 5.22 (s, 1H), 5.14 (s, 1H), 4.74 (d, J = 7.5 Hz, 1H), 3.96 (s, 3H), 3.79-3.73 (m, 1H), 2.35 (s, 3H), 1.24 (d, J = 7.5 Hz, 3H), 0.77-0.72 (m, 2H), 0.72-0.67 (m, 2H). |

TABLE 1-continued

| Compound number | Nuclear magnetic data |
|---|---|
| 88 | ¹H NMR (500 MHz, CDCl3) δ 7.21 (t, J = 57.3 Hz, 1H), 7.00-6.89 (m, 3H), 5.22 (s, 1H), 5.14 (s, 1H), 4.74 (d, J = 7.5 Hz, 1H), 3.96 (s, 3H), 3.79-3.73 (m, 1H), 2.29 (s, 3H), 2.28 (s, 3H), 1.24 (d, J = 7.5 Hz, 3H), 0.77-0.72 (m, 2H), 0.72-0.66 (m, 2H). |
| 89 | ¹H NMR (500 MHz, CDCl3) δ 7.27 (t, J = 57.3 Hz, 1H), 7.10-7.01 (m, 3H), 5.26 (s, 1H), 5.18 (s, 1H), 4.79 (d, J = 7.5 Hz, 1H), 3.96 (s, 3H), 3.80-3.73 (m, 1H), 2.37 (d, J = 0.9 Hz, 6H), 1.24 (d, J = 7.5 Hz, 3H), 0.77-0.72 (m, 2H), 0.72-0.67 (m, 2H). |
| 90 | ¹H NMR (500 MHz, CDCl3) δ 7.22 (t, J = 57.3 Hz, 1H), 7.12-6.98 (m, 3H), 5.03 (s, 1H), 5.03 (s, 1H), 4.64 (q, J = 7.5 Hz, 1H), 3.96 (s, 3H), 3.79-3.73 (m, 1H), 2.29 (s, 6H), 1.25 (d, J = 7.6 Hz, 3H), 0.77-0.72 (m, 2H), 0.72-0.67 (m, 2H). |
| 91 | ¹H NMR (500 MHz, CDCl3) δ 7.21 (t, J = 57.3 Hz, 1H), 6.78 (s, 2H), 5.03 (s, 1H), 5.03 (s, 1H), 4.64 (q, J = 7.5 Hz, 1H), 3.96 (s, 3H), 3.79-3.73 (m, 1H), 2.26 (s, 3H), 2.25 (s, 6H), 1.25 (d, J = 7.6 Hz, 3H), 0.77-0.72 (m, 2H), 0.72-0.66 (m, 2H). |
| 92 | ¹H NMR (500 MHz, CDCl3) δ 7.20 (t, J = 57.3 Hz, 1H), 7.16-7.08 (m, 3H), 5.26 (s, 1H), 5.18 (s, 1H), 4.79 (q, J = 7.5 Hz, 1H), 3.96 (s, 3H), 3.80-3.73 (m, 1H), 3.08-2.99 (m, 1H), 2.37 (s, 3H), 1.30 (d, J = 6.6 Hz, 3H), 1.25 (d, J = 1.1 Hz, 3H), 1.24 (d, J = 2.0 Hz, 3H), 0.78-0.72 (m, 2H), 0.72-0.64 (m, 2H). |
| 93 | (500 MHz, CDCl3) δ 7.25 (t, J = 57.3 Hz, 1H), 7.21-6.93 (m, 3H), 5.26 (s, 1H), 5.17 (s, 1H), 4.78 (q, J = 7.5 Hz, 1H), 3.96 (s, 3H), 3.79-3.73 (m, 1H), 3.26-3.16 (m, 1H), 2.37 (s, 3H), 1.28 (d, J = 6.9 Hz, 3H), 1.25 (d, J = 5.9 Hz, 3H), 1.23 (d, J = 5.2 Hz, 3H), 0.78-0.72 (m, 2H), 0.72-0.67 (m, 2H). |
| 94 | ¹H NMR (500 MHz, CDCl3) δ 7.21 (t, J = 57.3 Hz, 1H), 7.08 (d, J = 7.5 Hz, 1H), 6.97-6.86 (m, 2H), 5.26 (s, 1H), 5.20 (s, 1H), 4.83 (q, J = 7.5 Hz, 1H), 3.96 (s, 3H), 3.79-3.73 (m, 1H), 2.37 (s, 3H), 1.34 (s, 9H), 1.24 (d, J = 7.5 Hz, 3H), 0.78-0.72 (m, 2H), 0.72-0.67 (m, 2H). |
| 95 | ¹H NMR (500 MHz, CDCl3) δ 7.34-7.22 (m, 1H), 7.18 (t, J = 57.3 Hz, 1H), 7.07-7.00 (m, 2H), 5.26 (s, 1H), 5.18 (s, 1H), 4.79 (q, J = 7.5 Hz, 1H), 3.96 (s, 3H), 3.79-3.73 (m, 1H), 2.37 (s, 3H), 1.33 (s, 9H), 1.24 (d, J = 7.5 Hz, 3H), 0.78-0.72 (m, 2H), 0.72-0.64 (m, 2H). |
| 96 | ¹H NMR (500 MHz, CDCl3) δ 7.21 (t, J = 57.3 Hz, 1H), 7.08 (dt, J = 2.7, 1.2 Hz, 3H), 5.22 (s, 1H), 5.14 (s, 1H), 4.74 (q, J = 7.5 Hz, 1H), 3.96 (s, 3H), 3.80-3.71 (m, 1H), 2.95-2.86 (m, 1H), 2.35 (s, 3H), 1.30 (d, J = 6.6 Hz, 3H), 1.25 (s, 3H), 1.24 (d, J = 0.7 Hz, 3H), 0.78-0.72 (m, 2H), 0.72-0.66 (m, 2H). |
| 97 | ¹H NMR (500 MHz, CDCl3) δ 7.34-7.20 (m, 3H), 7.18 (t, J = 57.3 Hz, 1H), 5.23 (s, 1H), 5.15 (s, 1H), 4.82 (q, J = 7.5 Hz, 1H), 3.96 (s, 3H), 3.81-3.69 (m, 1H), 1.25 (d, J = 7.5 Hz, 3H), 0.77-0.72 (m, 2H), 0.72-0.67 (m, 2H). |
| 98 | ¹H NMR (500 MHz, CDCl3) δ 7.27 (t, J = 57.3 Hz, 1H), 7.24-7.09 (m, 2H), 7.05 (ddd, J = 9.0, 8.1, 1.8 Hz, 1H), 5.23 (s, 1H), 5.15 (s, 1H), 4.87 (q, J = 7.5 Hz, 1H), 3.96 (s, 3H), 3.80-3.72 (m, 1H), 1.24 (d, J = 7.5 Hz, 3H), 0.78-0.72 (m, 2H), 0.72-0.66 (m, 2H). |
| 99 | ¹H NMR (500 MHz, CDCl3) δ 7.49 (dd, J = 5.1, 2.5 Hz, 1H), 7.35 (ddd, J = 7.3, 4.9, 2.4 Hz, 1H), 7.23 (t, J = 57.3 Hz, 1H), 7.15-7.07 (m, 1H), 5.23 (s, 1H), 5.19 (s, 1H), 4.87 (q, J = 7.5 Hz, 1H), 3.96 (s, 3H), 3.79-3.72 (m, 1H), 1.25 (d, J = 7.5 Hz, 3H), 0.79-0.72 (m, 2H), 0.72-0.65 (m, 2H). |
| 100 | ¹H NMR (500 MHz, CDCl3) δ 7.65-7.43 (m, 3H), 7.21 (t, J = 57.3 Hz, 1H), 5.31 (s, 1H), 5.23 (s, 1H), 4.34 (q, J = 7.5 Hz, 1H), 3.96 (s, 3H), 3.79-3.71 (m, 1H), 1.24 (d, J = 7.5 Hz, 3H), 0.78-0.72 (m, 2H), 0.72-0.66 (m, 2H). |
| 101 | ¹H NMR (500 MHz, CDCl3) δ 7.52 (dd, J = 10.6, 1.3 Hz, 1H), 7.36-7.28 (m, 1H), 7.21 (t, J = 57.3 Hz, 1H), 7.20-7.07 (m, 1H), 5.32 (s, 1H), 5.24 (s, 1H), 4.34 (q, J = 7.5, 0.9 Hz, 1H), 3.96 (s, 3H), 3.79-3.72 (m, 1H), 1.24 (d, J = 7.5 Hz, 3H), 0.78-0.72 (m, 2H), 0.72-0.67 (m, 2H). |
| 102 | ¹H NMR (500 MHz, CDCl3) δ 7.71-7.55 (m, 2H), 7.36 (d, J = 11.6 Hz, 1H), 7.21 (q, J = 57.3 Hz, 1H), 5.21 (s, 1H), 5.15 (s, 1H), 4.87 (q, J = 7.7, 1.0 Hz, 1H), 3.96 (s, 3H), 3.79-3.72 (m, 1H), 1.24 (d, J = 7.5 Hz, 3H), 0.78-0.72 (m, 2H), 0.72-0.66 (m, 2H). |
| 103 | ¹H NMR (500 MHz, CDCl3) δ 7.75 (d, J = 1.9 Hz, 1H), 7.70 (dd, J = 8.1, 2.0 Hz, 1H), 7.57 (d, J = 8.1 Hz, 1H), 7.21 (t, J = 57.3 Hz, 1H), 5.21 (s, 1H), 5.15 (s, 1H), 4.87 (q, J = 7.7, 1.0 Hz, 1H), 3.96 (s, 3H), 3.75 (p, J = 5.8 Hz, 1H), 3.21 (s, 3H), 1.24 (d, J = 7.5 Hz, 3H), 0.77-0.72 (m, 2H), 0.72-0.67 (m, 2H). |
| 104 | ¹H NMR (500 MHz, CDCl3) δ 7.75 (ddd, J = 8.6, 2.0, 1.2 Hz, 1H), 7.51 (t, J = 2.0 Hz, 1H), 7.48 (dd, J = 8.5, 6.7 Hz, 1H), 7.35-7.07 (m, 2H), 7.21 (t, J = 57.3 Hz, 1H), 5.24 (s, 1H), 5.19 (s, 1H), 4.86 (q, J = 7.5, 0.9 Hz, 1H), 3.96 (s, 3H), 3.80-3.72 (m, 1H), 3.18 (s, 3H), 1.24 (d, 3H), 0.78-0.72 (m, 2H), 0.72-0.67 (m, 2H). |
| 105 | ¹H NMR (500 MHz, CDCl3) δ 7.92 (dd, J = 8.2, 1.9 Hz, 1H), 7.63 (dd, J = 6.5, 1.8 Hz, 1H), 7.49-7.40 (m, 2H), 7.21 (t, J = 57.3 Hz, 1H), 5.26 (s, 1H), 5.20 (s, 1H), 4.89 (q, J = 7.5, 1.0 Hz, 1H), 3.96 (s, 3H), 3.79-3.71 (m, 1H), 3.20 (s, 3H), 1.24 (d, J = 7.5 Hz, 3H), 0.78-0.72 (m, 2H), 0.72-0.67 (m, 2H). |
| 106 | ¹H NMR (500 MHz, CDCl3) δ 7.70-7.60 (m, 2H), 7.56 (d, J = 9.3 Hz, 1H), 7.21 (t, J = 57.3 Hz, 1H), 5.31 (s, 1H), 5.24 (s, 1H), 4.34 (q, J = 7.5, 0.9 Hz, 1H), 3.96 (s, 3H), 3.80-3.72 (m, 1H), 3.18 (s, 3H), 1.24 (d, J = 7.5 Hz, 3H), 0.78-0.72 (m, 2H), 0.72-0.67 (m, 2H). |
| 107 | ¹H NMR (500 MHz, CDCl3) δ 7.84-7.74 (m, 2H), 7.51-7.43 (m, 2H), 7.21 (t, J = 57.3 Hz, 1H), 5.26 (s, 1H), 5.17 (s, 1H), 4.81 (q, J = 7.7, 1.1 Hz, 1H), 3.96 (s, 3H), 3.80-3.73 (m, 1H), 3.27 (q, J = 9.2, 1.4 Hz, 2H), 1.27 (d, J = 9.2 Hz, 3H), 1.23 (d, J = 7.5 Hz, 3H), 0.77-0.72 (m, 2H), 0.72-0.67 (m, 2H). |
| 108 | ¹H NMR (500 MHz, CDCl3) δ 7.77 (ddd, J = 8.4, 1.8, 1.1 Hz, 1H), 7.66-7.46 (m, 2H), 7.35-7.31 (m, 1H), 7.21 (t, J = 57.3 Hz, 1H), 5.24 (s, 1H), 5.19 (s, 1H), 4.86 (q, J = 7.5, 0.9 Hz, 1H), 3.96 (s, 3H), 3.80-3.72 (m, 1H), 3.28 (q, J = 9.2, 2.6 Hz, 2H), 1.26 (t, J = 9.2 Hz, 3H), 1.24 (d, J = 7.5 Hz, 3H), 0.78-0.72 (m, 2H), 0.72-0.66 (m, 2H). |
| 109 | ¹H NMR (500 MHz, CDCl3) δ 7.51 (d, J = 1.5 Hz, 1H), 7.36-7.32 (m, 2H), 7.21 (t, J = 57.3 Hz, 1H), 5.21 (s, 1H), 5.15 (s, 1H), 4.87 (q, J = 7.7, 1.0 Hz, 1H), 3.96 (s, 3H), 3.79-3.71 (m, 1H), 2.98-2.90 (m, 1H), 1.25 (d, J = 7.5 Hz, 3H), 1.24-1.20 (m, 2H), 1.20-1.13 (m, 2H), 0.78-0.72 (m, 2H), 0.72-0.67 (m, 2H). |

TABLE 1-continued

| Compound number | Nuclear magnetic data |
|---|---|
| 110 | ¹H NMR (500 MHz, CDCl3) δ 7.34-7.21 (m, 3H), 7.18 (t, J = 57.3 Hz, 1H), 5.23 (s, 1H), 5.16 (s, 1H), 4.82 (q, J = 7.5, 1.1 Hz, 1H), 3.96 (s, 3H), 3.79-3.72 (m, 1H), 2.99-2.91 (m, 1H), 1.25 (d, J = 7.5 Hz, 3H), 1.24-1.20 (m, 2H), 1.20-1.13 (m, 2H), 0.78-0.72 (m, 2H), 0.72-0.67 (m, 2H). |
| 111 | ¹H NMR (500 MHz, CDCl3) δ 7.49-7.45 (m, 2H), 7.42-7.37 (m, 1H), 7.35-7.30 (m, 2H), 7.25 (t, J = 57.3 Hz, 1H), 4.66 (s, 2H), 3.96 (s, 3H), 3.64-3.57 (m, 1H), 0.74-0.65 (m, 2H), 0.65-0.55 (m, 2H). |
| 112 | ¹H NMR (500 MHz, CDCl3) δ 7.57-7.52 (m, 2H), 7.36-7.28 (m, 2H), 7.21 (t, J = 57.3 Hz, 1H), 4.66 (s, 2H), 3.96 (s, 3H), 3.64-3.56 (m, 1H), 0.75-0.65 (m, 2H), 0.65-0.53 (m, 2H). |
| 113 | ¹H NMR (500 MHz, CDCl3) δ 7.59-7.51 (m, 2H), 7.38-7.28 (m, 2H), 7.20 (t, J = 57.3 Hz, 1H), 4.69 (s, 2H), 4.02 (s, 3H), 3.64-3.58 (m, 1H), 0.74-0.65 (m, 2H), 0.65-0.56 (m, 2H). |
| 114 | ¹H NMR (500 MHz, CDCl3) δ 7.90 (s, 1H), 7.58-7.51 (m, 2H), 7.38-7.28 (m, 2H), 7.22 (t, J = 57.3 Hz, 1H), 4.61 (s, 2H), 3.90 (s, 3H), 3.65-3.58 (m, 1H), 0.75-0.65 (m, 2H), 0.65-0.55 (m, 2H). |
| 115 | ¹H NMR (500 MHz, CDCl3) δ 7.54 (ddd, J = 8.8, 4.9, 1.5 Hz, 1H), 7.45-7.38 (m, 1H), 7.23 (t, J = 57.3 Hz, 1H), 7.17-7.09 (m, 2H), 4.63 (s, 2H), 3.96 (s, 3H), 3.62-3.54 (m, 1H), 0.76-0.65 (m, 2H), 0.65-0.55 (m, 2H). |
| 116 | ¹H NMR (500 MHz, CDCl3) δ 7.49 (dd, J = 7.9, 1.6 Hz, 1H), 7.42-7.35 (m, 2H), 7.35-7.25 (m, 1H), 7.21 (q, J = 57.3 Hz, 1H), 4.62 (s, 2H), 3.96 (s, 3H), 3.64-3.57 (m, 1H), 0.74-0.65 (m, 2H), 0.65-0.54 (m, 2H). |
| 117 | ¹H NMR (500 MHz, CDCl3) δ 7.45 (t, J = 1.9 Hz, 1H), 7.42-7.34 (m, 3H), 7.22 (t, J = 57.3 Hz, 1H), 4.66 (s, 2H), 3.96 (s, 3H), 3.64-3.57 (m, 1H), 0.74-0.65 (m, 2H), 0.65-0.56 (m, 2H). |
| 118 | ¹H NMR (500 MHz, CDCl3) δ 7.43-7.38 (m, 2H), 7.27 (t, J = 57.3 Hz, 1H), 7.23-7.09 (m, 1H), 4.62 (s, 2H), 3.96 (s, 3H), 3.63-3.57 (m, 1H), 0.74-0.65 (m, 2H), 0.65-0.56 (m, 2H). |
| 119 | ¹H NMR (500 MHz, CDCl3) δ 7.45-7.35 (m, 3H), 7.23 (t, J = 57.3 Hz, 1H), 4.66 (s, 2H), 3.96 (s, 3H), 3.64-3.57 (m, 1H), 0.74-0.65 (m, 2H), 0.65-0.56 (m, 2H). |
| 120 | ¹H NMR (500 MHz, CDCl3) δ 7.42-7.32 (m, 3H), 7.22 (t, J = 57.3 Hz, 1H), 4.65 (s, 2H), 3.96 (s, 3H), 3.62-3.54 (m, 1H), 0.74-0.65 (m, 2H), 0.65-0.56 (m, 2H). |
| 121 | ¹H NMR (500 MHz, CDCl3) δ 7.52-7.41 (m, 3H), 7.23 (t, J = 57.3 Hz, 1H), 4.66 (s, 2H), 3.96 (s, 3H), 3.64-3.57 (m, 1H), 0.74-0.65 (m, 2H), 0.65-0.55 (m, 2H). |
| 122 | ¹H NMR (500 MHz, CDCl3) δ 7.43-7.31 (m, 3H), 7.17 (t, J = 57.3 Hz, 1H), 4.76 (s, 2H), 3.96 (s, 3H), 3.64-3.57 (m, 1H), 0.75-0.65 (m, 2H), 0.65-0.56 (m, 2H). |
| 123 | ¹H NMR (500 MHz, CDCl3) δ 7.29 (t, J = 7.4 Hz, 2H), 7.17 (d, J = 57.3 Hz, 1H), 4.65 (s, 2H), 3.96 (s, 3H), 3.62-3.54 (m, 1H), 0.74-0.65 (m, 2H), 0.65-0.56 (m, 2H). |
| 124 | ¹H NMR (500 MHz, CDCl3) δ 7.36-7.31 (m, 2H), 7.31-7.24 (m, 1H), 7.19 (q, J = 7.4 Hz, 1H), 7.16-7.10 (m, 1H), 4.66 (s, 2H), 3.96 (s, 3H), 3.64-3.57 (m, 1H), 0.74-0.65 (m, 2H), 0.65-0.56 (m, 2H). |
| 125 | ¹H NMR (500 MHz, CDCl3) δ 7.34-7.30 (m, 2H), 7.25 (ddd, J = 8.1, 2.5, 1.3 Hz, 1H), 7.23 (t, J = 57.3 Hz, 1H), 7.18-7.13 (m, 1H), 4.68 (s, 2H), 3.64-3.58 (m, 1H), 0.73-0.65 (m, 2H), 0.64-0.57 (m, 2H). |
| 126 | ¹H NMR (500 MHz, CDCl3) δ 7.36-7.28 (m, 1H), 7.23 (t, J = 57.3 Hz, 1H), 6.88-6.78 (m, 2H), 4.65 (s, 2H), 3.96 (s, 3H), 3.61-3.54 (m, 1H), 0.74-0.65 (m, 2H), 0.65-0.56 (m, 2H). |
| 127 | ¹H NMR (500 MHz, CDCl3) δ 7.36-7.24 (m, 1H), 7.23 (t, J = 57.3 Hz, 1H), 7.20-7.11 (m, 2H), 4.69 (s, 2H), 3.96 (s, 3H), 3.62-3.54 (m, 1H), 0.74-0.65 (m, 2H), 0.65-0.56 (m, 2H). |
| 128 | ¹H NMR (500 MHz, CDCl3) δ 7.43 (tt, J = 7.8, 4.9 Hz, 1H), 7.23 (t, J = 57.3 Hz, 1H), 6.98 (td, J = 7.5, 0.9 Hz, 2H), 4.66 (s, 2H), 3.96 (s, 3H), 3.62-3.54 (m, 1H), 0.74-0.65 (m, 2H), 0.65-0.55 (m, 2H). |
| 129 | ¹H NMR (500 MHz, CDCl3) δ 7.23 (t, J = 57.3 Hz, 1H), 6.73 (tt, J = 8.2, 0.9 Hz, 2H), 4.67 (s, 2H), 3.96 (s, 3H), 3.62-3.54 (m, 1H), 0.74-0.65 (m, 2H), 0.65-0.55 (m, 2H). |
| 130 | ¹H NMR (500 MHz, CDCl3) δ 7.35-7.30 (m, 1H), 7.23 (t, J = 57.3 Hz, 1H), 7.19-7.09 (m, 2H), 4.68 (s, 2H), 3.96 (s, 3H), 3.63-3.57 (m, 1H), 0.74-0.65 (m, 2H), 0.65-0.56 (m, 2H). |
| 131 | ¹H NMR (500 MHz, CDCl3) δ 7.46 (s, 4H), 7.23 (t, J = 57.3 Hz, 1H), 4.66 (s, 2H), 3.96 (s, 3H), 3.64-3.57 (m, 1H), 0.74-0.65 (m, 2H), 0.65-0.56 (m, 2H). |
| 132 | ¹H NMR (500 MHz, CDCl3) δ 7.64-7.56 (m, 1H), 7.56-7.50 (m, 1H), 7.36-7.30 (m, 2H), 7.22 (t, J = 57.3 Hz, 1H), 4.66 (s, 2H), 3.96 (s, 3H), 3.64-3.56 (m, 1H), 0.74-0.65 (m, 2H), 0.65-0.54 (m, 2H). |
| 133 | ¹H NMR (500 MHz, CDCl3) δ 7.57-7.51 (m, 2H), 7.46 (ddd, J = 8.1, 2.0, 1.3 Hz, 1H), 7.36-7.28 (m, 1H), 7.21 (t, J = 57.3 Hz, 1H), 4.66 (s, 2H), 3.96 (s, 3H), 3.64-3.56 (m, 1H), 0.74-0.65 (m, 2H), 0.65-0.56 (m, 2H). |
| 134 | ¹H NMR (500 MHz, CDCl3) δ 7.69 (d, J = 1.9 Hz, 1H), 7.45-7.35 (m, 2H), 7.23 (t, J = 57.3 Hz, 1H), 4.66 (s, 2H), 3.96 (s, 3H), 3.64-3.56 (m, 1H), 0.74-0.65 (m, 2H), 0.65-0.54 (m, 2H). |
| 135 | ¹H NMR (500 MHz, CDCl3) δ 7.60 (d, J = 7.7 Hz, 1H), 7.55-7.48 (m, 2H), 7.23 (t, J = 57.3 Hz, 1H), 4.68 (s, 2H), 3.96 (s, 3H), 3.64-3.56 (m, 1H), 0.74-0.65 (m, 2H), 0.65-0.55 (m, 2H). |
| 136 | ¹H NMR (500 MHz, CDCl3) δ 7.49 (d, J = 8.1 Hz, 2H), 7.23 (t, J = 57.3 Hz, 1H), 7.08 (t, J = 8.1 Hz, 1H), 4.66 (s, 2H), 3.96 (s, 3H), 3.63-3.55 (m, 1H), 0.74-0.65 (m, 2H), 0.65-0.55 (m, 2H). |
| 137 | ¹H NMR (500 MHz, CDCl3) δ 7.62 (s, 2H), 7.23 (t, J = 57.3 Hz, 1H), 4.66 (s, 2H), 3.96 (s, 3H), 3.63-3.55 (m, 1H), 0.74-0.65 (m, 2H), 0.65-0.56 (m, 2H). |
| 138 | ¹H NMR (500 MHz, CDCl3) δ 7.60-7.53 (m, 2H), 7.37 (dd, J = 8.8, 1.8 Hz, 1H), 7.23 (t, J = 57.3 Hz, 1H), 4.66 (s, 2H), 3.96 (s, 3H), 3.63-3.56 (m, 1H), 0.74-0.65 (m, 2H), 0.65-0.56 (m, 2H). |
| 139 | ¹H NMR (500 MHz, CDCl3) δ 7.39 (dt, J = 7.0, 2.0 Hz, 1H), 7.25 (s, 1H), 7.23 (t, J = 57.3 Hz, 1H), 7.20-7.13 (m, 2H), 4.66 (s, 2H), 3.96 (s, 3H), 3.64-3.56 (m, 1H), 2.38 (s, 3H), 0.74-0.65 (m, 2H), 0.65-0.55 (m, 2H). |
| 140 | ¹H NMR (500 MHz, CDCl3) δ 7.29 (t, J = 57.3 Hz, 1H), 7.14-7.10 (m, 1H), 6.98-6.89 (m, 2H), 4.60 (s, 2H), 3.96 (s, 3H), 3.64-3.56 (m, 1H), 2.28 (s, 3H), 2.27 (s, 3H), 0.74-0.65 (m, 2H), 0.65-0.55 (m, 2H). |
| 141 | ¹H NMR (500 MHz, CDCl3) δ 7.23 (t, J = 57.3 Hz, 1H), 7.11-7.03 (m, 3H), 4.64 (s, 2H), 3.96 (s, 3H), 3.64-3.57 (m, 1H), 2.37 (s, 3H), 2.35 (s, 3H), 0.74-0.65 (m, 2H), 0.65-0.55 (m, 2H). |

TABLE 1-continued

| Compound number | Nuclear magnetic data |
|---|---|
| 142 | ¹H NMR (500 MHz, CDCl3) δ 7.24 (t, J = 57.3 Hz, 1H), 7.13-7.10 (m, 1H), 7.03-6.99 (m, 2H), 4.58 (s, 2H), 3.96 (s, 3H), 3.64-3.57 (m, 1H), 2.26 (s, 6H), 0.74-0.65 (m, 2H), 0.65-0.56 (m, 2H). |
| 143 | ¹H NMR (500 MHz, CDCl3) δ 7.23 (t, J = 57.3 Hz, 1H), 6.82 (s, 2H), 4.58 (s, 2H), 3.96 (s, 3H), 3.64-3.57 (m, 1H), 2.27 (s, 3H), 2.26 (s, 6H), 0.74-0.65 (m, 2H), 0.65-0.56 (m, 2H). |
| 144 | ¹H NMR (500 MHz, CDCl3) δ 7.22 (t, J = 57.3 Hz, 1H), 7.16-7.09 (m, 3H), 4.64 (s, 2H), 3.96 (s, 3H), 3.64-3.57 (m, 1H), 3.08-2.99 (m, 1H), 2.35 (s, 3H), 1.27 (d, J = 6.6 Hz, 6H), 0.74-0.65 (m, 2H), 0.65-0.56 (m, 2H). |
| 145 | ¹H NMR (500 MHz, CDCl3) δ 7.27 (t, J = 57.3 Hz, 1H), 7.22-7.10 (m, 2H), 7.00-6.95 (m, 1H), 4.65 (s, 2H), 3.96 (s, 3H), 3.64-3.57 (m, 1H), 3.34-3.23 (m, 1H), 2.37 (s, 3H), 1.26 (d, J = 6.8 Hz, 6H), 0.74-0.65 (m, 2H), 0.65-0.56 (m, 2H). |
| 146 | ¹H NMR (500 MHz, CDCl3) δ 7.24 (t, J = 57.3 Hz, 1H), 7.12 (d, J = 1.9 Hz, 1H), 7.01-6.94 (m, 2H), 4.65 (s, 2H), 3.96 (s, 3H), 3.64-3.57 (m, 1H), 2.37 (s, 3H), 1.34 (s, 9H), 0.72-0.65 (m, 2H), 0.65-0.57 (m, 2H). |
| 147 | ¹H NMR (500 MHz, CDCl3) δ 7.28 (t, J = 57.3 Hz, 1H), 7.25-7.11 (m, 2H), 7.06 (dq, J = 7.3, 1.0 Hz, 1H), 4.64 (s, 2H), 3.96 (s, 3H), 3.63-3.57 (m, 1H), 2.35 (s, 3H), 1.33 (s, 9H), 0.73-0.65 (m, 2H), 0.65-0.57 (m, 2H). |
| 148 | ¹H NMR (500 MHz, CDCl3) δ 7.27 (t, J = 57.3 Hz, 1H), 7.16 (d, J = 44.5 Hz, 1H), 7.12-7.05 (m, 2H), 4.60 (s, 2H), 3.96 (s, 3H), 3.63-3.57 (m, 1H), 2.95-2.85 (m, 1H), 2.37 (s, 3H), 1.27 (d, J = 6.6 Hz, 6H), 0.74-0.65 (m, 2H), 0.65-0.56 (m, 2H). |
| 149 | ¹H NMR (500 MHz, CDCl3) δ 7.36-7.31 (m, 1H), 7.27 (td, J = 7.6, 1.9 Hz, 1H), 7.23 (t, J = 57.3 Hz, 1H), 7.22-7.01 (m, 2H), 4.60 (s, 2H), 3.96 (s, 3H), 3.63-3.57 (m, 1H), 2.36 (s, 3H), 0.74-0.65 (m, 2H), 0.65-0.56 (m, 2H). |
| 150 | ¹H NMR (500 MHz, CDCl3) δ 7.28 (t, J = 57.3 Hz, 2H), 7.25-7.10 (m, 1H), 7.04-6.99 (m, 2H), 4.66 (s, 2H), 3.96 (s, 3H), 3.63-3.57 (m, 1H), 2.38 (s, 3H), 0.74-0.65 (m, 2H), 0.65-0.56 (m, 2H). |
| 151 | ¹H NMR (500 MHz, CDCl3) δ 7.20 (t, J = 57.3 Hz, 1H), 7.12-7.04 (m, 3H), 4.66 (s, 2H), 3.96 (s, 3H), 3.64-3.56 (m, 1H), 2.32 (s, 3H), 2.30 (s, 3H), 0.74-0.65 (m, 2H), 0.65-0.55 (m, 2H). |
| 152 | ¹H NMR (500 MHz, CDCl3) δ 7.23 (t, J = 57.3 Hz, 1H), 7.11-6.95 (m, 3H), 4.75 (s, 2H), 3.96 (s, 3H), 3.63-3.57 (m, 1H), 2.28 (s, 6H), 0.74-0.65 (m, 2H), 0.65-0.56 (m, 2H). |
| 153 | ¹H NMR (500 MHz, CDCl3) δ 7.38 (dd, J = 8.7, 4.9 Hz, 1H), 7.35-7.25 (m, 1H), 7.22 (t, J = 57.3 Hz, 1H), 7.17-7.10 (m, 1H), 4.65 (s, 2H), 3.96 (s, 3H), 3.62-3.55 (m, 1H), 0.74-0.65 (m, 2H), 0.65-0.56 (m, 2H). |
| 154 | ¹H NMR (500 MHz, CDCl3) δ 7.36 (t, J = 57.3 Hz, 1H), 7.34-7.11 (m, 2H), 7.02 (ddd, J = 8.8, 8.0, 1.9 Hz, 1H), 4.61 (s, 2H), 3.96 (s, 3H), 3.64-3.57 (m, 1H), 0.74-0.65 (m, 2H), 0.65-0.56 (m, 2H). |
| 155 | ¹H NMR (500 MHz, CDCl3) δ 7.42 (dd, J = 5.0, 2.5 Hz, 1H), 7.38-7.35 (m, 1H), 7.24 (t, J = 57.3 Hz, 1H), 7.15-7.09 (m, 1H), 4.69 (s, 2H), 3.96 (s, 3H), 3.62-3.55 (m, 1H), 0.74-0.65 (m, 2H), 0.65-0.56 (m, 2H). |
| 156 | ¹H NMR (500 MHz, CDCl3) δ 7.62 (d, J = 2.0 Hz, 1H), 7.54-7.47 (m, 2H), 7.23 (t, J = 57.3 Hz, 1H), 4.66 (s, 2H), 3.96 (s, 3H), 3.64-3.57 (m, 1H), 0.74-0.65 (m, 2H), 0.65-0.56 (m, 2H). |
| 157 | ¹H NMR (500 MHz, CDCl3) δ 7.53 (dd, J = 10.6, 1.1 Hz, 1H), 7.37 (dd, J = 7.6, 1.2 Hz, 1H), 7.25 (t, J = 57.3 Hz, 1H), 7.15-7.10 (m, 1H), 4.66 (s, 2H), 3.96 (s, 3H), 3.64-3.56 (m, 1H), 0.74-0.65 (m, 2H), 0.65-0.56 (m, 2H). |
| 158 | ¹H NMR (500 MHz, CDCl3) δ 7.72 (d, J = 2.0 Hz, 1H), 7.62-7.50 (m, 2H), 7.23 (t, J = 57.3 Hz, 1H), 4.62 (s, 2H), 3.96 (s, 3H), 3.64-3.57 (m, 1H), 0.74-0.65 (m, 2H), 0.65-0.56 (m, 2H). |
| 159 | ¹H NMR (500 MHz, CDCl3) δ 7.77 (d, J = 1.9 Hz, 1H), 7.70 (dd, J = 9.3, 1.9 Hz, 1H), 7.56 (d, J = 9.2 Hz, 1H), 7.23 (t, J = 57.3 Hz, 1H), 4.61 (s, 2H), 3.96 (s, 3H), 3.64-3.56 (m, 1H), 3.21 (s, 3H), 0.74-0.65 (m, 2H), 0.65-0.56 (m, 2H). |
| 160 | ¹H NMR (500 MHz, CDCl3) δ 8.04 (t, J = 1.9 Hz, 1H), 7.76 (ddd, J = 8.4, 1.8, 1.1 Hz, 1H), 7.63 (ddd, J = 7.9, 1.9, 1.2 Hz, 1H), 7.47 (dd, J = 8.5, 7.9 Hz, 1H), 7.23 (t, J = 57.3 Hz, 1H), 4.66 (s, 2H), 3.96 (s, 3H), 3.64-3.56 (m, 1H), 3.18 (s, 3H), 0.74-0.65 (m, 2H), 0.65-0.56 (m, 2H). |
| 161 | ¹H NMR (500 MHz, CDCl3) δ 7.89 (dd, J = 8.4, 1.6 Hz, 1H), 7.68 (dd, J = 8.0, 1.7 Hz, 1H), 7.50-7.38 (m, 2H), 7.23 (t, J = 57.3 Hz, 1H), 4.53 (s, 2H), 3.96 (s, 3H), 3.63-3.55 (m, 1H), 3.20 (s, 3H), 0.74-0.65 (m, 2H), 0.65-0.56 (m, 2H). |
| 162 | ¹H NMR (500 MHz, CDCl3) δ 8.08 (d, J = 2.2 Hz, 1H), 7.66 (dd, J = 9.3, 2.2 Hz, 1H), 7.58 (d, J = 9.4 Hz, 1H), 7.23 (t, J = 57.3 Hz, 1H), 4.66 (s, 2H), 3.96 (s, 3H), 3.64-3.57 (m, 1H), 3.18 (s, 3H), 0.74-0.65 (m, 2H), 0.65-0.56 (m, 2H). |
| 163 | ¹H NMR (500 MHz, CDCl3) δ 7.82-7.70 (m, 4H), 7.23 (t, J = 57.3 Hz, 1H), 4.66 (s, 2H), 3.96 (s, 3H), 3.66-3.56 (m, 1H), 3.27 (q, J = 9.2 Hz, 2H), 1.27 (t, J = 9.2 Hz, 3H), 0.75-0.65 (m, 2H), 0.65-0.56 (m, 2H). |
| 164 | ¹H NMR (500 MHz, CDCl3) δ 8.13 (t, J = 1.9 Hz, 1H), 7.78 (ddd, J = 8.6, 2.0, 1.3 Hz, 1H), 7.63 (ddd, J = 7.9, 1.9, 1.2 Hz, 1H), 7.50 (dd, J = 8.5, 7.9 Hz, 1H), 7.23 (t, J = 57.3 Hz, 1H), 4.66 (s, 2H), 3.96 (s, 3H), 3.64-3.56 (m, 1H), 3.28 (q, J = 9.1 Hz, 2H), 1.26 (t, J = 9.1 Hz, 3H), 0.74-0.65 (m, 2H), 0.65-0.56 (m, 2H). |
| 165 | ¹H NMR (500 MHz, CDCl3) δ 7.54 (d, J = 1.9 Hz, 1H), 7.47 (d, J = 8.0 Hz, 1H), 7.36-7.28 (m, 1H), 7.21 (t, J = 57.3 Hz, 1H), 4.62 (s, 2H), 3.96 (s, 3H), 3.64-3.56 (m, 1H), 2.99-2.90 (m, 1H), 1.29-1.20 (m, 2H), 1.20-1.13 (m, 2H), 0.75-0.65 (m, 2H), 0.65-0.55 (m, 2H). |
| 166 | ¹H NMR (500 MHz, CDCl3) δ 7.50 (dd, J = 9.0, 5.0 Hz, 1H), 7.36-7.24 (m, 1H), 7.23 (t, J = 57.3 Hz, 1H), 7.22-7.10 (m, 1H), 4.66 (s, 2H), 3.96 (s, 3H), 3.58 (s, 1H), 3.01-2.90 (m, 1H), 1.29-1.20 (m, 2H), 1.20-1.13 (m, 2H), 0.74-0.65 (m, 2H), 0.65-0.55 (m, 2H). |
| 167 | ¹H NMR (500 MHz, CDCl3) δ 7.94 (s, 1H), 7.39-7.30 (m, 2H), 7.26 (t, J = 57.3 Hz, 1H), 7.24-7.11 (m, 2H), 4.28 (q, J = 7.7 Hz, 1H), 3.90 (s, 3H), 3.73-3.65 (m, 1H), 1.34 (d, J = 7.7 Hz, 3H), 0.77-0.72 (m, 2H), 0.72-0.67 (m, 2H). |

TABLE 1-continued

| Compound number | Nuclear magnetic data |
|---|---|
| 168 | ¹H NMR (500 MHz, CDCl3) δ 7.44 (dd, J = 8.1, 1.8 Hz, 1H), 7.40 (dd, J = 8.0, 1.6 Hz, 1H), 7.37 (td, J = 7.7, 1.7 Hz, 1H), 7.33-7.26 (m, 1H), 7.20 (t, J = 57.3 Hz, 1H), 4.34 (q, J = 7.7 Hz, 1H), 3.96 (s, 3H), 3.77-3.70 (m, 1H), 1.34 (d, J = 7.7 Hz, 3H), 0.78-0.72 (m, 2H), 0.72-0.67 (m, 2H). |
| 169 | ¹H NMR (500 MHz, CDCl3) δ 7.42 (t, J = 1.9 Hz, 1H), 7.38 (dt, J = 8.1, 1.6 Hz, 1H), 7.35 (t, J = 8.0 Hz, 1H), 7.24 (t, J = 57.3 Hz, 1H), 7.21-7.08 (m, 1H), 4.32 (q, J = 7.7 Hz, 1H), 3.96 (s, 3H), 3.77-3.70 (m, 1H), 1.34 (d, J = 7.7 Hz, 3H), 0.77-0.72 (m, 2H), 0.72-0.67 (m, 2H). |
| 170 | ¹H NMR (500 MHz, CDCl3) δ 7.43 (d, J = 2.1 Hz, 1H), 7.34-7.26 (m, 1H), 7.23 (t, J = 57.3 Hz, 1H), 7.13 (d, J = 35.8 Hz, 1H), 4.34 (q, J = 7.7 Hz, 1H), 3.96 (s, 3H), 3.77-3.69 (m, 1H), 1.34 (d, J = 7.7 Hz, 3H), 0.78-0.72 (m, 2H), 0.72-0.67 (m, 2H). |
| 171 | ¹H NMR (500 MHz, CDCl3) δ 7.45-7.39 (m, 2H), 7.36 (dd, J = 7.3, 2.4 Hz, 1H), 7.21 (t, J = 57.3 Hz, 1H), 4.35 (q, J = 7.7 Hz, 1H), 3.96 (s, 3H), 3.77-3.69 (m, 1H), 1.34 (d, J = 7.7 Hz, 3H), 0.78-0.72 (m, 2H), 0.72-0.67 (m, 2H). |
| 172 | ¹H NMR (500 MHz, CDCl3) δ 7.39 (dd, J = 9.3, 6.8 Hz, 1H), 7.36-7.32 (m, 2H), 7.21 (t, J = 57.3 Hz, 1H), 4.39 (q, J = 7.7 Hz, 1H), 3.96 (s, 3H), 3.77-3.70 (m, 1H), 1.36 (d, J = 7.7 Hz, 3H), 0.77-0.72 (m, 2H), 0.72-0.66 (m, 2H). |
| 173 | ¹H NMR (500 MHz, CDCl3) δ 7.49-7.44 (m, 2H), 7.23 (t, J = 57.3 Hz, 1H), 7.15-7.06 (m, 1H), 4.32 (q, J = 7.7 Hz, 1H), 3.96 (s, 3H), 3.77-3.70 (m, 1H), 1.34 (d, J = 7.7 Hz, 3H), 0.77-0.72 (m, 2H), 0.72-0.67 (m, 2H). |
| 174 | ¹H NMR (500 MHz, CDCl3) δ 7.35-7.30 (m, 3H), 7.20 (t, J = 57.3 Hz, 1H), 4.33 (q, J = 7.8 Hz, 1H), 3.96 (s, 3H), 3.77-3.70 (m, 1H), 1.34 (d, J = 7.7 Hz, 3H), 0.78-0.72 (m, 2H), 0.72-0.67 (m, 2H). |
| 175 | ¹H NMR (500 MHz, CDCl3) δ 7.31 (d, J = 16.1 Hz, 2H), 7.15 (t, J = 57.3 Hz, 1H), 4.39 (q, J = 7.7 Hz, 1H), 3.96 (s, 3H), 3.77-3.70 (m, 1H), 1.36 (d, J = 7.7 Hz, 3H), 0.77-0.72 (m, 2H), 0.72-0.67 (m, 2H). |
| 176 | ¹H NMR (500 MHz, CDCl3) δ 7.41 (dddd, J = 8.8, 7.9, 5.0, 1.6 Hz, 1H), 7.39-7.34 (m, 1H), 7.22 (t, J = 57.3 Hz, 1H), 7.18-7.09 (m, 2H), 4.35 (q, J = 7.7 Hz, 1H), 3.96 (s, 3H), 3.77-3.70 (m, 1H), 1.35 (d, J = 7.7 Hz, 3H), 0.77-0.72 (m, 2H), 0.72-0.67 (m, 2H). |
| 177 | ¹H NMR (500 MHz, CDCl3) δ 7.36-7.32 (m, 1H), 7.24 (t, J = 57.3 Hz, 1H), 7.21-7.08 (m, 3H), 4.31 (q, J = 7.7 Hz, 1H), 3.96 (s, 3H), 3.77-3.70 (m, 1H), 1.34 (d, J = 7.7 Hz, 3H), 0.78-0.72 (m, 2H), 0.72-0.66 (m, 2H). |
| 178 | ¹H NMR (500 MHz, CDCl3) δ 7.35-7.30 (m, 2H), 7.23 (t, J = 57.3 Hz, 1H), 7.07-7.00 (m, 2H), 4.32 (q, J = 7.7 Hz, 1H), 3.96 (s, 3H), 3.77-3.70 (m, 1H), 1.34 (d, J = 7.7 Hz, 3H), 0.78-0.72 (m, 2H), 0.72-0.67 (m, 2H). |
| 179 | ¹H NMR (500 MHz, CDCl3) δ 7.24 (t, J = 57.3 Hz, 1H), 7.21-7.09 (m, 1H), 6.91 (td, J = 8.2, 2.0 Hz, 1H), 6.84 (td, J = 7.9, 1.9 Hz, 1H), 4.35 (q, J = 7.7 Hz, 1H), 3.96 (s, 3H), 3.77-3.70 (m, 1H), 1.35 (d, J = 7.7 Hz, 3H), 0.78-0.72 (m, 2H), 0.72-0.67 (m, 2H). |
| 180 | ¹H NMR (500 MHz, CDCl3) δ 7.34-7.29 (m, 1H), 7.21 (t, J = 57.3 Hz, 1H), 7.19-7.08 (m, 2H), 4.35 (q, J = 7.7 Hz, 1H), 3.96 (s, 3H), 3.77-3.70 (m, 1H), 1.35 (d, J = 7.7 Hz, 3H), 0.77-0.72 (m, 2H), 0.72-0.66 (m, 2H). |
| 181 | ¹H NMR (500 MHz, CDCl3) δ 7.43 (tt, J = 7.8, 4.9 Hz, 1H), 7.21 (t, J = 57.3 Hz, 1H), 7.00 (td, J = 7.5, 0.9 Hz, 2H), 4.40 (q, J = 7.7 Hz, 1H), 3.96 (s, 3H), 3.78-3.69 (m, 1H), 1.37 (d, J = 7.5 Hz, 3H), 0.78-0.72 (m, 2H), 0.72-0.67 (m, 2H). |
| 182 | ¹H NMR (500 MHz, CDCl3) δ 7.21 (t, J = 57.3 Hz, 1H), 6.72 (tt, J = 8.1, 0.8 Hz, 2H), 4.40 (q, J = 7.7 Hz, 1H), 3.96 (s, 3H), 3.77-3.70 (m, 1H), 1.37 (d, J = 7.5 Hz, 3H), 0.78-0.72 (m, 2H), 0.72-0.66 (m, 2H). |
| 183 | ¹H NMR (500 MHz, CDCl3) δ 7.34-7.28 (m, 1H), 7.20 (t, J = 57.3 Hz, 1H), 7.14-7.02 (m, 2H), 4.32 (q, J = 7.8 Hz, 1H), 3.96 (s, 3H), 3.78-3.68 (m, 1H), 1.34 (d, J = 7.7 Hz, 3H), 0.79-0.72 (m, 2H), 0.72-0.67 (m, 2H). |
| 184 | ¹H NMR (500 MHz, CDCl3) δ 7.49-7.43 (m, 2H), 7.39-7.34 (m, 2H), 7.21 (t, J = 57.3 Hz, 1H), 4.32 (q, J = 7.7 Hz, 1H), 3.96 (s, 3H), 3.77-3.70 (m, 1H), 1.34 (d, J = 7.7 Hz, 3H), 0.77-0.72 (m, 2H), 0.72-0.67 (m, 2H). |
| 185 | ¹H NMR (500 MHz, CDCl3) δ 7.64-7.57 (m, 1H), 7.48-7.43 (m, 1H), 7.34-7.29 (m, 2H), 7.23 (t, J = 57.3 Hz, 1H), 4.33 (q, J = 7.7 Hz, 1H), 3.96 (s, 3H), 3.77-3.70 (m, 1H), 1.34 (d, J = 7.7 Hz, 3H), 0.77-0.72 (m, 2H), 0.72-0.67 (m, 2H). |
| 186 | ¹H NMR (500 MHz, CDCl3) δ 7.58-7.55 (m, 1H), 7.55-7.51 (m, 1H), 7.34-7.28 (m, 2H), 7.24 (t, J = 57.3 Hz, 1H), 4.32 (q, J = 7.7 Hz, 1H), 3.96 (s, 3H), 3.77-3.70 (m, 1H), 1.34 (d, J = 7.7 Hz, 3H), 0.78-0.72 (m, 2H), 0.72-0.67 (m, 2H). |
| 187 | ¹H NMR (500 MHz, CDCl3) δ 7.72 (d, J = 1.9 Hz, 1H), 7.47 (dd, J = 8.7, 1.9 Hz, 1H), 7.34-7.25 (m, 1H), 7.15 (t, J = 57.3 Hz, 1H), 4.33 (q, J = 7.7 Hz, 1H), 3.96 (s, 3H), 3.77-3.70 (m, 1H), 1.34 (d, J = 7.7 Hz, 3H), 0.77-0.72 (m, 2H), 0.72-0.67 (m, 2H). |
| 188 | ¹H NMR (500 MHz, CDCl3) δ 7.64 (d, J = 2.6 Hz, 1H), 7.60 (d, J = 7.8 Hz, 1H), 7.51 (dd, J = 7.8, 2.5 Hz, 1H), 7.21 (t, J = 57.3 Hz, 1H), 4.34 (q, J = 7.7 Hz, 1H), 3.96 (s, 3H), 3.77-3.69 (m, 1H), 1.34 (d, J = 7.5 Hz, 3H), 0.77-0.72 (m, 2H), 0.72-0.67 (m, 2H). |
| 189 | ¹H NMR (500 MHz, CDCl3) δ 7.52 (d, J = 8.1 Hz, 2H), 7.21 (t, J = 57.3 Hz, 1H), 7.10-7.04 (m, 1H), 4.36 (q, J = 7.7 Hz, 1H), 3.96 (s, 3H), 3.78-3.70 (m, 1H), 1.35 (d, J = 7.7 Hz, 3H), 0.77-0.72 (m, 2H), 0.72-0.67 (m, 2H). |
| 190 | ¹H NMR (500 MHz, CDCl3) δ 7.68 (s, 2H), 7.21 (t, J = 57.3 Hz, 1H), 4.36 (q, J = 7.7 Hz, 1H), 3.96 (s, 3H), 3.77-3.70 (m, 1H), 1.35 (d, J = 7.7 Hz, 3H), 0.77-0.72 (m, 2H), 0.72-0.67 (m, 2H). |
| 191 | ¹H NMR (500 MHz, CDCl3) δ 7.64 (d, J = 1.9 Hz, 1H), 7.57 (d, J = 8.5 Hz, 1H), 7.34-7.24 (m, 1H), 7.18 (t, J = 57.3 Hz, 1H), 4.32 (q, J = 7.7 Hz, 1H), 3.96 (s, 3H), 3.77-3.69 (m, 1H), 1.34 (d, J = 7.7 Hz, 3H), 0.77-0.72 (m, 2H), 0.72-0.67 (m, 2H). |
| 192 | ¹H NMR (500 MHz, CDCl3) δ 7.34-7.21 (m, 1H), 7.19 (t, J = 57.3 Hz, 1H), 7.18-7.07 (m, 3H), 4.32 (q, J = 7.7 Hz, 1H), 3.96 (s, 3H), 3.78-3.68 (m, 1H), 2.38 (s, 3H), 1.34 (d, J = 7.7 Hz, 3H), 0.77-0.72 (m, 2H), 0.72-0.67 (m, 2H). |

TABLE 1-continued

| Compound number | Nuclear magnetic data |
|---|---|
| 193 | ¹H NMR (500 MHz, CDCl3) δ 7.21 (t, J = 57.3 Hz, 1H), 7.04 (d, J = 8.3 Hz, 1H), 6.95-6.91 (m, 1H), 6.90 (d, J = 1.8 Hz, 1H), 4.33 (q, J = 7.6 Hz, 1H), 3.96 (s, 3H), 3.77-3.70 (m, 1H), 2.31 (s, 3H), 2.28 (s, 3H), 1.34 (d, J = 7.7 Hz, 3H), 0.78-0.72 (m, 2H), 0.72-0.66 (m, 2H). |
| 194 | ¹H NMR (500 MHz, CDCl3) δ 7.21 (t, J = 57.3 Hz, 1H), 7.10-7.03 (m, 2H), 7.00 (d, J = 2.0 Hz, 1H), 4.34 (q, J = 7.6 Hz, 1H), 3.96 (s, 3H), 3.77-3.70 (m, 1H), 2.38 (s, 3H), 2.37 (s, 3H), 1.34 (d, J = 7.6 Hz, 3H), 0.78-0.72 (m, 2H), 0.72-0.67 (m, 2H). |
| 195 | ¹H NMR (500 MHz, CDCl3) δ 7.23 (t, J = 57.3 Hz, 1H), 7.13-7.09 (m, 1H), 7.00 (d, J = 7.7 Hz, 2H), 4.35 (q, J = 7.6 Hz, 1H), 3.96 (s, 3H), 3.77-3.70 (m, 1H), 2.31 (s, 6H), 1.36 (d, J = 7.7 Hz, 3H), 0.77-0.72 (m, 2H), 0.72-0.67 (m, 2H). |
| 196 | ¹H NMR (500 MHz, CDCl3) δ 7.21 (t, J = 57.3 Hz, 1H), 6.81 (s, 2H), 4.35 (q, J = 7.6 Hz, 1H), 3.96 (s, 3H), 3.79-3.69 (m, 1H), 2.27 (s, 3H), 2.24 (s, 6H), 1.36 (d, J = 7.7 Hz, 3H), 0.78-0.72 (m, 2H), 0.72-0.67 (m, 2H). |
| 197 | ¹H NMR (500 MHz, CDCl3) δ 7.24 (t, J = 57.3 Hz, 1H), 7.18-7.12 (m, 1H), 7.12-7.08 (m, 2H), 4.34 (q, J = 7.6 Hz, 1H), 3.96 (s, 3H), 3.77-3.70 (m, 1H), 3.09-3.00 (m, 1H), 2.38 (s, 3H), 1.34 (d, J = 7.7 Hz, 3H), 1.30 (d, J = 6.6 Hz, 3H), 1.25 (d, J = 6.6 Hz, 3H), 0.78-0.72 (m, 2H), 0.72-0.66 (m, 2H). |
| 198 | ¹H NMR (500 MHz, CDCl3) δ 7.34-7.22 (m, 1H), 7.18 (t, J = 57.3 Hz, 1H), 7.07 (d, J = 1.9 Hz, 1H), 7.00-6.95 (m, 1H), 4.33 (q, J = 7.7 Hz, 1H), 3.96 (s, 3H), 3.78-3.69 (m, 1H), 3.29-3.17 (m, 1H), 2.37 (s, 3H), 1.34 (d, J = 7.7 Hz, 3H), 1.28 (d, J = 6.9 Hz, 3H), 1.23 (d, J = 6.9 Hz, 3H), 0.78-0.72 (m, 2H), 0.72-0.65 (m, 2H). |
| 199 | ¹H NMR (500 MHz, CDCl3) δ 7.19 (t, J = 57.3 Hz, 1H), 7.10 (d, J = 2.7 Hz, 1H), 7.00-6.94 (m, 2H), 4.35 (q, J = 7.7 Hz, 1H), 3.96 (s, 3H), 3.78-3.70 (m, 1H), 2.37 (d, J = 0.8 Hz, 3H), 1.35 (s, 3H), 1.34 (d, J = 6.9 Hz, 6H), 1.34 (d, J = 6.9 Hz, 3H), 0.77-0.72 (m, 2H), 0.72-0.66 (m, 2H). |
| 200 | ¹H NMR (500 MHz, CDCl3) δ 7.34-7.23 (m, 1H), 7.22 (t, J = 57.3 Hz, 1H), 7.17-7.08 (m, 1H), 7.04 (dq, J = 7.4, 1.0 Hz, 1H), 4.34 (q, J = 7.6 Hz, 1H), 3.96 (s, 3H), 3.77-3.70 (m, 1H), 2.38 (d, J = 0.9 Hz, 3H), 1.34 (d, J = 7.7 Hz, 3H), 1.33 (s, 9H), 0.78-0.72 (m, 2H), 0.72-0.66 (m, 2H). |
| 201 | ¹H NMR (500 MHz, CDCl3) δ 7.18 (t, J = 57.3 Hz, 1H), 7.12-7.09 (m, 1H), 7.09-7.05 (m, 2H), 4.33 (q, J = 7.6 Hz, 1H), 3.96 (s, 3H), 3.78-3.69 (m, 1H), 2.96-2.85 (m, 1H), 2.38 (s, 3H), 1.34 (d, J = 7.7 Hz, 3H), 1.30 (d, J = 6.6 Hz, 3H), 1.25 (d, J = 6.6 Hz, 3H), 0.78-0.72 (m, 2H), 0.72-0.66 (m, 2H). |
| 202 | ¹H NMR (500 MHz, CDCl3) δ 7.34-7.26 (m, 1H), 7.23 (t, J = 57.3 Hz, 1H), 7.21-7.09 (m, 3H), 4.33 (q, J = 7.6 Hz, 1H), 3.96 (s, 3H), 3.78-3.70 (m, 1H), 2.35 (s, 3H), 1.34 (d, J = 7.7 Hz, 3H), 0.78-0.72 (m, 2H), 0.72-0.67 (m, 2H). |
| 203 | ¹H NMR (500 MHz, CDCl3) δ 7.23 (t, J = 57.3 Hz, 1H), 7.16-7.10 (m, 2H), 7.08 (dt, J = 8.2, 0.6 Hz, 2H), 4.32 (q, J = 7.7 Hz, 1H), 3.96 (s, 3H), 3.77-3.69 (m, 1H), 2.38 (s, 3H), 1.34 (d, J = 7.7 Hz, 3H), 0.78-0.72 (m, 2H), 0.72-0.66 (m, 2H). |
| 204 | ¹H NMR (500 MHz, CDCl3) δ 7.21 (t, J = 57.3 Hz, 1H), 7.08-6.99 (m, 3H), 4.32 (q, J = 7.7 Hz, 1H), 3.96 (s, 3H), 3.77-3.70 (m, 1H), 2.32 (d, J = 0.9 Hz, 3H), 2.30 (s, 3H), 1.34 (d, J = 7.7 Hz, 3H), 0.77-0.72 (m, 2H), 0.72-0.66 (m, 2H). |
| 205 | ¹H NMR (500 MHz, CDCl3) δ 7.21 (t, J = 57.3 Hz, 1H), 6.97 (t, J = 2.3 Hz, 1H), 6.95 (d, J = 2.1 Hz, 2H), 4.33 (q, J = 7.7 Hz, 1H), 3.96 (s, 3H), 3.77-3.69 (m, 1H), 2.28 (s, 6H), 1.34 (d, J = 7.7 Hz, 3H), 0.77-0.72 (m, 2H), 0.72-0.67 (m, 2H). |
| 206 | ¹H NMR (500 MHz, CDCl3) δ 7.34-7.30 (m, 1H), 7.30-7.25 (m, 1H), 7.23 (t, J = 57.3 Hz, 1H), 7.20-7.08 (m, 1H), 4.35 (q, J = 7.7 Hz, 1H), 3.96 (s, 3H), 3.77-3.70 (m, 1H), 1.35 (d, J = 7.7 Hz, 3H), 0.77-0.72 (m, 2H), 0.72-0.67 (m, 2H). |
| 207 | ¹H NMR (500 MHz, CDCl3) δ 7.34-7.23 (m, 2H), 7.18 (t, J = 57.3 Hz, 1H), 7.05 (ddd, J = 8.6, 7.9, 1.8 Hz, 1H), 4.34 (q, J = 7.7 Hz, 1H), 3.96 (s, 3H), 3.77-3.70 (m, 1H), 1.34 (d, J = 7.7 Hz, 3H), 0.77-0.72 (m, 2H), 0.72-0.66 (m, 2H). |
| 208 | ¹H NMR (500 MHz, CDCl3) δ 7.46 (dd, J = 5.0, 2.4 Hz, 1H), 7.36 (ddd, J = 7.5, 5.1, 2.6 Hz, 1H), 7.25 (t, J = 57.3 Hz, 1H), 7.19-7.08 (m, 1H), 4.35 (q, J = 7.7 Hz, 1H), 3.96 (s, 3H), 3.77-3.70 (m, 1H), 1.35 (d, J = 7.7 Hz, 3H), 0.78-0.72 (m, 2H), 0.72-0.66 (m, 2H). |
| 209 | ¹H NMR (500 MHz, CDCl3) δ 7.61 (d, J = 2.2 Hz, 1H), 7.57 (d, J = 57.3 Hz, 1H), 7.52 (dd, J = 7.3, 2.2 Hz, 1H), 7.21 (t, J = 57.3 Hz, 1H), 4.35 (q, J = 7.7 Hz, 1H), 3.96 (s, 3H), 3.78-3.69 (m, 1H), 1.34 (d, J = 7.7 Hz, 3H), 0.78-0.72 (m, 2H), 0.72-0.66 (m, 2H). |
| 210 | ¹H NMR (500 MHz, CDCl3) δ 7.53 (dd, J = 10.6, 1.3 Hz, 1H), 7.35-7.25 (m, 1H), 7.21 (t, J = 57.3 Hz, 1H), 7.18-7.06 (m, 1H), 4.35 (q, J = 7.7 Hz, 1H), 3.96 (s, 3H), 3.77-3.70 (m, 1H), 1.34 (d, J = 7.7 Hz, 3H), 0.78-0.72 (m, 2H), 0.72-0.66 (m, 2H). |
| 211 | ¹H NMR (500 MHz, CDCl3) δ 7.72 (d, J = 1.9 Hz, 1H), 7.56 (dd, J = 11.4, 1.9 Hz, 1H), 7.37 (d, J = 11.5 Hz, 1H), 7.21 (t, J = 57.3 Hz, 1H), 4.34 (q, J = 7.7 Hz, 1H), 3.96 (s, 3H), 3.77-3.70 (m, 1H), 1.34 (d, J = 7.7 Hz, 3H), 0.77-0.72 (m, 2H), 0.72-0.67 (m, 2H). |
| 212 | ¹H NMR (500 MHz, CDCl3) δ 7.74 (d, J = 1.9 Hz, 1H), 7.68 (dd, J = 9.5, 2.0 Hz, 1H), 7.49 (d, J = 9.5 Hz, 1H), 7.21 (t, J = 57.3 Hz, 1H), 4.34 (q, J = 7.7 Hz, 1H), 3.96 (s, 3H), 3.77-3.70 (m, 1H), 3.21 (s, 3H), 1.34 (d, J = 7.7 Hz, 3H), 0.77-0.72 (m, 2H), 0.72-0.67 (m, 2H). |
| 213 | ¹H NMR (500 MHz, CDCl3) δ 8.03-7.99 (m, 1H), 7.79-7.73 (m, 1H), 7.50-7.42 (m, 2H), 7.21 (t, J = 57.3 Hz, 1H), 4.31 (q, J = 7.7 Hz, 1H), 3.96 (s, 3H), 3.78-3.70 (m, 1H), 3.18 (s, 3H), 1.34 (d, J = 7.7 Hz, 3H), 0.78-0.72 (m, 2H), 0.72-0.66 (m, 2H). |
| 214 | ¹H NMR (500 MHz, CDCl3) δ 7.88 (dd, J = 8.0, 2.0 Hz, 1H), 7.58 (dd, J = 7.8, 2.1 Hz, 1H), 7.50-7.41 (m, 2H), 7.21 (t, J = 57.3 Hz, 1H), 4.31 (q, J = 7.6 Hz, 1H), 3.96 (s, 3H), 3.77-3.70 (m, 1H), 3.20 (s, 3H), 1.34 (d, J = 7.7 Hz, 3H), 0.77-0.72 (m, 2H), 0.72-0.67 (m, 2H). |
| 215 | ¹H NMR (500 MHz, CDCl3) δ 7.92 (d, J = 2.2 Hz, 1H), 7.66 (dd, J = 9.3, 2.2 Hz, 1H), 7.57 (d, J = 9.4 Hz, 1H), 7.21 (t, J = 57.3 Hz, 1H), 4.35 (q, J = 7.7 Hz, 1H), 3.96 (s, 3H), 3.77-3.69 (m, 1H), 3.18 (s, 3H), 1.34 (d, J = 7.7 Hz, 3H), 0.78-0.72 (m, 2H), 0.72-0.67 (m, 2H). |
| 216 | ¹H NMR (500 MHz, CDCl3) δ 7.83-7.76 (m, 1H), 7.57-7.50 (m, 2H), 7.21 (t, J = 57.3 Hz, 1H), 4.32 (q, J = 7.7 Hz, 1H), 3.96 (s, 3H), 3.78-3.69 (m, 1H), 3.27 (q, J = 9.2, 1.4 Hz, 2H), 1.34 (d, J = 7.7 Hz, 3H), 1.27 (t, J = 9.2 Hz, 3H), 0.79-0.72 (m, 2H), 0.72-0.64 (m, 2H). |

TABLE 1-continued

| Compound number | Nuclear magnetic data |
|---|---|
| 217 | $^1$H NMR (500 MHz, CDCl3) δ 7.83-7.74 (m, 2H), 7.52-7.44 (m, 2H), 7.21 (t, J = 57.3 Hz, 1H), 4.31 (q, J = 7.7 Hz, 1H), 3.96 (s, 3H), 3.77-3.70 (m, 1H), 3.28 (q, J = 9.2, 2.6 Hz, 2H), 1.34 (d, J = 7.7 Hz, 3H), 1.26 (t, J = 9.1 Hz, 3H), 0.77-0.72 (m, 2H), 0.72-0.66 (m, 2H). |
| 218 | $^1$H NMR (500 MHz, CDCl3) δ 7.49 (d, J = 1.9 Hz, 1H), 7.35-7.29 (m, 1H), 7.28 (d, J = 11.1 Hz, 1H), 7.19 (t, J = 57.3 Hz, 1H), 4.34 (q, J = 7.7 Hz, 1H), 3.96 (s, 3H), 3.78-3.69 (m, 1H), 2.98-2.90 (m, 1H), 1.34 (d, J = 7.7 Hz, 3H), 1.29-1.20 (m, 2H), 1.20-1.10 (m, 2H), 0.77-0.72 (m, 2H), 0.72-0.66 (m, 2H). |
| 219 | $^1$H NMR (500 MHz, CDCl3) δ 7.36-7.32 (m, 1H), 7.32-7.23 (m, 1H), 7.22 (t, J = 57.3 Hz, 1H), 7.21-7.08 (m, 1H), 4.35 (q, J = 7.7 Hz, 1H), 3.96 (s, 3H), 3.78-3.69 (m, 1H), 2.99-2.90 (m, 1H), 1.35 (d, J = 7.7 Hz, 3H), 1.28-1.20 (m, 2H), 1.20-1.13 (m, 2H), 0.77-0.72 (m, 2H), 0.72-0.66 (m, 2H). |

Test Example 1

Enzyme Activity Assay

The inhibitory activities of control agents and target compounds on succinate dehydrogenase are determined.

The enzyme used in this test example is succinate dehydrogenase, which is isolated from porcine hearts.

The test method comprises the following steps: The total volume of the system is 1.8 ml, and the system contained 100 mM $Na_2HPO_4$—$NaH_2PO_4$ buffer (pH=7.4), 0.3 mM EDTA, 20 mM sodium succinate, 53 μM DCIP (2,6-dichloroindophenol sodium), and 2 nM succinate dehydrogenase. Thermostatic waterbath at 23° C. and magnetic stirring at 600 rpm. The decrease in the light absorption of the substrate DCIP is monitored at a wavelength of 600 nm and experimental points in a linear range are collected. Control substrate consumption not more than 5% of the experimental points. The molar extinction coefficient of DCIP is 21 $mM^{-1}$ $cm^{-1}$. And calculating the reduction yield of the DCIP in the reaction time, fitting a linear slope, and deducting the baseline slope to obtain the initial reaction speed.

The test results are shown in Table 2.

TABLE 2

| Compound number | Inhibitors (10 μM, SQR) |
|---|---|
| 1 | >90% |
| 2 | >90% |
| 3 | >90% |
| 4 | >90% |
| 5 | >90% |
| 6 | >90% |
| 7 | >90% |
| 8 | >90% |
| 9 | >90% |
| 10 | >90% |
| 11 | >90% |
| 12 | >90% |
| 13 | >90% |
| 14 | >90% |
| 15 | >90% |
| 16 | >90% |
| 17 | >90% |
| 18 | >90% |
| 19 | >90% |
| 20 | >90% |
| 21 | >90% |
| 22 | >90% |
| 23 | >90% |
| 24 | >90% |
| 25 | >90% |
| 26 | >90% |
| 27 | >90% |
| 28 | >90% |
| 29 | >90% |
| 30 | >90% |
| 31 | >90% |
| 32 | >90% |
| 33 | >90% |
| 34 | >90% |
| 35 | >90% |
| 36 | >90% |
| 37 | >90% |
| 38 | >90% |
| 39 | >90% |
| 40 | >90% |
| 41 | >90% |
| 42 | >90% |
| 43 | >90% |
| 44 | >90% |
| 45 | >90% |
| 46 | >90% |
| 47 | >90% |
| 48 | >90% |
| 49 | >90% |
| 50 | >90% |
| 51 | >90% |
| 52 | >90% |
| 53 | >90% |
| 54 | >90% |
| 55 | >90% |
| 56 | >90% |
| 57 | >90% |
| 58 | >90% |
| 59 | >90% |
| 60 | >90% |
| 61 | >90% |
| 62 | >90% |
| 63 | >90% |
| 64 | >90% |
| 65 | >90% |
| 66 | >90% |
| 67 | >90% |
| 68 | >90% |
| 69 | >90% |
| 70 | >90% |
| 71 | >90% |
| 72 | >90% |
| 73 | >90% |
| 74 | >90% |
| 75 | >90% |
| 76 | >90% |
| 77 | >90% |
| 78 | >90% |
| 79 | >90% |
| 80 | >90% |
| 81 | >90% |
| 82 | >90% |
| 83 | >90% |
| 84 | >90% |

TABLE 2-continued

| Compound number | Inhibitors (10 μM, SQR) |
|---|---|
| 85 | >90% |
| 86 | >90% |
| 87 | >90% |
| 88 | >90% |
| 89 | >90% |
| 90 | >90% |
| 91 | >90% |
| 92 | >90% |
| 93 | >90% |
| 94 | >90% |
| 95 | >90% |
| 96 | >90% |
| 97 | >90% |
| 98 | >90% |
| 99 | >90% |
| 100 | >90% |
| 101 | >90% |
| 102 | >90% |
| 103 | >90% |
| 104 | >90% |
| 105 | >90% |
| 106 | >90% |
| 107 | >90% |
| 108 | >90% |
| 109 | >90% |
| 110 | >90% |
| 111 | >90% |
| 112 | >90% |
| 113 | >90% |
| 114 | >90% |
| 115 | >90% |
| 116 | >90% |
| 117 | >90% |
| 118 | >90% |
| 119 | >90% |
| 120 | >90% |
| 121 | >90% |
| 122 | >90% |
| 123 | >90% |
| 124 | >90% |
| 125 | >90% |
| 126 | >90% |
| 127 | >90% |
| 128 | >90% |
| 129 | >90% |
| 130 | >90% |
| 131 | >90% |
| 132 | >90% |
| 133 | >90% |
| 134 | >90% |
| 135 | >90% |
| 136 | >90% |
| 137 | >90% |
| 138 | >90% |
| 139 | >90% |
| 140 | >90% |
| 141 | >90% |
| 142 | >90% |
| 143 | >90% |
| 144 | >90% |
| 145 | >90% |
| 146 | >90% |
| 147 | >90% |
| 148 | >90% |
| 149 | >90% |
| 150 | >90% |
| 151 | >90% |
| 152 | >90% |
| 153 | >90% |
| 154 | >90% |
| 155 | >90% |
| 156 | >90% |
| 157 | >90% |
| 158 | >90% |
| 159 | >90% |
| 160 | >90% |
| 161 | >90% |
| 162 | >90% |
| 163 | >90% |
| 164 | >90% |
| 165 | >90% |
| 166 | >90% |
| 167 | >90% |
| 168 | >90% |
| 169 | >90% |
| 170 | >90% |
| 171 | >90% |
| 172 | >90% |
| 173 | >90% |
| 174 | >90% |
| 175 | >90% |
| 176 | >90% |
| 177 | >90% |
| 178 | >90% |
| 179 | >90% |
| 180 | >90% |
| 181 | >90% |
| 182 | >90% |
| 183 | >90% |
| 184 | >90% |
| 185 | >90% |
| 186 | >90% |
| 187 | >90% |
| 188 | >90% |
| 189 | >90% |
| 190 | >90% |
| 191 | >90% |
| 192 | >90% |
| 193 | >90% |
| 194 | >90% |
| 195 | >90% |
| 196 | >90% |
| 197 | >90% |
| 198 | >90% |
| 199 | >90% |
| 200 | >90% |
| 201 | >90% |
| 202 | >90% |
| 203 | >90% |
| 204 | >90% |
| 205 | >90% |
| 206 | >90% |
| 207 | >90% |
| 208 | >90% |
| 209 | >90% |
| 210 | >90% |
| 211 | >90% |
| 212 | >90% |
| 213 | >90% |
| 214 | >90% |
| 215 | >90% |
| 216 | >90% |
| 217 | >90% |
| 218 | >90% |
| 219 | >90% |

The enzyme activity test result shows that the compound provided by the invention has excellent inhibitory activity on succinate dehydrogenase.

Test Example 2

Fungicidal Activity Test

The fungicidal activity of the control agents and target compounds are determined.

*Erysiphe graminis*

The test and investigation method refers to SOP-SC-1116 *Erysiphe graminis* potting method in disinfectant rolls written by KANGZHUO and GUBAOGEN in "Standard operation specification for testing biological activity of pesticides".

Sphaerotheca fuliginea

The test and investigation method refers to SOP-SC-1101 *sphaerotheca fuliginea* potting method in disinfectant rolls written by KANGZHUO and GUBAOGEN in "Standard operation specification for testing biological activity of pesticides".

The controlling effect are shown in table 3 and table 4.

TABLE 3

| | Erysiphe graminis | | |
|---|---|---|---|
| | 100 mg/L | 25 mg/L | 6.25 mg/L |
| Compounds 1 to 33 | A | A | A |
| Compound 34 | A | A | B |
| Compound 35 | A | A | B |
| Compound 36 | A | A | A |
| Compound 37 | A | A | B |
| Compound 38 | A | A | B |
| Compounds 39 to 219 | A | A | A |
| Pydiflumetofen | A | A | A |
| Fenaminstrobin | A | A | B |
| Prothioconazole | A | A | B |

In table 3, A and B both represent control ratings, and 80% ≤ A ≤ 100%; 70% ≤ B < 80%; C <70%.

TABLE 4

| Compound number | Sphaerotheca fuliginea 100 mg/L |
|---|---|
| 1 | A |
| 2 | A |
| 3 | A |
| 4 | C |
| 5 | C |
| 6 | A |
| 7 | A |
| 8 | A |
| 9 | C |
| 10 | A |
| 11 | A |
| 12 | B |
| 13 | A |
| 14 | A |
| 15 | B |
| 16 | B |
| 17 | A |
| 18 | A |
| 19 | A |
| 20 | A |
| 21 | B |
| 22 | A |
| 23 | A |
| 24 | A |
| 25 | A |
| 26 | A |
| 27 | A |
| 28 | A |
| 29 | A |
| 30 | A |
| 31 | A |
| 32 | B |
| 33 | A |
| 34 | A |
| 35 | A |
| 36 | A |
| 37 | B |
| 38 | B |
| 39 | B |
| 40 | B |
| 41 | A |
| 42 | A |
| 43 | A |
| 44 | A |
| 45 | A |
| 46 | A |
| 47 | A |
| 48 | A |
| 49 | A |
| 50 | A |
| 51 | A |
| 52 | A |
| 53 | B |
| 54 | A |
| 55 | A |
| 56 | A |
| 57 | A |
| 58 | A |
| 59 | A |
| 60 | A |
| 61 | A |
| 62 | A |
| 63 | A |
| 64 | A |
| 65 | A |
| 66 | A |
| 67 | A |
| 68 | A |
| 69 | A |
| 70 | A |
| 71 | A |
| 72 | A |
| 73 | A |
| 74 | A |
| 75 | A |
| 76 | A |
| 77 | A |
| 78 | A |
| 79 | A |
| 80 | A |
| 81 | A |
| 82 | A |
| 83 | A |
| 84 | A |
| 85 | A |
| 86 | A |
| 87 | A |
| 88 | A |
| 89 | A |
| 90 | A |
| 91 | A |
| 92 | A |
| 93 | A |
| 94 | A |
| 95 | A |
| 96 | A |
| 97 | A |
| 98 | A |
| 99 | A |
| 100 | A |
| 101 | A |
| 102 | A |
| 103 | A |
| 104 | A |
| 105 | A |
| 106 | A |
| 107 | A |
| 108 | A |
| 109 | A |
| 110 | A |
| 111 | A |
| 112 | A |
| 113 | A |
| 114 | A |
| 115 | A |
| 116 | A |
| 117 | A |
| 118 | A |
| 119 | A |
| 120 | A |
| 121 | A |

TABLE 4-continued

| Compound number | Sphaerotheca fuliginea 100 mg/L |
|---|---|
| 122 | A |
| 123 | A |
| 124 | A |
| 125 | A |
| 126 | A |
| 127 | A |
| 128 | A |
| 129 | A |
| 130 | A |
| 131 | A |
| 132 | A |
| 133 | A |
| 134 | A |
| 135 | A |
| 136 | A |
| 137 | A |
| 138 | A |
| 139 | A |
| 140 | A |
| 141 | A |
| 142 | A |
| 143 | A |
| 144 | A |
| 145 | A |
| 146 | A |
| 147 | A |
| 148 | A |
| 149 | A |
| 150 | A |
| 151 | A |
| 152 | A |
| 153 | A |
| 154 | A |
| 155 | A |
| 156 | A |
| 157 | A |
| 158 | A |
| 159 | A |
| 160 | A |
| 161 | A |
| 162 | A |
| 163 | A |
| 164 | A |
| 165 | A |
| 166 | A |
| 167 | A |
| 168 | A |
| 169 | A |
| 170 | A |
| 171 | A |
| 172 | A |
| 173 | A |
| 174 | A |
| 175 | A |
| 176 | A |
| 177 | A |
| 178 | A |
| 179 | A |
| 180 | A |
| 181 | A |
| 182 | A |
| 183 | A |
| 184 | A |
| 185 | A |
| 186 | A |
| 187 | A |
| 188 | A |
| 189 | A |
| 190 | A |
| 191 | A |
| 192 | A |
| 193 | A |
| 194 | A |
| 195 | A |
| 196 | A |
| 197 | A |
| 198 | A |
| 199 | A |
| 200 | A |
| 201 | A |
| 202 | A |
| 203 | A |
| 204 | A |
| 205 | A |
| 206 | A |
| 207 | A |
| 208 | A |
| 209 | A |
| 210 | A |
| 211 | A |
| 212 | A |
| 213 | A |
| 214 | A |
| 215 | A |
| 216 | A |
| 217 | A |
| 218 | A |
| 219 | A |
| Pydiflumetofen | A |
| Prothioconazole | B |
| Fenaminstrobin | B |

In table 4, A and B both represent control ratings, and 80% ≤ A ≤ 100%; 70% ≤ B < 80%; C <70%.

Test Example 3

Compound 1 is tested for isolated hyphae.

First, the pathogenic fungi to be tested are primarily screened. The mycelial growth rate method is used to determine the inhibitory effect of the medicament on the mycelial growth of several tested pathogens. Take a plate with a diameter of 5 mm from the edge of the colony that has been continuously transferred and cultured for 4 days, and the plate is inoculated on PDA plates containing the medicament concentrations of 25 μg/mL, 6.25 μg/mL, 1.5625 μg/mL, respectively, and 3 replicates of each treatment are performed. All dishes are incubated in a sterile 25° C. incubator.

When the blank control fungi grow to ⅔ of the diameter of the culture dish, the diameters of the control and treated colonies are measured by adopting a cross method, and the hypha growth inhibition rate is calculated.

Inhibition=(control colony diameter-treated colony diameter)/(control colony diameter-mycelial plug)×100%

The results are shown in table 5.

TABLE 5

| Compound Number of | Concentration μg/mL | Inhibition ratio (%) | | | | | | | | |
|---|---|---|---|---|---|---|---|---|---|---|
| | | *Phytophthora infestans* | *Sclerotinia sclerotiorum* | *Gibberella zeae* | *Rhizoctonia cerealis* | *Alternaria alternata* | *Alternaria solani* | *Phytophthora capsici* | Fusarium wilt of water melon | Corn big spot |
| Pydiflumetofen | 1.5625 | A | C | A | A | A | A | B | A | A |
| | 6.25 | A | A | A | A | A | A | A | A | A |
| | 25 | A | A | A | A | A | A | A | A | A |
| Compound 1 | 1.5625 | A | C | A | C | A | A | B | A | A |
| | 6.25 | A | A | A | B | A | A | A | A | A |
| | 25 | A | A | A | A | A | A | A | A | A |

The results of fungicidal activity test in vivo and in vitro mycelium show that the compound provided by the invention has excellent fungicidal activity on plant fungal diseasess, such as at least one of *Erysiphe graminis, sphaerotheca fuliginea*, wheat scab, rice bakanae disease, *sclerotinia* rot of colza, corn small leaf spot, wheat stripe rust and cucumber gray mold, and most of the compounds are superior to commercialized control pydiflumetofen, fenaminstrobin and prothioconazole, and part of the compounds are basically equivalent to the current commercialized medicaments with the best powdery mildew.

Test Example 4

Compound 1 for Field Test of *Ssphaerotheca fuliginea*

The test is carried out according to GB/T17980.30-2000 of pesticide field efficacy test guidelines. The survey method is to randomly take four points for each cell and survey all leaves of 2 plants per point. And investigating the *sphaerotheca fuliginea* incidence before the first application, and investigating the *sphaerotheca fuliginea* incidence 7 and 14 days after the second application respectively, and calculating the disease index and the controlling effect. The results are shown in table 6.

TABLE 6

| Group | Medicament | Controlling effect % |
|---|---|---|
| 1 | Compound 1 at 50 mg/L | 82 |
| 2 | Compound 1 at 100 mg/L | 88 |
| 3 | Compound 1 at 200 mg/L | 92 |
| 4 | Pydiflumetofen 100 mg/L | 92 |
| 5 | 29% Isopyrazam-azoxystrobin suspension (Reflect Xtra) 100 mg/L | 95 |
| 6 | CK | 72 (disease index) |

From the field test results of *sphaerotheca fuliginea*, the compound 1 can still maintain the controlling effect of more than 80% at the concentration of 50 mg/L. At 100 mg/L concentration, compound 1 has the same control effect as the current mainstream insecticides against *sphaerotheca fuliginea*, and it has strong development value.

Test Example 5

Test of protective activity and therapeutic activity of Compound 1 against rice bakanae disease.

The test and investigation method refers to SOP-SC-1112 rice bakanae disease potting method in disinfectant rolls written by KANGZHUO and GUBAOGEN in "Standard operation specification for testing biological activity of pesticides".

The phenamacril is a mainstream medicament for preventing and treating the rice bakanae disease at present, resistant strains are more and more along with long-time use, and two strains showing sensitivity and one strain showing resistance to the cyhalothrin are selected as test strains.

Four *Fusarium fujikura* SX18-32, SX18-50, SX18-59 and SX18-63 are selected for testing strains, and the current mainstream commercial bactericide phenamacril is selected as a positive control. Wherein SX18-32, SX18-50 and SX18-59 show sensitivity to phenamacril and SX18-63 show resistance to phenamacril. Their protective and therapeutic activities are listed in table 7 and table 8.

TABLE 7

(Therapeutic activity) The concentration tested is 5 μg/mL (The solvent is DMSO).

| | Sample | |
|---|---|---|
| Strain | Compound 1 | Phenamacril |
| SX18-63 (R) | 83.3% | 0 |
| SX18-32 (S) | 60.2% | 23.8% |
| SX18-59 (S) | 96.8% | 50.0% |

TABLE 8

(Protective activity) The test concentration is 5 μg/mL (The solvent is DMSO).

| | Sample | |
|---|---|---|
| Strain | Compound 1 | Phenamacril |
| SX18-63 (R) | 93.7% | 19.6% |
| SX18-32 (S) | 97.4% | 83.6% |
| SX18-59 (S) | 100.0% | 58.8% |

From the test of the therapeutic activity, it is obvious that the compound 1 of the invention has far better therapeutic effect particularly on a resistant strain SX18-63(R) than the phenamacril, the phenamacril has almost no therapeutic activity on the resistant strain, in addition, the phenamacril has only about 50 percent of therapeutic effect at most on a sensitive strain, and the compound 1 of the invention has 96.8 percent of strong therapeutic effect on SX18-59 (S).

In the test of the protective activity, the protective activity of the compound 1 of the invention on three strains is more than 90 percent, it is close to complete protection and it is also far superior to the phenamacril.

In conclusion, the compound 1 has better therapeutic activity and protective activity on the rice bakanae disease than the current mainstream medicament of phenamacril, and it has great development prospect.

The preferred embodiments of the invention have been described above in detail, but the invention is not limited thereto. Within the scope of the technical idea of the invention, many simple modifications can be made to the technical solution of the invention, including various technical features being combined in any other suitable way, and these simple modifications and combinations should also be regarded as the disclosure of the invention, and all fall within the scope of the invention.

The invention claimed is:

1. A dendrene amide compound of the following formula (I):

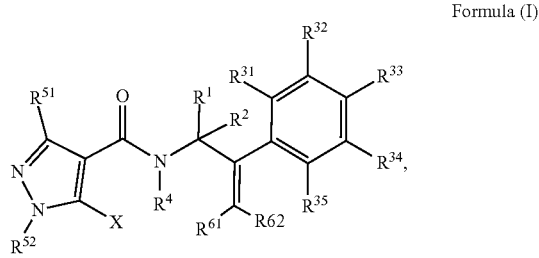

Formula (I)

wherein

X is selected from H, F, or Cl;

$R^1$ and $R^2$ are each independently selected from H, F, Cl, Br, methyl, ethyl, n-propyl, isopropyl, or cyclopropyl;

$R^{31}$, $R^{32}$, $R^{33}$, $R^{34}$ and $R^{35}$ are each independently selected from H, F, Cl, Br, methyl, ethyl, n-propyl, isopropyl, cyclopropyl, n-butyl, isobutyl, tert-butyl, methoxy, ethoxy, trifluoromethyl, n-propoxy, isopropoxy, cyclopropyloxy, n-butoxy, isobutoxy, tert-butoxy, cyano, methylsulfonyl, ethylsulfonyl, n-propylsulfonyl, isopropylsulfonyl, cyclopropylsulfonyl, or substituted or unsubstituted ethynyl; the substituents on $R^{31}$, $R^{32}$, $R^{33}$, $R^{34}$ and $R^{35}$ are each independently selected from at least one of F, Cl, Br, methyl, ethyl, n-propyl, isopropyl, cyclopropyl, n-butyl, t-butyl, methoxy, ethoxy, n-propoxy, isopropoxy, cyclopropyloxy, cyclopropyl-substituted ethynyl, methylsulfonyl, ethylsulfonyl, n-propylsulfonyl, isopropylsulfonyl, cyclopropylsulfonyl, $C_{1-3}$ alkyl substituted by 1-3 halogens selected from F or Cl, or phenyl substituted by 1-3 halogens selected from F or Cl;

$R^4$ is selected from methyl, ethyl, n-propyl, isopropyl, cyclopropyl, methoxy, ethoxy, n-propoxy, isopropoxy, or propynyl;

$R^{51}$ is selected from difluoromethyl or trifluoromethyl; $R^{52}$ is selected from methyl or ethyl; and $R^{61}$ and $R^{62}$ are each independently selected from H, F, Cl, or Br.

2. The compound according to claim 1, wherein, in formula (I),

X is selected from H or F;

$R^1$ and $R^2$ are each independently selected from H, methyl, ethyl, or n-propyl;

$R^{31}$, $R^{32}$, $R^{33}$, $R^{34}$ and $R^{35}$ are each independently selected from H, F, Cl, Br, methyl, ethyl, n-propyl, isopropyl, n-butyl, tert-butyl, methoxy, trifluoromethyl, $C_{1-3}$ alkyl-sulfonyl, ethoxy, substituted or unsubstituted phenyl, substituted or unsubstituted phenoxy, substituted or unsubstituted benzyloxy, substituted or unsubstituted ethynyl; the substituents on $R^{31}$, $R^{32}$, $R^{33}$, $R^{34}$ and $R^{35}$ are selected from at least one of F, Cl, Br, methyl, ethyl, n-propyl, cyclopropyl, isopropyl, n-butyl, t-butyl, cyclopropyl-substituted ethynyl, or $C_{1-3}$ alkyl-sulfonyl;

$R^4$ is selected from cyclopropyl, methoxy, ethoxy, or propynyl;

$R^{51}$ is difluoromethyl; $R^{52}$ is methyl; and $R^{61}$ and $R^{62}$ are each independently selected from H, F, Cl, or Br.

3. The compound according to claim 1, wherein the compound of formula (I) is selected from the following compounds:

| Compound number | Structure |
| --- | --- |
| 1 | ![structure 1] |
| 2 | ![structure 2] |
| 3 | ![structure 3] |
| 4 | ![structure 4] |
| 5 | ![structure 5] |

| Compound number | Structure |
|---|---|
| 6 | |
| 7 | |
| 8 | |
| 9 | |
| 10 | |
| 11 | |
| 12 | |

| Compound number | Structure |
|---|---|
| 13 | |
| 14 | |
| 15 | |
| 16 | |
| 17 | |
| 18 | |
| 19 | |

| Compound number | Structure |
|---|---|
| 20 | 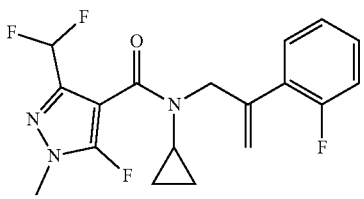 [SMILES: C=C(CN(C(=O)c1c(C(F)F)nn(C)c1F)C1CC1)c1ccccc1C] |
| 21 | 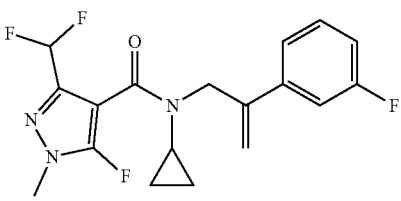 [SMILES: C=C(CN(C(=O)c1c(C(F)F)nn(C)c1F)C1CC1)c1cccc(F)c1] |
| 22 | 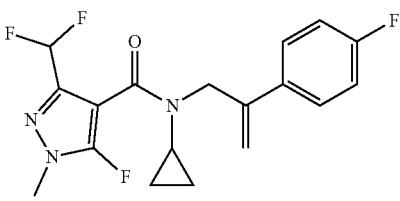 [SMILES: C=C(CN(C(=O)c1c(C(F)F)nn(C)c1F)C1CC1)c1ccc(F)cc1] |
| 23 | 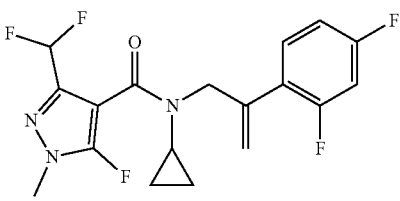 |
| 24 | 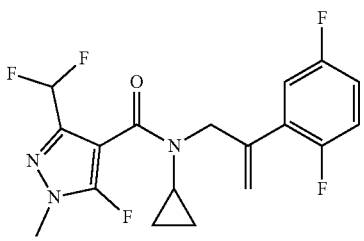 [SMILES: C=C(CN(C(=O)c1c(C(F)F)nn(C)c1F)C1CC1)c1cc(F)ccc1F] |
| 25 | 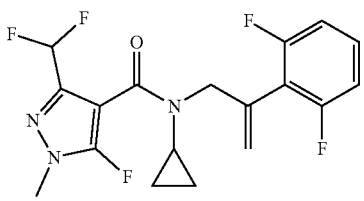 |
| 26 | 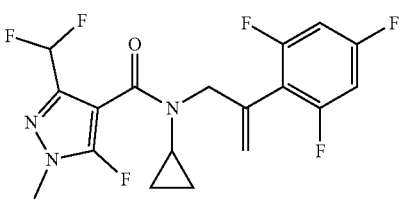 [SMILES: C=C(CN(C(=O)c1c(C(F)F)nn(C)c1F)C1CC1)c1c(F)cc(F)cc1F] |
| Compound number | Structure |
|---|---|
| 27 | 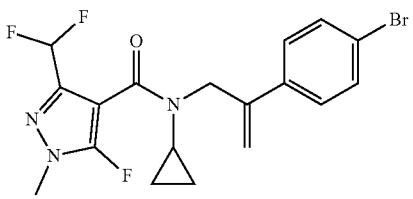 [SMILES: C=C(CN(C(=O)c1c(C(F)F)nn(C)c1F)C1CC1)c1ccc(Br)cc1] |
| 28 | 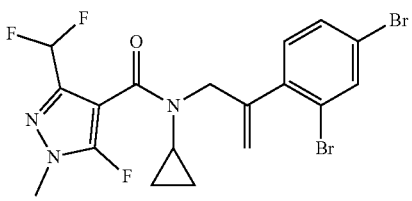 [SMILES: C=C(CN(C(=O)c1c(C(F)F)nn(C)c1F)C1CC1)c1ccc(Br)cc1Br] |
| 29 | 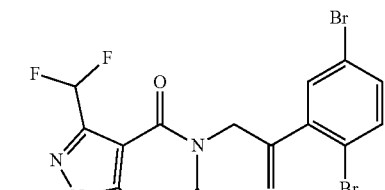 |
| 30 | 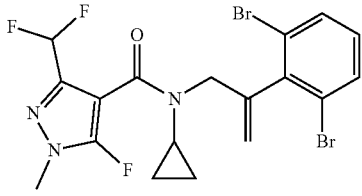 [SMILES: C=C(CN(C(=O)c1c(C(F)F)nn(C)c1F)C1CC1)c1c(Br)cccc1Br] |
| 31 | 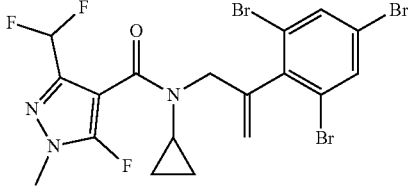 |
| 32 | 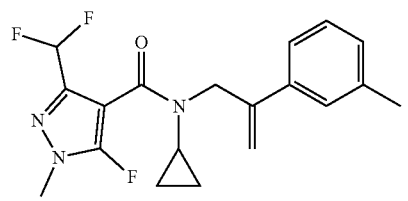 [SMILES: C=C(CN(C(=O)c1c(C(F)F)nn(C)c1F)C1CC1)c1cccc(C)c1] |
| 33 | 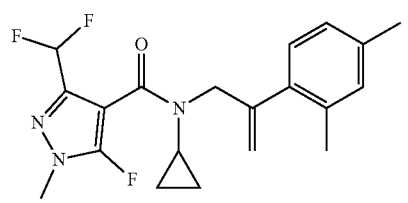 [SMILES: C=C(CN(C(=O)c1c(C(F)F)nn(C)c1F)C1CC1)c1ccc(C)cc1C] |

-continued

| Compound number | Structure |
|---|---|
| 34 | |
| 35 | |
| 36 | |
| 37 | |
| 38 | |
| 39 | |
| 40 | |

-continued

| Compound number | Structure |
|---|---|
| 41 | |
| 42 | |
| 43 | |
| 44 | |
| 45 | |
| 46 | |
| 47 | |

| Compound number | Structure |
|---|---|
| 48 | 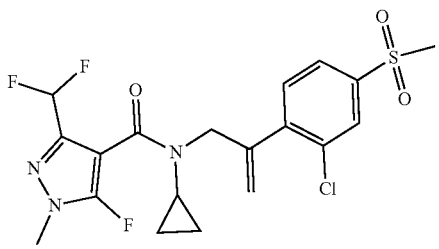 [SMILES: C=C(CN(C(=O)c1c(C(F)F)nn(C)c1F)C1CC1)c1ccc(S(C)(=O)=O)cc1Cl] |
| 49 | 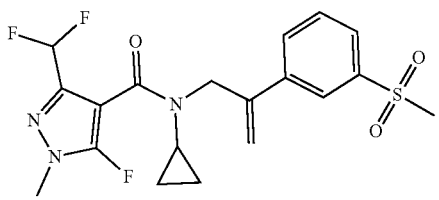 [SMILES: C=C(CN(C(=O)c1c(C(F)F)nn(C)c1F)C1CC1)c1cccc(S(C)(=O)=O)c1] |
| 50 | 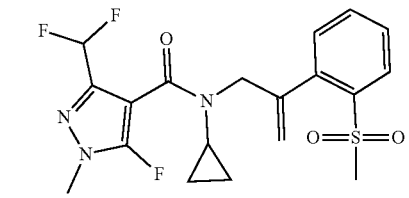 [SMILES: C=C(CN(C(=O)c1c(C(F)F)nn(C)c1F)C1CC1)c1ccccc1S(C)(=O)=O] |
| 51 | 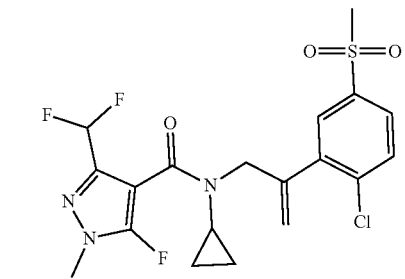 [SMILES: C=C(CN(C(=O)c1c(C(F)F)nn(C)c1F)C1CC1)c1cc(S(C)(=O)=O)ccc1Cl] |
| 52 | 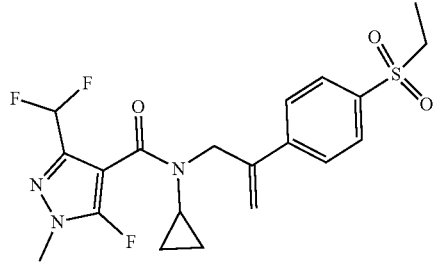 [SMILES: C=C(CN(C(=O)c1c(C(F)F)nn(C)c1F)C1CC1)c1ccc(S(=O)(=O)CC)cc1] |
| 53 | 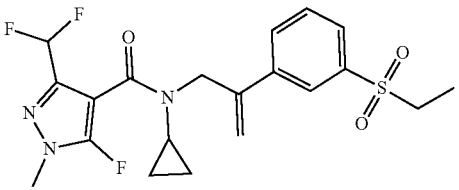 [SMILES: C=C(CN(C(=O)c1c(C(F)F)nn(C)c1F)C1CC1)c1cccc(S(=O)(=O)CC)c1] |
| Compound number | Structure |
|---|---|
| 54 | 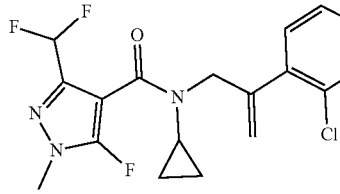 |
| 55 | 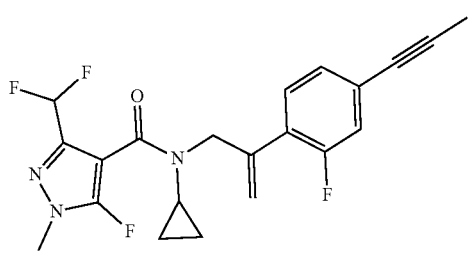 [SMILES: C=C(CN(C(=O)c1c(C(F)F)nn(C)c1F)C1CC1)c1ccc(C#CC)cc1F] |
| 56 | 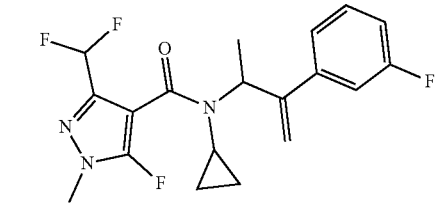 [SMILES: C=C(c1cccc(F)c1)C(C)N(C(=O)c1c(C(F)F)nn(C)c1F)C1CC1] |
| 57 | 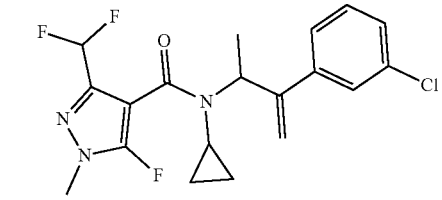 [SMILES: C=C(c1cccc(Cl)c1)C(C)N(C(=O)c1c(C(F)F)nn(C)c1F)C1CC1] |
| 58 | 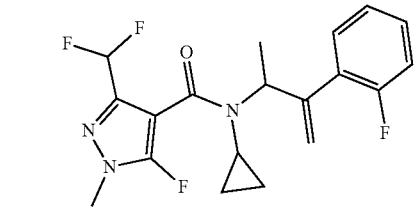 [SMILES: C=C(c1ccccc1F)C(C)N(C(=O)c1c(C(F)F)nn(C)c1F)C1CC1] |
| 59 | 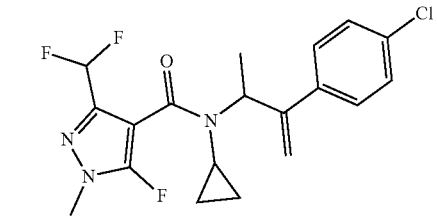 [SMILES: C=C(c1ccc(Cl)cc1)C(C)N(C(=O)c1c(C(F)F)nn(C)c1F)C1CC1] |
| 60 | 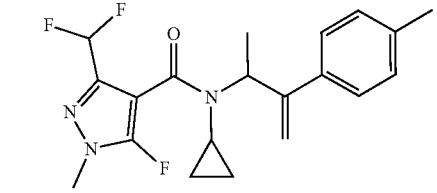 [SMILES: C=C(c1ccc(C)cc1)C(C)N(C(=O)c1c(C(F)F)nn(C)c1F)C1CC1] |

| Compound number | Structure |
|---|---|
| 61 | 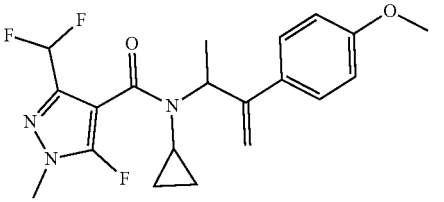 [SMILES: C=C(c1ccc(OC)cc1)C(C)N(C(=O)c1c(C(F)F)nn(C)c1F)C1CC1] |
| 62 | 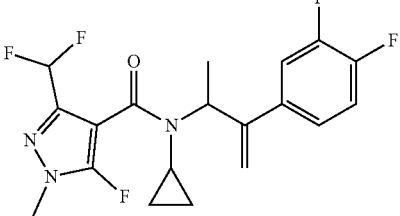 |
| 63 | 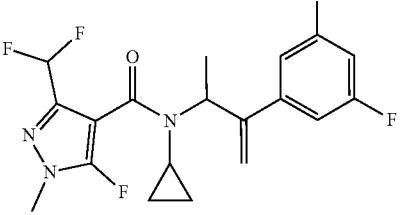 |
| 64 | 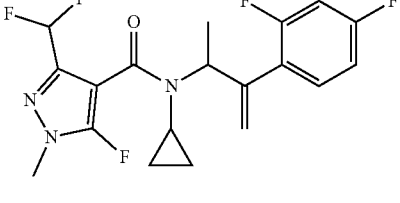 |
| 65 | 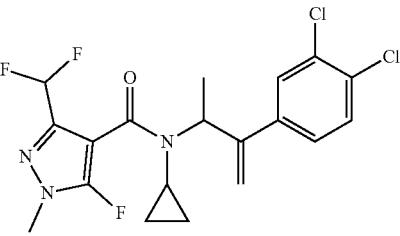 [SMILES: C=C(c1ccc(Cl)c(Cl)c1)C(C)N(C(=O)c1c(C(F)F)nn(C)c1F)C1CC1] |
| 66 | 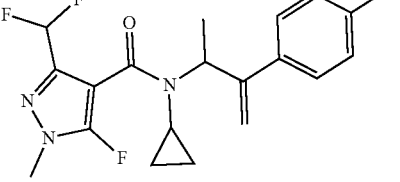 |
| 67 | 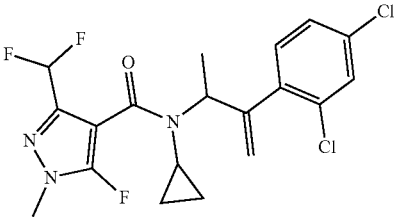 [SMILES: C=C(c1ccc(Cl)cc1Cl)C(C)N(C(=O)c1c(C(F)F)nn(C)c1F)C1CC1] |
| 68 | 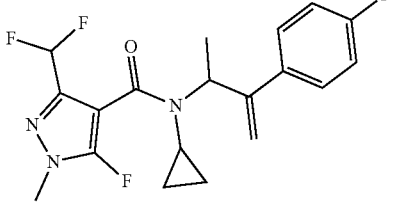 |
| 69 | 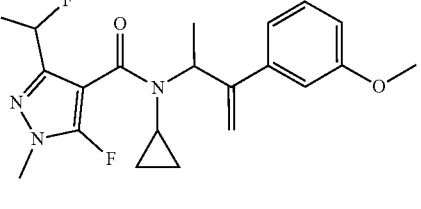 |
| 70 | 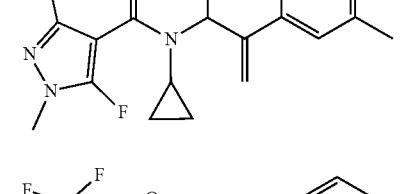 |
| 71 | 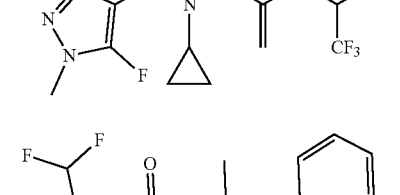 |
| 72 | 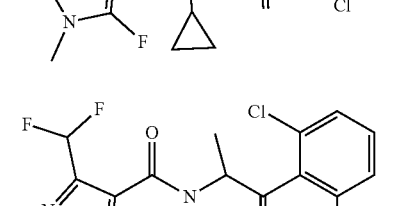 |
| 73 | 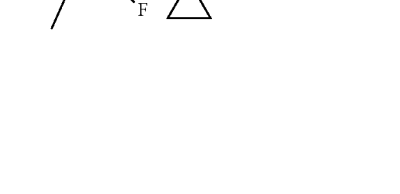 |

US 12,540,118 B2
51
-continued
| Compound number | Structure |
|---|---|
| 74 | 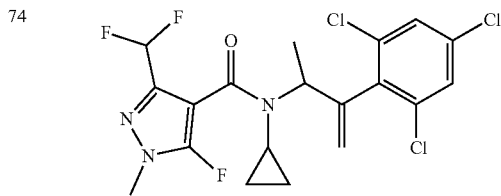 |
| 75 | 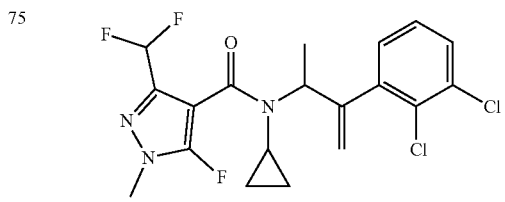 |
| 76 | 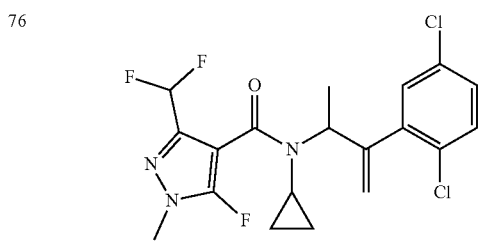 |
| 77 | 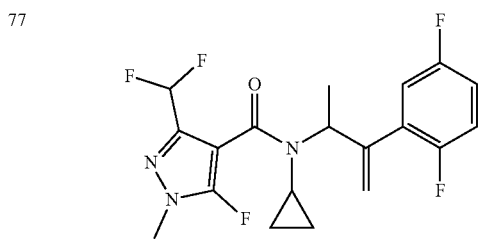 |
| 78 | 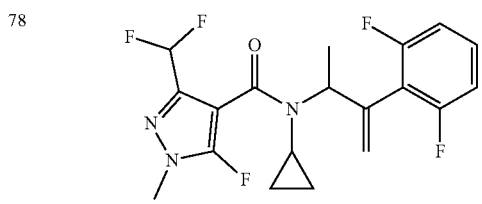 |
| 79 | 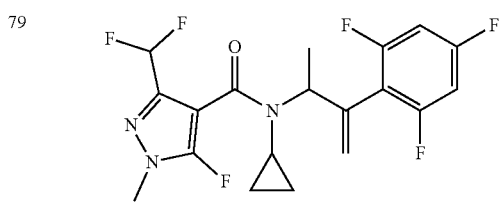 |
| 80 | 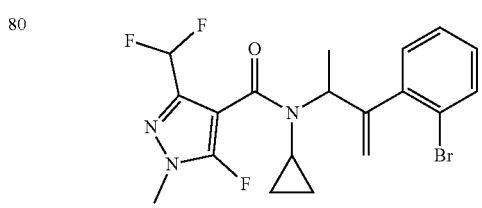 |
52
-continued
| Compound number | Structure |
|---|---|
| 81 | 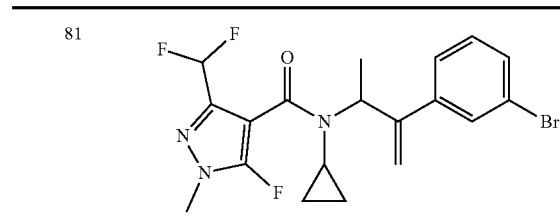 |
| 82 | 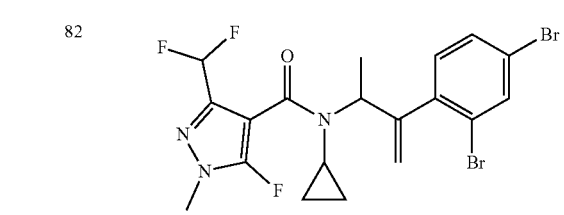 |
| 83 | 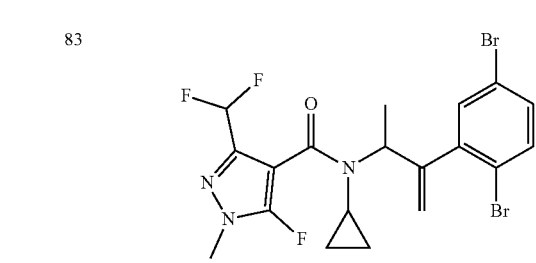 |
| 84 | 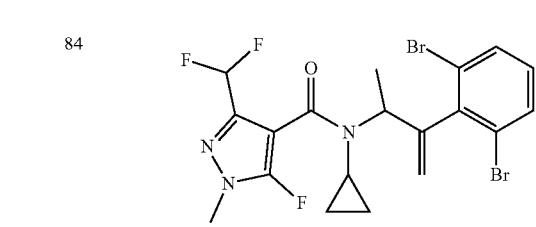 |
| 85 | 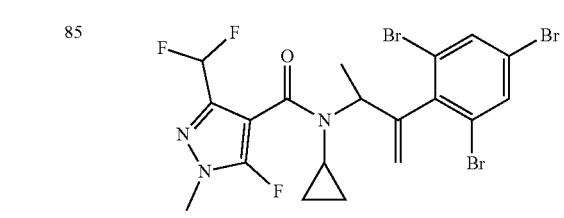 |
| 86 | 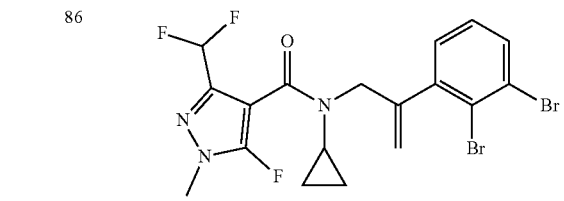 |
| 87 | 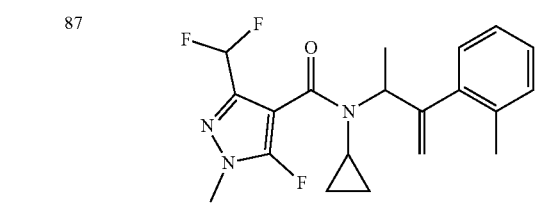 |

-continued

| Compound number | Structure |
|---|---|
| 88 | (structure) |
| 89 | (structure) |
| 90 | (structure) |
| 91 | (structure) |
| 92 | (structure) |
| 93 | (structure) |
| 94 | (structure) |

-continued

| Compound number | Structure |
|---|---|
| 95 | (structure) |
| 96 | (structure) |
| 97 | (structure) |
| 98 | (structure) |
| 99 | (structure) |
| 100 | (structure) |
| 101 | (structure) |

-continued
| Compound number | Structure |
|---|---|
| 102 | |
| 103 | |
| 104 | |
| 105 | |
| 106 | |
| 107 | |
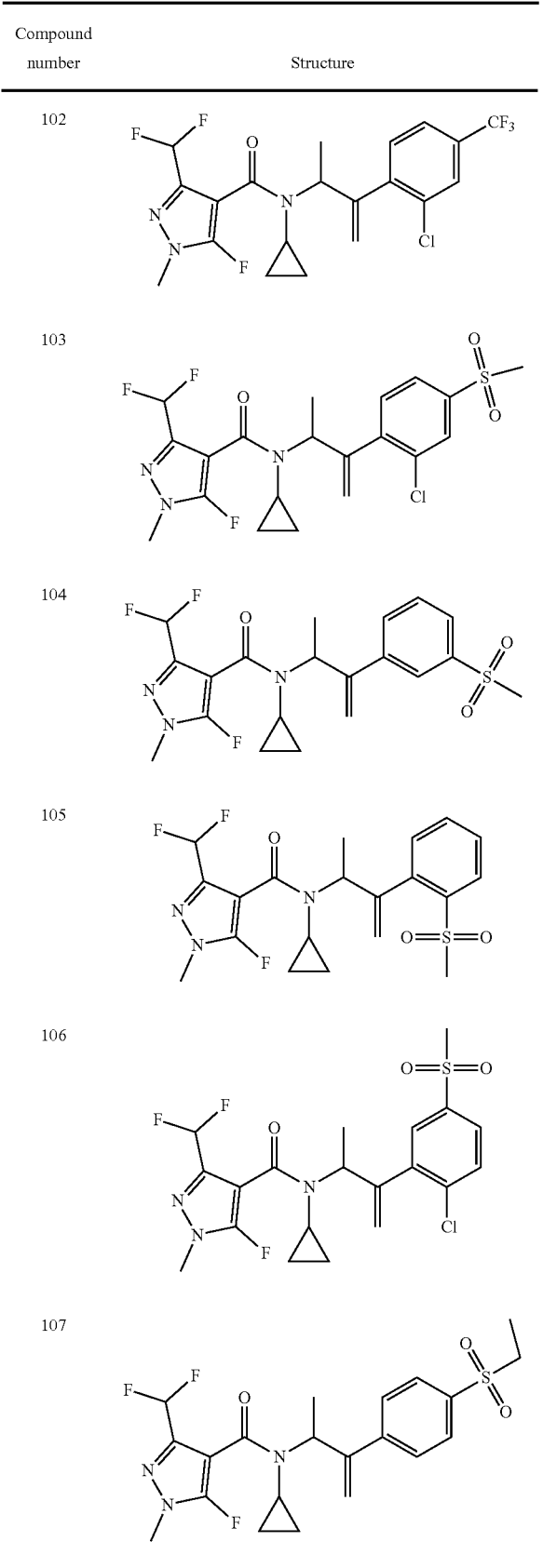
-continued
| Compound number | Structure |
|---|---|
| 108 | |
| 109 | |
| 110 | |
| 111 | |
| 112 | |
| 113 | |
| 114 | |
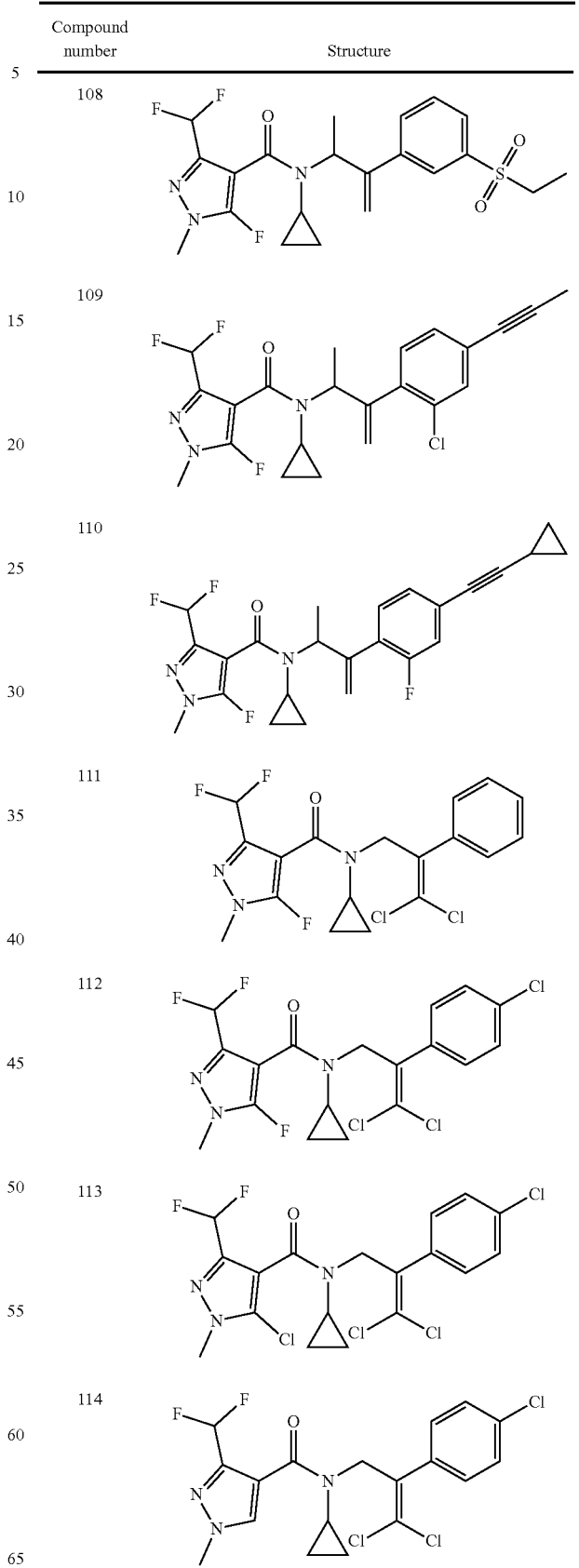

| Compound number | Structure |
|---|---|
| 115 | 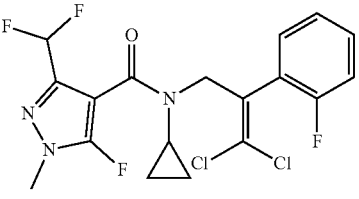 [SMILES: Cn1nc(C(F)F)c(C(=O)N(CC(=C(Cl)Cl)c2ccccc2F)C2CC2)c1F] |
| 116 | 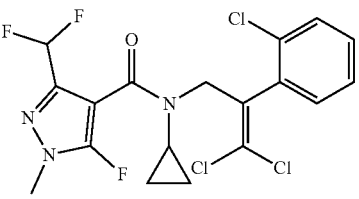 [SMILES: Cn1nc(C(F)F)c(C(=O)N(CC(=C(Cl)Cl)c2ccccc2Cl)C2CC2)c1F] |
| 117 | 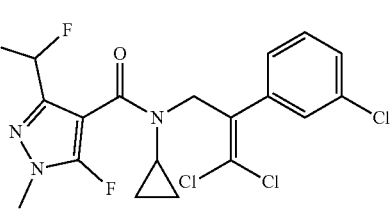 |
| 118 | 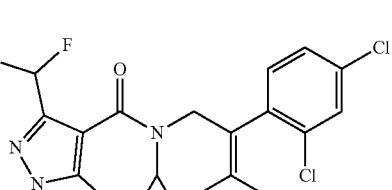 |
| 119 | 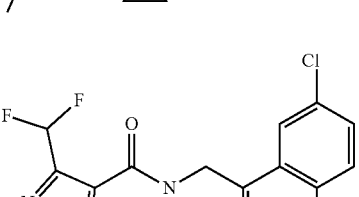 |
| 120 | 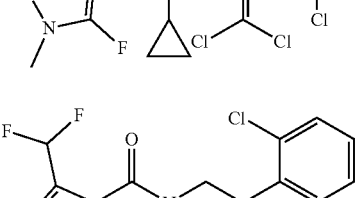 |
| 121 | 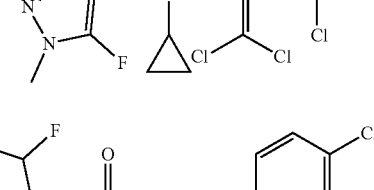 |
| Compound number | Structure |
|---|---|
| 122 | 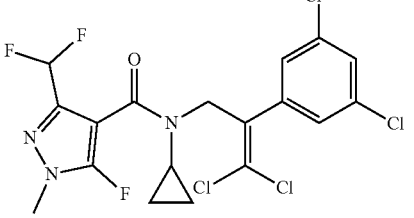 |
| 123 | 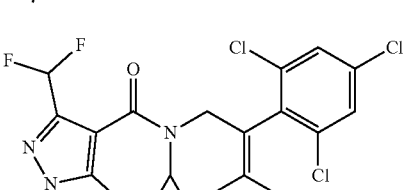 |
| 124 | 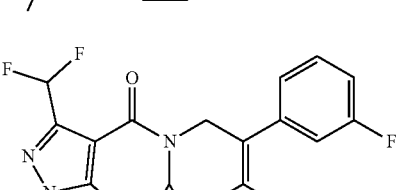 |
| 125 | 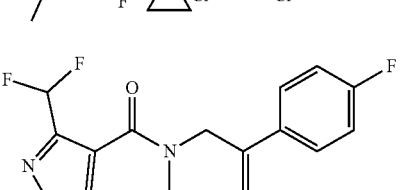 |
| 126 | 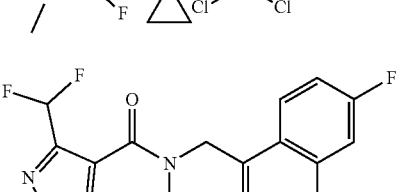 |
| 127 | 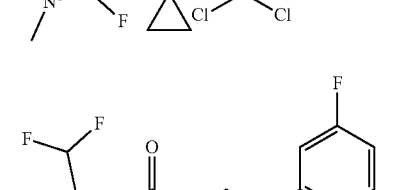 |
| 128 | 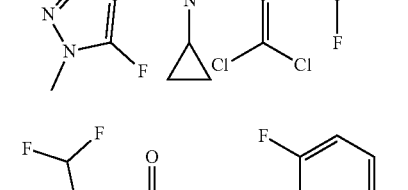 |

| Compound number | Structure |
|---|---|
| 129–135 | 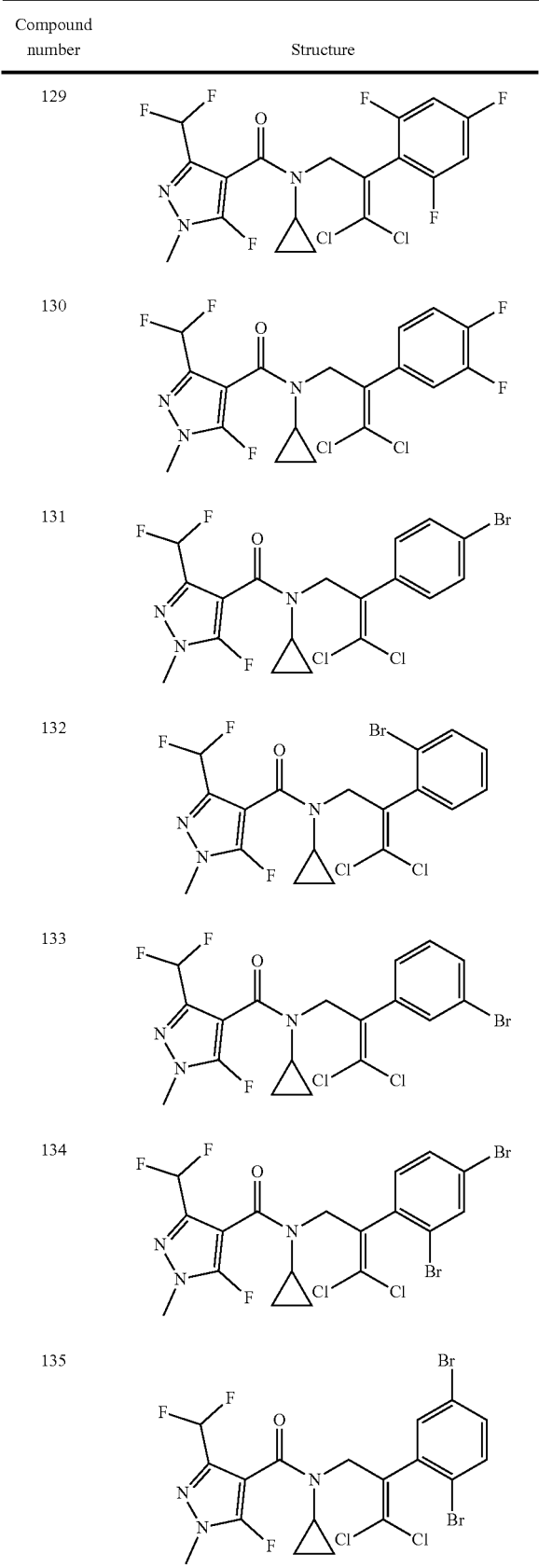 |
| 136–142 | 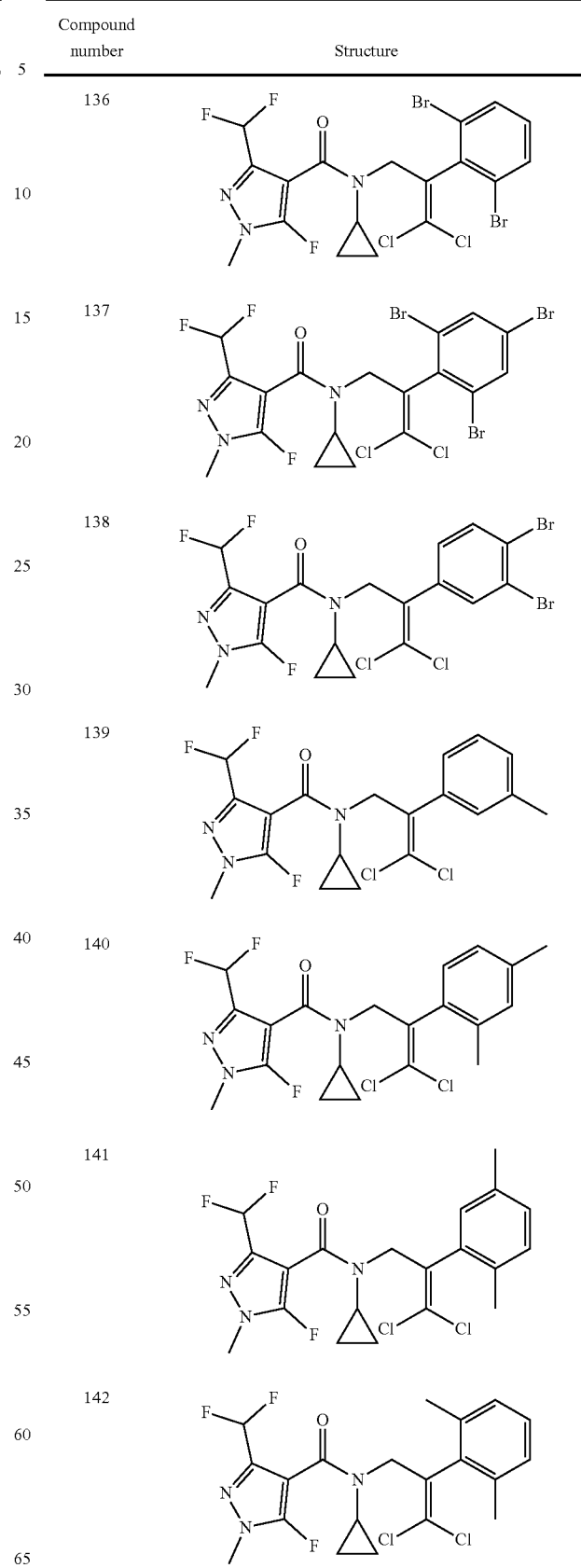 |

-continued

| Compound number | Structure |
|---|---|
| 143 | (structure) |
| 144 | (structure) |
| 145 | (structure) |
| 146 | (structure) |
| 147 | (structure) |
| 148 | (structure) |
| 149 | (structure) |
| 150 | (structure) |
| 151 | (structure) |
| 152 | (structure) |
| 153 | (structure) |
| 154 | (structure) |
| 155 | (structure) |
| 156 | (structure) |

| Compound number | Structure |
|---|---|
| 157 | 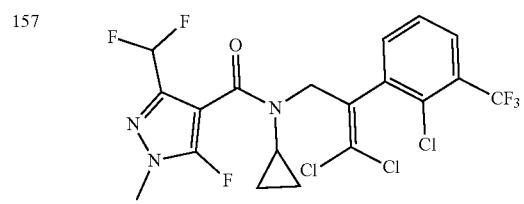 |
| 158 | 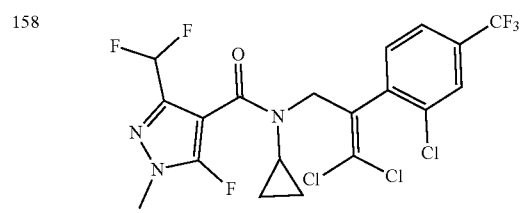 |
| 159 | 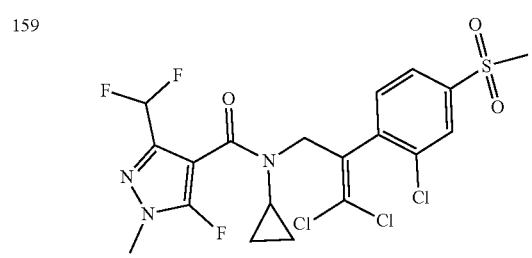 |
| 160 | 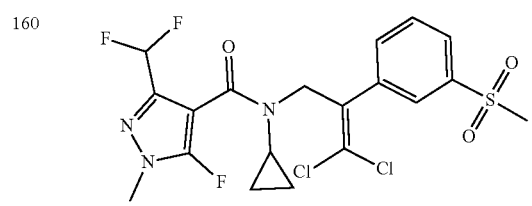 |
| 161 | 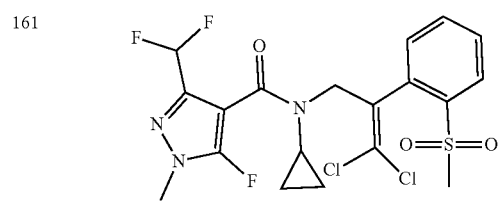 |
| 162 | 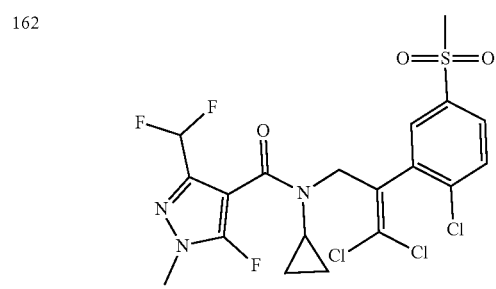 |
| Compound number | Structure |
|---|---|
| 163 | 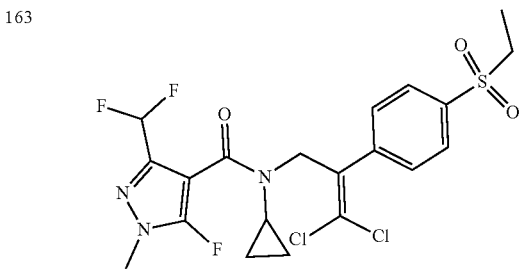 |
| 164 | 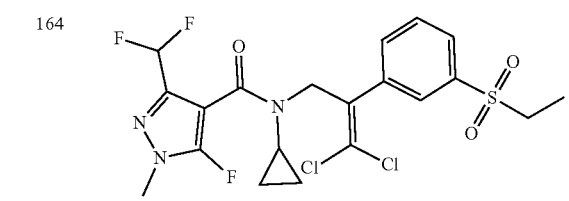 |
| 165 | 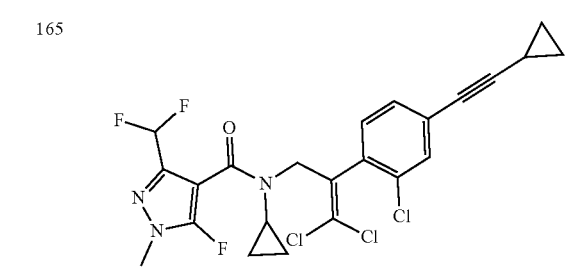 |
| 166 | 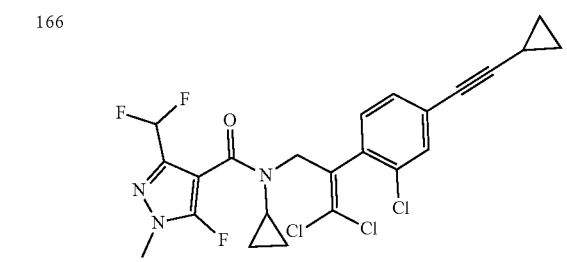 |
| 167 | 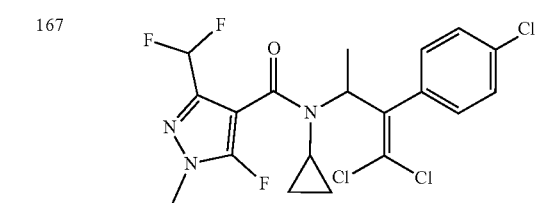 |
| 168 | 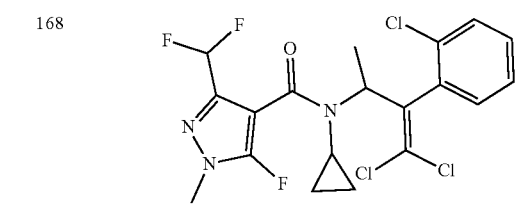 |

-continued

| Compound number | Structure |
|---|---|
| 169 | |
| 170 | |
| 171 | |
| 172 | |
| 173 | |
| 174 | |
| 175 | |

-continued

| Compound number | Structure |
|---|---|
| 176 | |
| 177 | |
| 178 | |
| 179 | |
| 180 | |
| 181 | |
| 182 | |

| Compound number | Structure |
|---|---|
| 183 | |
| 184 | |
| 185 | |
| 186 | |
| 187 | |
| 188 | |
| 189 | |
| 190 | |
| 191 | |
| 192 | |
| 193 | |
| 194 | |
| 195 | |
| 196 | |

| Compound number | Structure |
|---|---|
| 197 | 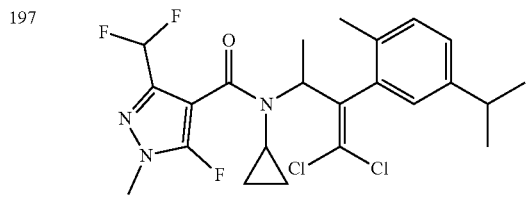 |
| 198 | 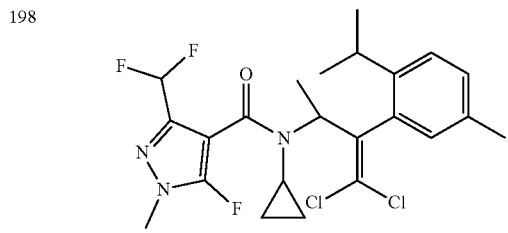 |
| 199 | 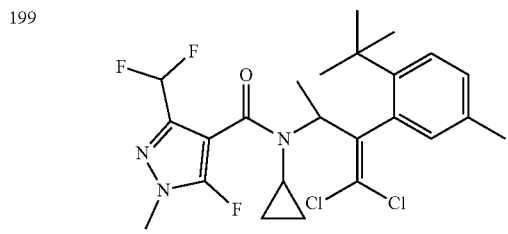 |
| 200 | 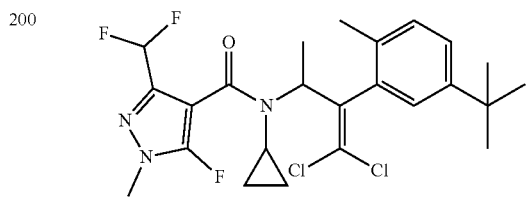 |
| 201 | 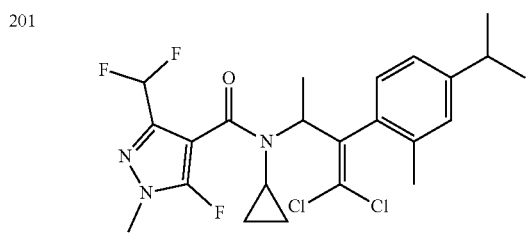 |
| 202 | 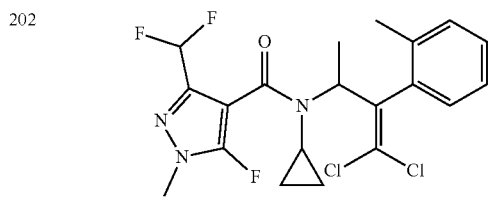 |
| 203 | 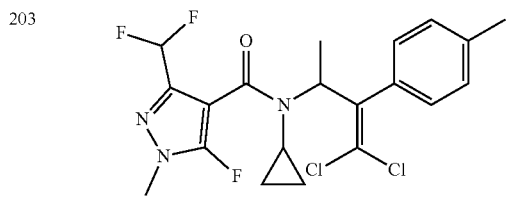 |
| Compound number | Structure |
|---|---|
| 204 | 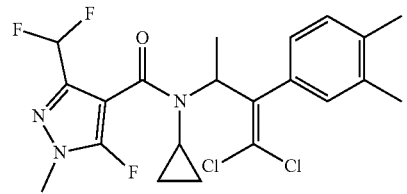 [SMILES: Cc1ccc(C(=C(Cl)Cl)C(C)N(C(=O)c2c(C(F)F)nn(C)c2F)C2CC2)cc1C] |
| 205 | 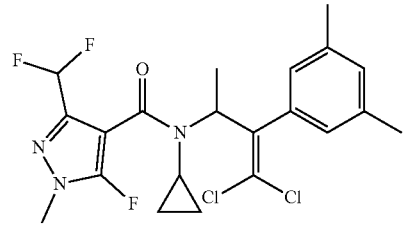 [SMILES: Cc1cc(C)cc(C(=C(Cl)Cl)C(C)N(C(=O)c2c(C(F)F)nn(C)c2F)C2CC2)c1] |
| 206 | 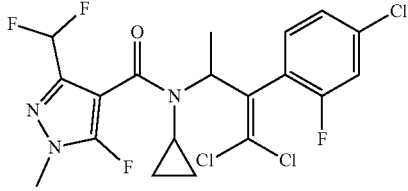 [SMILES: CC(C(=C(Cl)Cl)c1ccc(Cl)cc1F)N(C(=O)c1c(C(F)F)nn(C)c1F)C1CC1] |
| 207 | 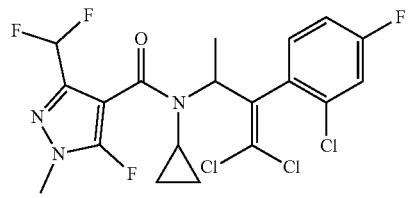 [SMILES: CC(C(=C(Cl)Cl)c1ccc(F)cc1Cl)N(C(=O)c1c(C(F)F)nn(C)c1F)C1CC1] |
| 208 | 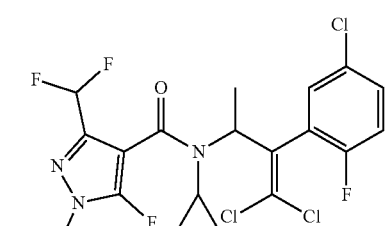 |
| 209 | 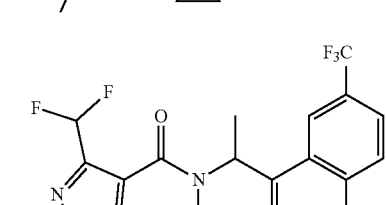 |
| 210 | 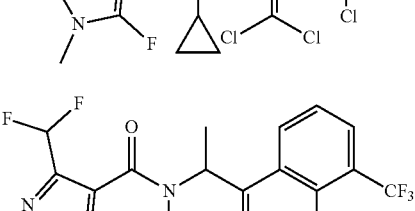 |

| Compound number | Structure |
|---|---|
| 211 | (structure) |
| 212 | (structure) |
| 213 | (structure) |
| 214 | (structure) |
| 215 | (structure) |
| 216 | (structure) |
| 217 | (structure) |
| 218 | (structure), and |
| 219 | (structure). |

4. A method for controlling a pest or a plant fungal disease, comprising applying the compound according to claim 1 to a pest-infested area or plants.

5. A bactericide comprising an auxiliary material and a fungicidal effective amount of the compound of claim 1 as an active ingredient.

6. The bactericide according to claim 5, wherein a dosage form of the bactericide is selected from the group consisting of emulsifiable concentrates, suspending agents, wettable powders, dusts, granules, aqueous solutions, poison baits, mother liquors, mother powders, and a combination thereof.

7. The method according to claim 4, wherein, the plant fungal diseases is *Erysiphe graminis, sphaerotheca fuliginea*, wheat scab, rice bakanae disease, *sclerotinia* rot of colza, corn leaf spot, wheat stripe rust, cucumber gray mold, or a combination thereof.

\* \* \* \* \*